US008644986B2

(12) United States Patent
Tsuboi et al.

(10) Patent No.: US 8,644,986 B2
(45) Date of Patent: Feb. 4, 2014

(54) CONTROL DEVICE, CONTROL METHOD, COMPUTER PROGRAM, AND RECORDING MEDIUM

(75) Inventors: Toshimitsu Tsuboi, Tokyo (JP); Takeo Kishida, Chiba (JP); Tetsuharu Fukushima, Tokyo (JP)

(73) Assignee: Sony Corporation, Tokyo (JP)

( * ) Notice: Subject to any disclaimer, the term of this patent is extended or adjusted under 35 U.S.C. 154(b) by 1303 days.

(21) Appl. No.: 12/208,563

(22) Filed: Sep. 11, 2008

(65) Prior Publication Data
US 2009/0076657 A1    Mar. 19, 2009

(30) Foreign Application Priority Data
Sep. 13, 2007  (JP) ................ P2007-238538

(51) Int. Cl.
G06F 19/00    (2011.01)
(52) U.S. Cl.
USPC ............ 700/245; 414/1; 414/2; 414/3; 414/4; 414/5; 414/6; 414/7; 414/8; 901/30; 901/33; 700/250; 700/254

(58) Field of Classification Search
USPC ........ 700/245–263; 623/11.11–23.76, 24, 25, 623/57–65; 414/1–8; 901/30–46
See application file for complete search history.

(56) References Cited

FOREIGN PATENT DOCUMENTS

JP      4 189484      7/1992
JP      2000-254884   9/2000

Primary Examiner — Bhavesh V Amin
(74) Attorney, Agent, or Firm — Frommer Lawrence & Haug LLP; William S. Frommer

(57) ABSTRACT

A control device that controls grip of an object is disclosed. The control device includes: detecting means for detecting a slip of the object and outputting a slip detection value; change-value calculating means for calculating, on the basis of the slip detection value, a change value for changing a command value, which sets gripping force for the object, to magnitude for resting the object; suppression-value calculating means for calculating, on the basis of the slip detection value, a suppression value for suppressing the command value to necessary minimum magnitude for resting the object; and setting means for setting the magnitude of the command value on the basis of the change value and the suppression value.

10 Claims, 30 Drawing Sheets

BEFORE WEIGHTING

AFTER WEIGHTING

BEFORE SHIFTING

AFTER SHIFTING

FS: SHEARING FORCE

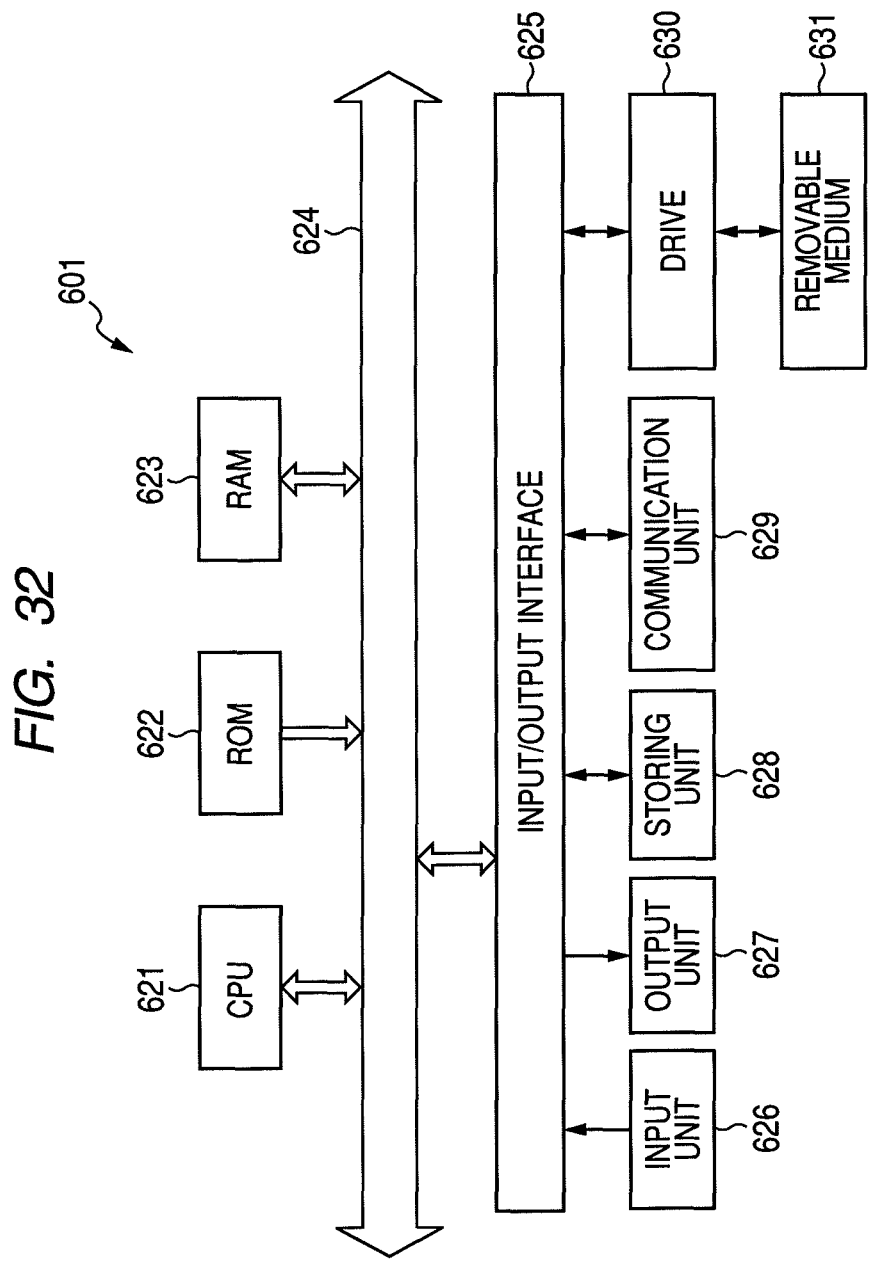

CONTROL DEVICE, CONTROL METHOD, COMPUTER PROGRAM, AND RECORDING MEDIUM

CROSS-REFERENCES TO RELATED APPLICATIONS

The present invention contains subject matter related to Japanese Patent Application JP 2007-238538 filed in the Japanese Patent Office on Sep. 13, 2007, the entire contents of which being incorporated herein by reference.

BACKGROUND OF THE INVENTION

1. Field of the Invention

The present invention relates to a control device, a control method, a computer program, and a recording medium, and, more particularly to a control device, a control method, a computer program, and a recording medium for controlling grip of an object to allow a robot hand to grip the object with minimum gripping force without causing an object to slipping down from the robot hand.

2. Description of the Related Art

Recently, a human-like robot has been actively studied. The robot walks on two feet like a human and grips an object with a robot hand.

It is proposed to control grip of an object to, in gripping the object with the robot hand, detect a slip with a tactile sensor and, when a slip of the object as a target of grip is detected, increase gripping forces of respective fingers of the robot hand by a predetermined amount and prevent the slip (JP-A-4-189484).

SUMMARY OF THE INVENTION

However, in the method described above, since force is increased to prevent a slip, it is difficult to grip the object with necessary minimum force. As a result, energy is wastefully consumed and a battery is exhausted earlier.

Therefore, it is desirable to allow a robot hand to grip an object with necessary minimum force.

According to an embodiment of the present invention, there is provided a control device that controls grip of an object, the control device including detecting means for detecting a slip of the object and outputting a slip detection value, change-value calculating means for calculating, on the basis of the slip detection value, a change value for changing a command value, which sets gripping force for the object, to magnitude for resting the object, suppression-value calculating means for calculating, on the basis of the slip detection value, a suppression value for suppressing the command value to necessary minimum magnitude for resting the object, and setting means for setting the magnitude of the command value on the basis of the change value and the suppression value.

The setting means can set the magnitude of the command value on the basis of the change value until the object comes to rest and set the magnitude of the command value on the basis of the change value and the suppression value after the object comes to rest.

The setting means can set the command value by adding the change value and the suppression value to the command value at previous timing.

The change value can include a component of a product of a difference between an absolute value of the slip detection value and an absolute value of a target slip detection value and normal force that is a component in a normal direction of reaction of the gripping force.

The normal force can be calculated by a sum of products of a pressure value received from the object and an area of a sensor that detects the pressure value.

The suppression value can include a component of a product of a difference between a moving average of an absolute value of the slip detection value and an absolute value of a threshold and normal force that is a component in a normal direction of reaction of the gripping force.

The detecting means can include plural sensor elements that detect a pressure value from the object, pressure-center calculating means for calculating a pressure center position using the pressure value, pressure-center-movement calculating means for calculating a movement value of the pressure center position using a temporal change of the pressure center position, and slip-detection-value calculating means for calculating the slip detection value on the basis of the movement value of the pressure center position.

The detecting means can include plural sensor elements that detect a pressure value from the object, pressure-center calculating means for calculating a pressure center position using the pressure value, pressure-center-speed calculating means for calculating speed of the pressure center position using a temporal change of the pressure center position, and slip-detection-value calculating means for calculating the slip detection value on the basis of the speed of the pressure center position.

According to another embodiment of the present invention, there is provided a control method for a control device for controlling grip of an object, the control method including the steps of detecting means detecting a slip of the object and outputting a slip detection value, change-value calculating means calculating, on the basis of the slip detection value, a change value for changing a command value, which sets gripping force for the object, to magnitude for resting the object, suppression-value calculating means calculating, on the basis of the slip detection value, a suppression value for suppressing the command value to necessary minimum magnitude for resting the object, and setting means setting the magnitude of the command value on the basis of the change value and the suppression value.

According to still another embodiment of the present invention, there is provided a computer program for controlling grip of an object, the computer program causing a computer to execute processing for detecting a slip of the object and outputting a slip detection value, calculating, on the basis of the slip detection value, a change value for changing a command value, which sets gripping force for the object, to magnitude for resting the object, calculating, on the basis of the slip detection value, a suppression value for suppressing the command value to necessary minimum magnitude for resting the object, and setting the magnitude of the command value on the basis of the change value and the suppression value.

According to still another embodiment of the present invention, there is provided a recording medium in which the computer program is recorded.

In the embodiments of the present invention, in the control device that controls grip of an object, a slip of the object is detected and a slip detection value is outputted, a change value for changing a command value, which sets gripping force for the object, to magnitude for resting the object is calculated on the basis of the slip detection value, a suppression value for suppressing the command value to a necessary minimum value for resting the object is calculated on the basis of the slip detection value, and the magnitude of the command value is set on the basis of the change value and the suppression value.

As described above, according to the embodiments of the present invention, it is possible to control to grip the object with necessary minimum gripping force without causing the object to slip.

BRIEF DESCRIPTION OF THE DRAWINGS

FIG. 32 is a block diagram showing the structure of an example of a personal computer.

DESCRIPTION OF THE PREFERRED EMBODIMENTS

Figure 1A:
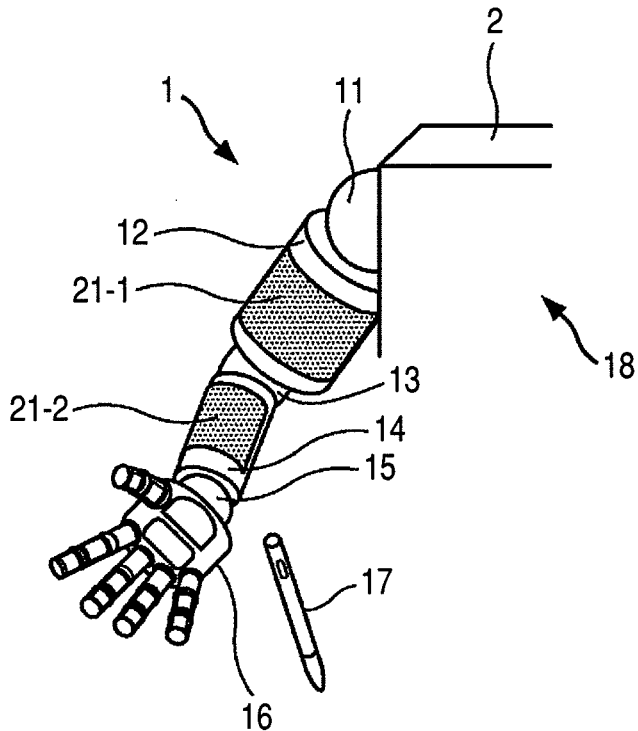
FIGS. 1A and 1B are perspective views showing the structure of a robot hand manipulator according to an embodiment of the present invention.

Embodiments of the present invention will be hereinafter explained. A correspondence relation between elements of the present invention and the embodiments described or shown in the specification or the drawings is described as follows. This description is a description for confirming that the embodiments supporting the present invention are described or shown in the specification or the drawings. Therefore, even if there is an embodiment that is described or shown in the specification or the drawings but is not described herein as an embodiment corresponding to an element of the present invention, this does not means that the embodiment does not correspond to the element. Conversely, even if an embodiment is described herein as an embodiment corresponding to an element of the present invention, this does not means that the embodiment does not correspond to elements other than the element.

A control device according to an embodiment of the present invention is a control device (e.g., a control device 81 shown in FIG. 13) that controls grip of an object. The control device includes detecting means (e.g., a pressure sensor 457 shown in FIG. 13) for detecting a slip of the object and outputting a slip detection value, change-value calculating means (e.g., a change-value calculating unit 462 shown in FIG. 13) for calculating, on the basis of the slip detection value, a change value for changing a command value, which sets gripping force for the object, to magnitude for resting the object, suppression-value calculating means (e.g., a suppression-value calculating unit 460 shown in FIG. 13) for calculating, on the basis of the slip detection value, a suppression value for suppressing the command value to necessary minimum magnitude for resting the object, and setting means (e.g., adding units 451 and 452 shown in FIG. 13) for setting the magnitude of the command value on the basis of the change value and the suppression value.

Figure 7:
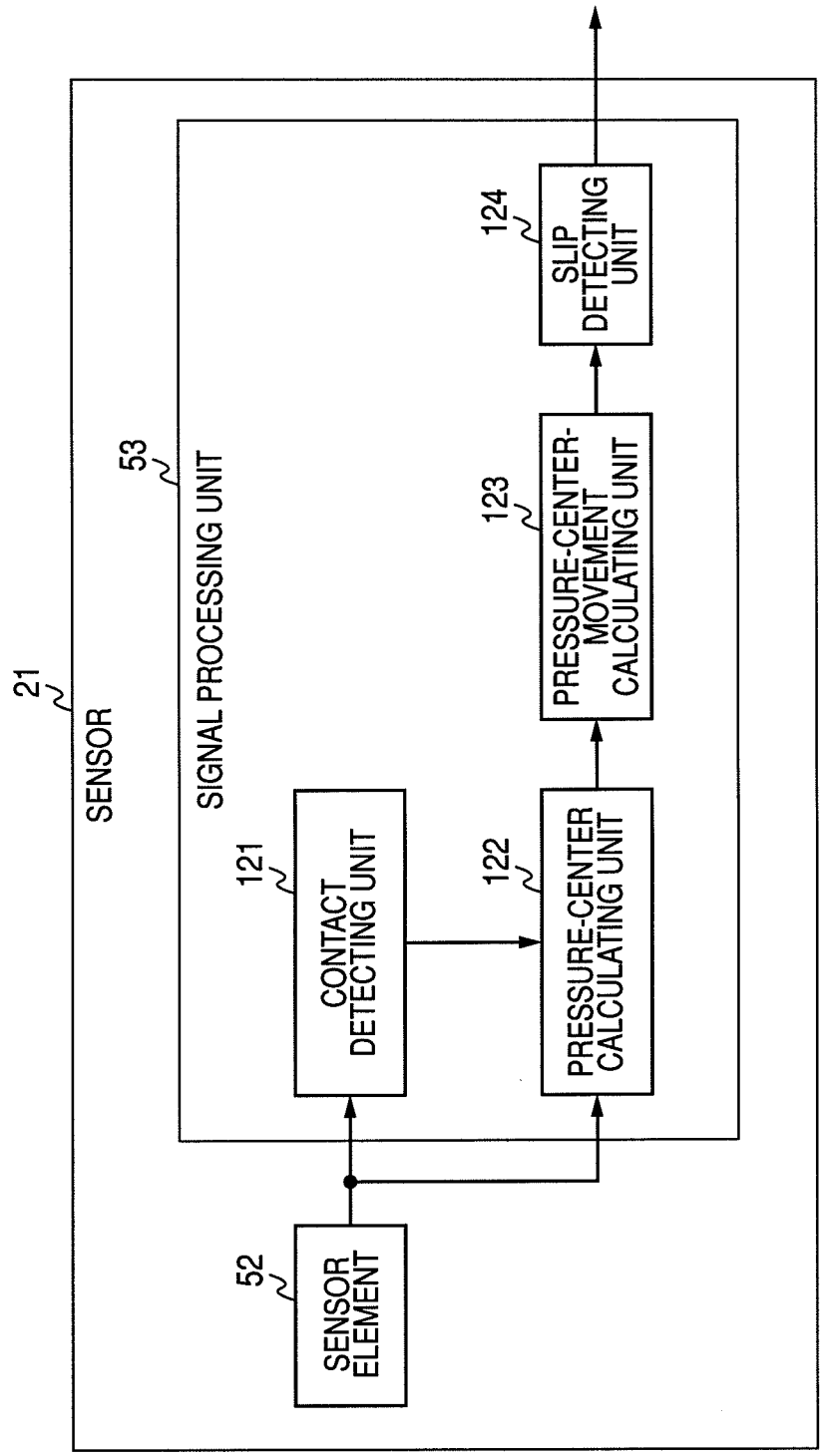
FIG. 7 is a block diagram showing the functional structure of an example of a signal processing unit.

The detecting means can include plural sensor elements (e.g., sensor elements 52 shown in FIG. 5) that detect a pressure value from the object, pressure-center calculating means (e.g., a pressure-center calculating unit 122 shown in FIG. 7) for calculating a pressure center position using the pressure value, pressure-center-movement calculating means (e.g., a pressure-center-movement calculating unit 123 shown in FIG. 7) for calculating a movement value of the pressure center position using a temporal change of the pressure center position, and slip-detection-value calculating means (e.g., a slip detecting unit 124 shown in FIG. 7) for calculating the slip detection value on the basis of the movement value of the pressure center position.

The detecting means can include plural sensor elements (e.g., sensor elements 52 shown in FIG. 5) that detect a pressure value from the object, pressure-center calculating means (a pressure-center calculating unit 122 shown in FIG. 9) for calculating a pressure center position using the pressure value, pressure-center-speed calculating means (e.g., a pressure-center-speed calculating unit 323 shown in FIG. 9) for calculating speed of the pressure center position using a temporal change of the pressure center position, and slip-detection-value calculating means (e.g., a slip detecting unit 124 shown in FIG. 9) for calculating the slip detection value on the basis of the speed of the pressure center position.

A control method according to another embodiment of the present invention is a control method (e.g., a control processing method shown in FIG. 14) for a control device (e.g., a control device 81 shown in FIG. 13) for controlling grip of an object. The control method includes the steps of detecting means (e.g., a pressure sensor 457 shown in FIG. 13) detecting a slip of the object and outputting a slip detection value, change-value calculating means (e.g., a change-value calculating unit 462 shown in FIG. 13) calculating, on the basis of the slip detection value, a change value for changing a command value, which sets gripping force for the object, to magnitude for resting the object, suppression-value calculating means (e.g., a suppression-value calculating unit 460 shown in FIG. 13) calculating, on the basis of the slip detection value, a suppression value for suppressing the command value to necessary minimum magnitude for resting the object, and setting means (e.g., adding units 451 and 452 shown in FIG. 13) setting the magnitude of the command value on the basis of the change value and the suppression value.

A computer program according to still another embodiment of the present invention is a computer program for controlling grip of an object. The computer program causes a computer to execute processing for detecting a slip of the object and outputting a slip detection value (e.g., step S80 shown in FIG. 14), calculating, on the basis of the slip detection value, a change value for changing a command value, which sets gripping force for the object, to magnitude for resting the object (e.g., step S72 shown in FIG. 14), calculating, on the basis of the slip detection value, a suppression value for suppressing the command value to necessary minimum magnitude for resting the object (e.g., step S76 shown in FIG. 14), and setting the magnitude of the command value on the basis of the change value and the suppression value (e.g., step S79 shown in FIG. 14).

An embodiment of the present invention is explained below with reference to the accompanying drawings.

Figure 1B:
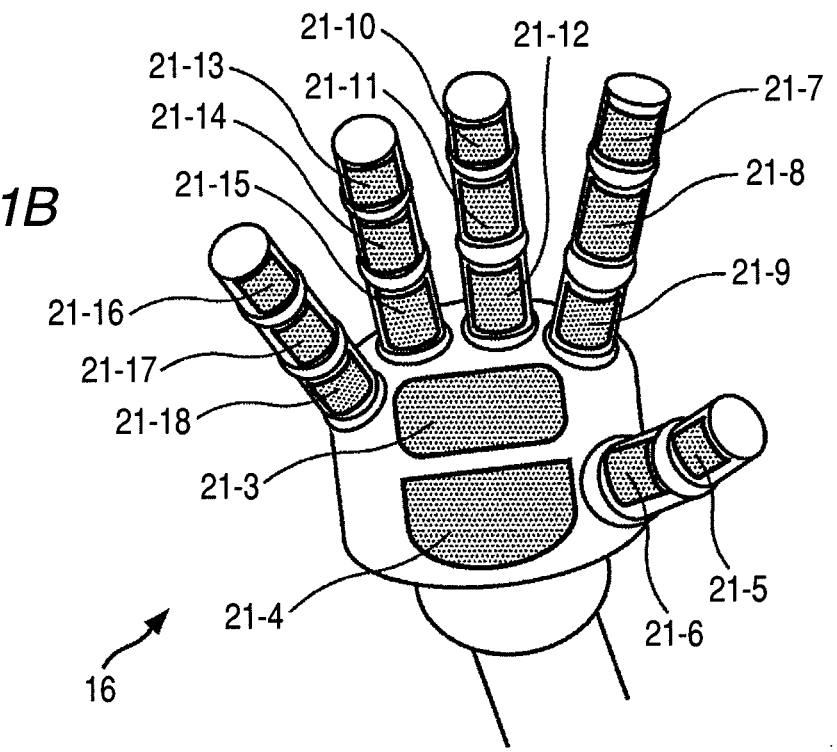

FIGS. 1A and 1B show an example of the external structure of a robot hand manipulator according to the embodiment of the present invention.

FIG. 1A shows the external structure of the robot hand manipulator according to the embodiment. A robot hand manipulator 18 includes a robot hand 1 including a shoulder joint section 11, an upper arm section 12, an elbow joint section 13, a forearm section 14, a wrist section 15, and a hand section 16 and a supporting unit 2 that supports the robot hand 1 via the shoulder joint section 11 of the robot hand 1.

Sensors 21-1 and 21-2 are provided on inner sides of the upper arm section 12 and the forearm section 14 of the robot hand 1, respectively. As shown in FIG. 1B in enlargement, sensors 21-3 and 21-4 are provided in a palm configuring the hand section 16 of the robot hand 1. A sensor 21-5 is provided above a first joint on a finger palm surface of a thumb configuring the hand section 16. A sensor 21-6 is provided between the first joint and a second joint on the finger palm surface of the thumb. A sensor 21-7 is provided above a first joint on a finger palm surface of an index finger. A sensor 21-8 is provided between the first joint and a second joint on the finger palm surface of the index finger. A sensor 21-9 is provided between the second joint and a third joint on the finger palm surface of the index finger.

A sensor 21-10 is provided above a first joint on a finger palm surface of a middle finger. A sensor 21-11 is provided between the first joint and a second joint on the finger palm surface of the middle finger. A sensor 21-12 is provided between the second joint and a third joint on the finger palm surface of the middle finger. A sensor 21-13 is provided above a first joint on a finger palm surface of a third finger. A sensor 21-14 is provided between the first joint and a second joint on the finger palm surface of the third finger. A sensor 21-15 is provided between the second joint and a third joint on the finger palm surface of the third finger. A sensor 21-16 is provided above a first joint on a finger palm surface of a little finger. A sensor 21-17 is provided between the first joint and a second joint on the finger palm surface of the little finger. A sensor 21-18 is provided between the second joint and a third joint on the finger palm surface of the little finger.

When it is unnecessary to specifically distinguish the sensors 21-1 to 21-18, the sensors 21-1 to 21-18 are simply referred to as sensors 21 in the following explanation.

The robot hand manipulator 18 actuates actuators 102-1 to 102-n (see FIG. 6 referred to later) incorporated in the respective joint sections such as the shoulder joint section 11, the elbow joint section 13, the wrist section 15, and the finger joint sections of the hand section 16 (these joint sections are hereinafter collectively referred to as joint sections 10 when necessary) to bring the respective sensors 21 of the hand section 16 and the like into contact with an arbitrary object such as a pen 17 shown in FIG. 1A.

Each of the sensors 21 provided in the robot hand 1 includes a capacitance-type pressure sensor that detects only normal force (a normal direction component of reaction of gripping force) perpendicular to a surface of the sensor. The sensor 21 has on the surface thereof a viscoelastic body having softness like the human skin. The viscoelastic body is deformed into various shapes by force received from the outside and a form of the force, whereby pressure is dispersed to the sensor 21 on the inside. The sensor 21 detects, when an object comes into contact with the viscoelastic body, a dispersed pressure value of the object (hereinafter also referred to as distributed pressure value). The sensor 21 detects, on the basis of the detected distributed pressure value, a slip between a gripped object and a fingertip, which is gripping information necessary for performing complicated control such as gripping and manipulation of an object by the robot hand 1.

The slip in gripping and manipulation in this embodiment is defined as described below.

In general, a relative motion between fingers and an object is called a slip. The relative motion is roughly divided into a translational motion and a rotational motion. The translational motion is a motion in a direction orthogonal to gripping force (normal force) at a gripping contact point (a shearing direction or a tangent direction). The rotational motion is a rolling motion of the object rotationally moving while keeping contact with the fingers and a rotational motion around a normal axis at the gripping contact point. A slip of the translational motion and a slip of the rotational motion are distinguished from each other by being referred to as a translational slip and a rotational slip. However, these motions often occur simultaneously in combination.

On the other hand, when stability, robustness, and the like of gripping are taken into account, fingertips desirably have the flexible structure. When an object is gripped by the flexible fingertips, shearing force is applied to the object. Then, a relative motion gradually occurs from an outer periphery of a contact area and an initial local slip occurs in a mixed area of a fixed area near the center where a slip has not occurred and a slipping area in a periphery thereof where a slip has already occurred. When the shearing force is further applied, after a certain point, the fingertips and the object reach a complete relative motion (a slip in a narrow sense), which is a motion state dominated by a coefficient of dynamic friction. At the time of this initial local slip equivalent to the start of a slip, since oscillation occurs, it is possible to observe the initial local slip. At a stage before reaching the initial local slip, the contact area of the fingertips and the object is generally unchanged. However, there is also a state in which a flexible material is deformed to cause shift.

When gripping and manipulation are executed, if the gripping and the manipulation are controlled on the basis of only a complete relative motion (the slip in a narrow sense) between the fingers and the object, the gripping and the manipulation is often not satisfactorily realized because of a delay in the control. Therefore, considering that it is also important to predict the slip in a narrow sense and prevent the slip, a slip including the initial local slip and the shift is referred to a slip in a broad sense. The sensor 21 shown in FIGS. 1A and 1B detects the slip in a broad sense.

The robot hand manipulator 18 controls, on the basis of the slip, an actuator (an actuator 102 shown in FIG. 6 referred to later) incorporated in a predetermined joint section 10 of the robot hand 1 to actively prevent the slip and release unnecessary force. In this way, the robot hand manipulator 18 can cause the robot hand 1 to naturally perform a gripping operation for a long bar-like object such as the pen 17 shown in FIG. 1A.

As described above, the robot hand manipulator 18 can skillfully grip and manipulate arbitrary objects having various sizes, shapes, surface states, weights, and the like.

Figure 2:
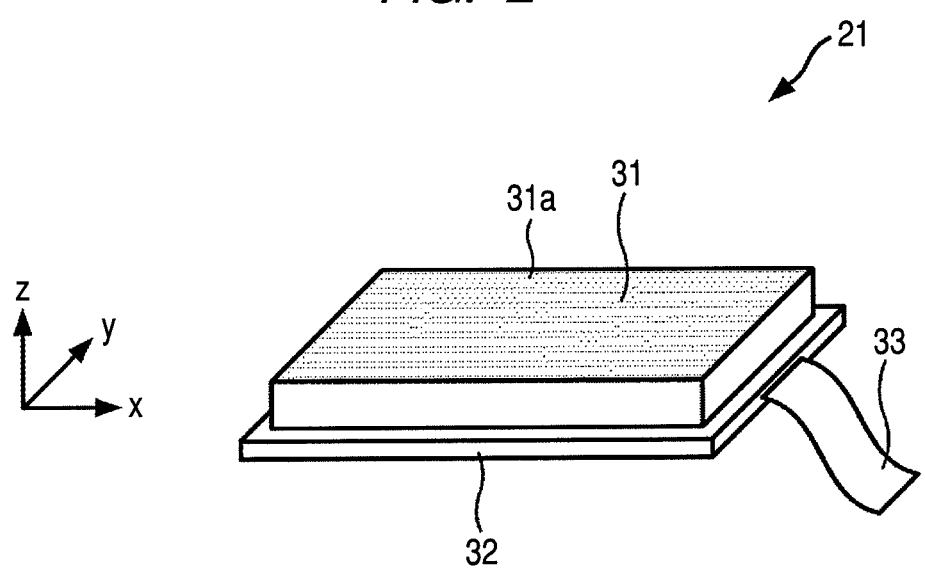
FIG. 2 is a perspective view showing the external structure of a sensor.

FIG. 2 is a perspective view showing an example of the external structure of the sensor 21.

The sensor 21 roughly includes an input section 31 that is touched by an object and a human finger, a fixing section 32 that supports the input section 31 formed of a deformable material, and an external connection section 33 through which power is inputted and a detection result and the like of the sensor 21 is outputted to, for example, a main control unit 101 (see FIG. 6 referred to later) of the robot hand manipulator 18.

In the example shown in FIG. 2, in the input section 31, an input surface 31a is formed in a square pole shape. In the following explanation, a surface parallel to the input surface 31a is an xy plane of an xyz coordinate system and a direction perpendicular to the input surface 31a is a z axis direction unless specifically noted otherwise.

Figure 3A:
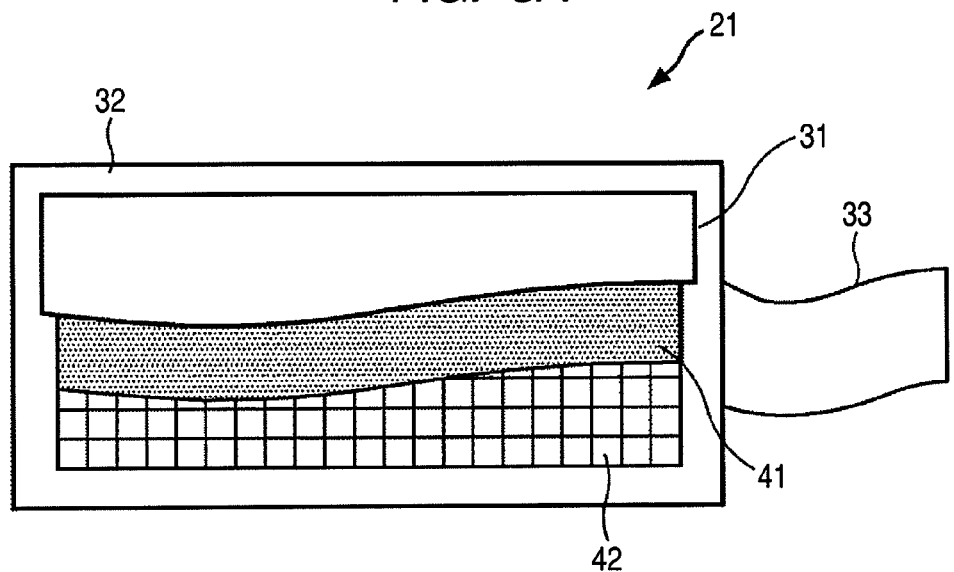
FIGS. 3A and 3B are diagrams showing the internal structure of the sensor.
Figure 3B:
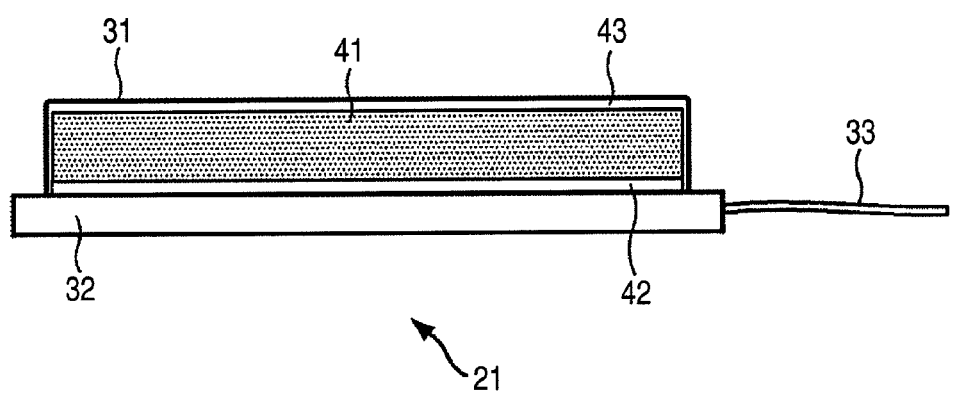

FIGS. 3A and 3B show the internal structure of the sensor 21 shown in FIG. 2. FIG. 3A is a plan view of the sensor 21 viewed from right above. FIG. 3B is a side sectional view of the sensor 21. In FIG. 3A, to clearly show the internal structure, the input section 31 and a deforming section 41 are shown in a state in which the input section 31 and a deforming section 41 are broken stepwise.

The input section 31 roughly includes the deforming section 41 and a pressure detecting section 42. In other words, the input section 31 has a multilayer structure including the deforming section 41 in an upper layer and the pressure detecting section 42 in a lower layer.

The deforming section 41 is made of a viscoelastic body having a viscoelastic characteristic such as a silicon gel material. The deforming section 41 can be easily deformed by a load from the outside. The pressure detecting section 42 includes a capacitance-type pressure sensor that detects pressure making use of a principle of detection of, for example, a resistance change and a capacitance change.

Stress relaxation and stress dispersion are caused by the deformation of the deforming section 41 and pressure is dispersed to the pressure detecting section 42 on the inside. Therefore, the pressure detecting section 42 can obtain sensing performance equal to or higher than spatial resolution of the capacitance-type pressure sensor on the basis of an interpolation characteristic due to the deformation of the viscoelastic body. The pressure detecting section 42 can calculate a pressure center in a robust manner. The pressure detecting section 42 can acquire amounts equivalent to a slip direction and slip speed according to a slip by using the pressure center for sensing of a slip. Therefore, it is possible to perform control for object gripping and manipulation control for treating an object while causing the object to slip with fingertips of a robot hand.

As the viscoelastic material, silicon gel having high heat resistance, cold resistance, slidability, and abrasion resistance is suitable. However, other materials can also be used. A boundary between the deforming section 41 and the pressure detecting section 42 is fastened by bonding or integral molding and is formed as a binding surface. Therefore, a phenomenon due to incompressibility equivalent to that of a rubber material, i.e., a so-called bulging phenomenon in which, when pressure is applied, a part of sides and an upper surface of the boundary expands but a volume does not change is caused. It is found as a result of the experiment by the inventor that a form of the bulging phenomenon shows various characteristics according to a load value and an input surface shape.

Since the deforming section 41 of the input section 31 is made of a flexible material, even when the sensor 21 comes into contact with a person, the person does not usually feel unpleasant. Further, safety for humans is improved and it is possible to realize physical interaction with higher affinity with humans.

Figure 4:
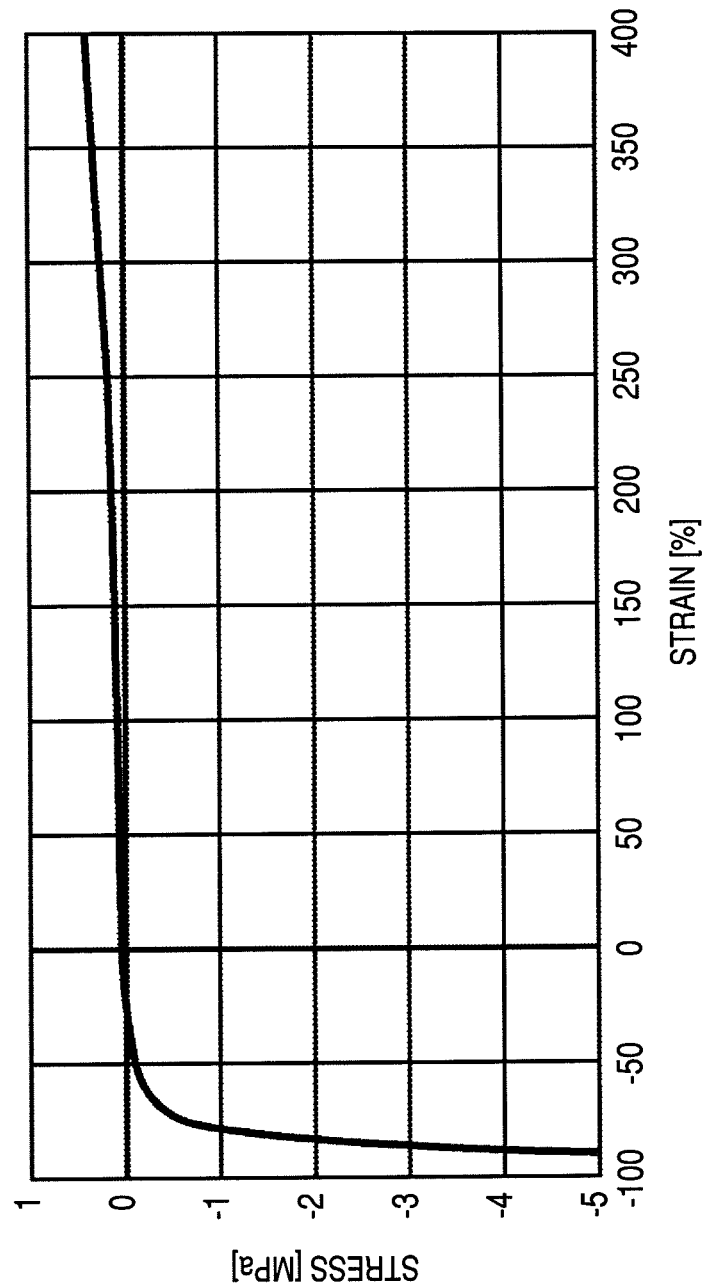
FIG. 4 is a graph showing compression and tension characteristics of a viscoelastic material.

FIG. 4 shows an example of compression and tension characteristics of the viscoelastic material used for the deforming section 41.

The ordinate of FIG. 4 represents the stress [Mpa] generated against the load (external force) acting on the viscoelastic material. The abscissa represents strain (distortion), which is a degree of deformation due to the load on the material with respect to an original state.

A position where the strain is 0% (i.e., a position where the strain does not occur) is in a state in which the external force does not act on the viscoelastic material. When a load of compression is applied from the position where the strain is 0%, the strain changes to only about −80% and the generated stress increases little by little in a minus direction (downward in the figure) until the strain reaches about −50%. When the strain exceeds about −60%, the stress suddenly increases until the strain exceeds about −80%.

On the other hand, when a load of tension is applied from the position where the strain if 0%, the strain changes to about 400%. The stress gently increases in a plus direction (upward in the figure) compared with the increase in the stress in the case of compression.

Figure 5:
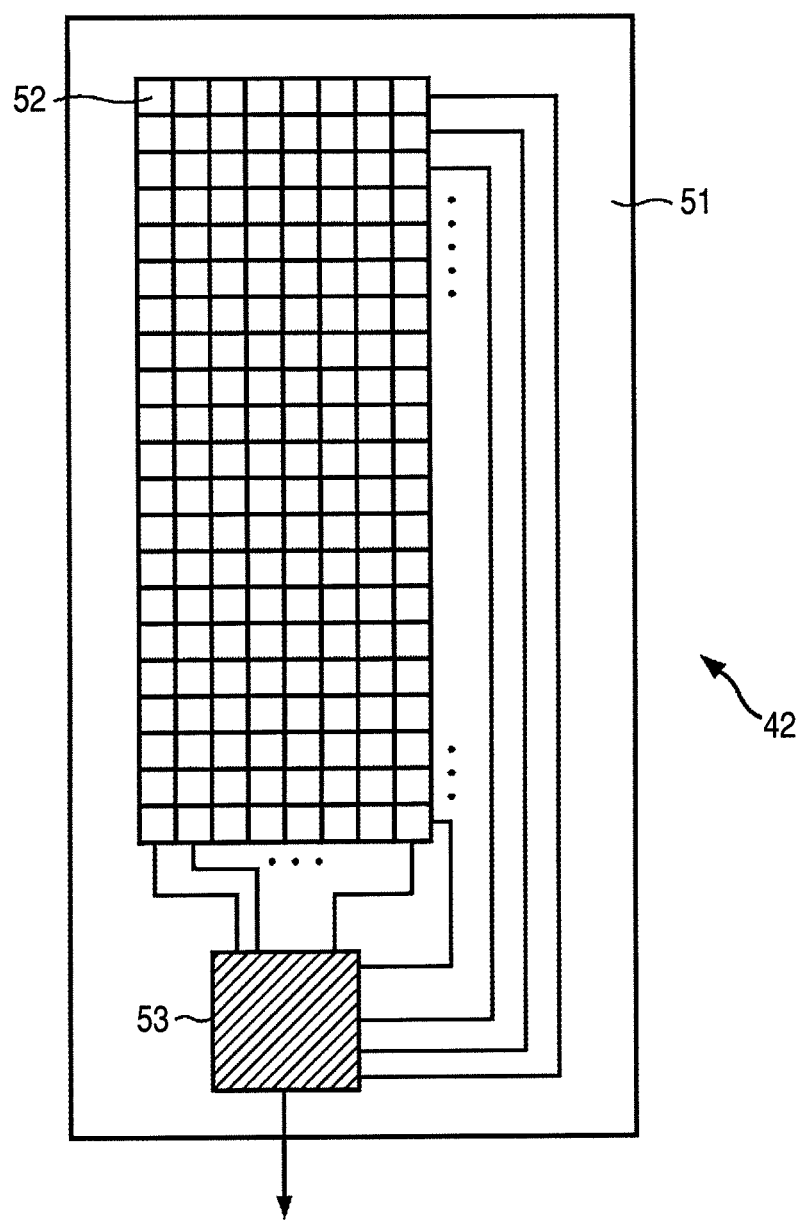
FIG. 5 is a plan view showing the structure of a pressure detecting section.

FIG. 5 is a diagram showing the structure of the capacitance-type pressure sensor as an example of the pressure detecting section 42 shown in FIGS. 3A and 3B.

The pressure detecting section 42 includes, for example, plural pressure detection elements (hereinafter also referred to as sensor elements) 52 arranged in a matrix shape on a flexible substrate 51. In other words, a sensor configuring the pressure detecting section 42 is also called distributed pressure sensor. In the example shown in FIG. 5, for convenience of explanation, only one sensor element is denoted by a reference numeral.

In the case of the example shown in FIG. 5, the pressure detecting section 42 includes one-hundred sixty-eight sensor elements 52 arranged in vertical 21 columns×horizontal 8 rows. Lead-out lines are inputted to a signal processing unit 53 from the respective columns and the respective rows of the sensor elements 52. Distributed pressure values detected by the respective sensor elements 52 are inputted to the signal processing unit 53 via the lead-out lines and subjected to predetermined signal processing by the signal processing unit 53. A result of the signal processing is outputted to the outside of the sensor 21 via the external connection section 33 (FIGS. 3A and 3B).

The deforming section 41 made of the viscoelastic material is arranged on the flexible substrate 51, on which the sensor elements 52 and the signal processing unit 53 are arranged, to configure the sensor 21.

Figure 6:
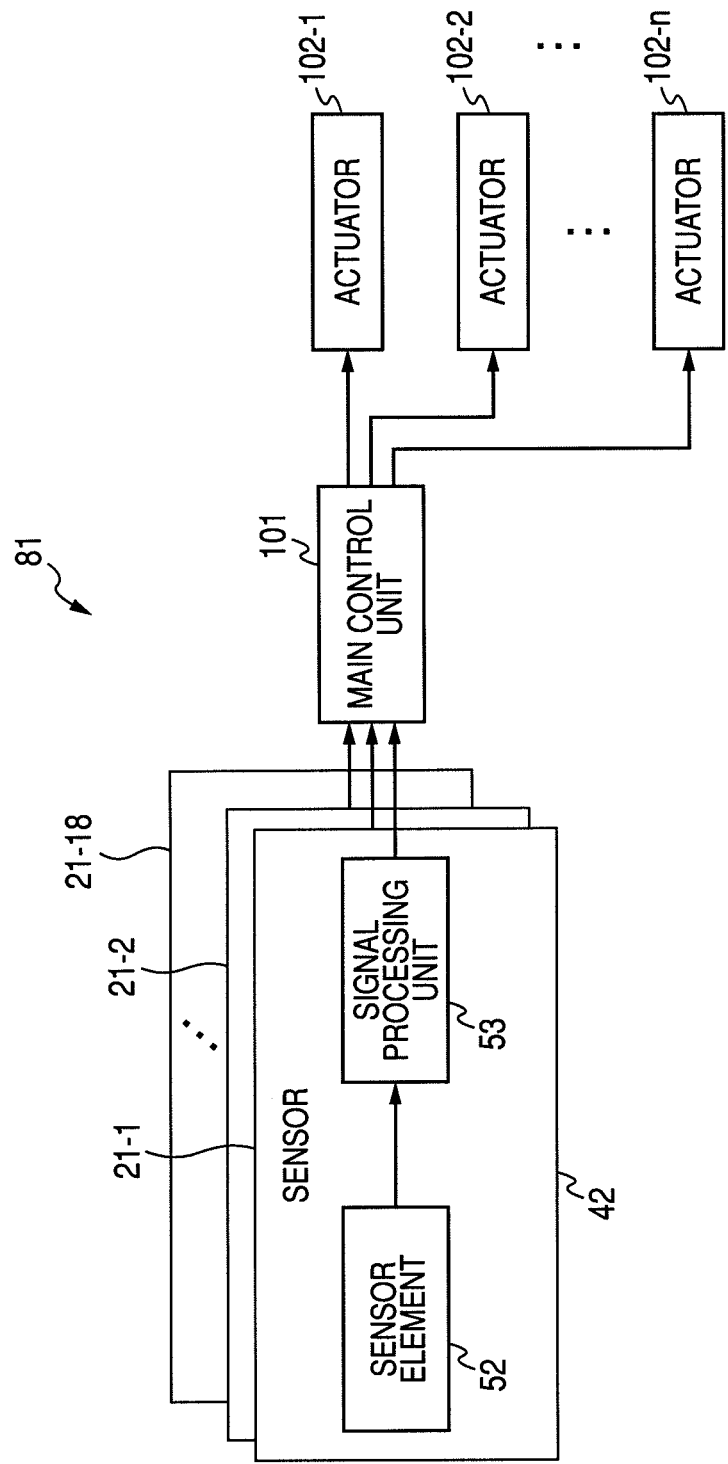
FIG. 6 is a block diagram showing the structure of an example of a control device.

FIG. 6 shows an example of the electric structure of the robot hand manipulator 18 shown in FIG. 1A.

In the example shown in FIG. 6, the robot hand manipulator 18 includes sensors 21-1, 21-2, . . . , and 21-18, a main control unit 101, and actuators 102-1, 102-2, . . . , and 102-*n* (in the following explanation, the actuators are simply referred to as actuators 102 unless it is necessary to specifically distinguish the sensors). The sensors 21, the main control unit 101, and the actuators 102 configure a control device 81.

The pressure detecting section 42 of the sensor 21 arranged in a predetermined position corresponding to the predetermined joint section 10 as shown in FIGS. 1A and 1B includes the sensor elements 52 and the signal processing unit 53 as shown in FIG. 5.

The sensor elements 52 output a distributed pressure value detected by using a capacitance change as a detection principle to the signal processing unit 53. The principle of detection of the distributed pressure value may be other than the capacitance change. For example, the detection principle may be a resistance change. If a distributed pressure value can be obtained, a sensor in which pressure sensitive rubber is arranged may be used.

The signal processing unit 53 performs predetermined signal processing described later using the distributed pressure value from the sensor elements 52 to thereby detect a slip between a gripped object and fingertips and outputs information on the detected slip to the main control unit 101 on a real time basis.

The main control unit 101 incorporates a CPU (Central Processing Unit), a memory, and the like. A control program stored in the memory is executed by the CPU, whereby the main control unit 101 performs various kinds of processing.

The main control unit 101 receives information on a slip between a gripped object and the fingertips detected by the respective sensors 21. The main control unit 101 controls necessary ones of the actuators 102 on the basis of the information using, for example, softness of the sensors 21 themselves and grippability due to friction on surfaces of the sensors 21 to drive the predetermined joints 10 and cause the robot hand 1 to grip the object and, for example, move and carry the object.

When the main control unit 101 causes the robot hand 1 to grip the object and, for example, move and carry the object, the main control unit 101 controls necessary ones of the actuators 102 on the basis of the information on the slip between the gripped object and the finger tips from the respective sensors 21 to drive the predetermined joint sections 10, actively relaxes gripping force of the joint sections 10, grips the object with minimum force, and causes the robot hand 1 to, for example, move and carry the object with further reduced energy consumption.

In the following explanation, the processing for actively relaxing the gripping force of the joint section 10 and gripping the object with minimum force and controlling the robot hand 1 in this way is referred to as gripping force suppression control processing.

The respective actuators 102 are incorporated in the predetermined joint sections 10 (i.e., the shoulder joint section 11, the elbow joint section 13, the wrist section 15, and the respective finger joints of the hand section 16) and drive the predetermined joint sections 10 according to a driving signal from the main control unit 101. Consequently, the predetermined joint sections 10 can rotate with predetermined degrees of freedom.

FIG. 7 is shows the functional structure of an example of the signal processing unit 53 of the sensor 21. The signal processing unit 53 includes a contact detecting unit 121, a pressure-center calculating unit 122, a pressure-center-movement calculating unit 123, and a slip detecting unit 124. Information on distributed pressure values from the sensor elements 52 is inputted to the contact detecting unit 121 and the pressure-center calculating unit 122.

The contact detecting unit 121 performs contact detection in the respective sensor elements 52 using the distributed pressure values from the respective sensor elements 52 and outputs information on the sensor elements 52, for which detection of contact of an object with the sensor 21 (the deforming section 41) is performed, to the pressure-center calculating unit 122.

The pressure-center calculating unit 122 as pressure-center calculating means for calculating a pressure center position using a pressure value calculates a pressure center position using the distributed pressure values from the sensor elements 52. Alternatively, the pressure-center calculating unit 122 calculates a pressure center position using distributed pressure values of the sensor elements 52 for which the contact detection is performed by the contact detecting unit 121. When the distributed pressure values from the sensor elements 52 are directly used, the contact detecting unit 121 is unnecessary. On the contrary, when the distributed pressure values of the sensor elements 52 for which the contact detection is performed by the contact detecting unit 121 are used, it is unnecessary to supply the distributed pressure values from the sensor elements 52 to the pressure-center calculating unit 122.

The pressure-center-movement calculating unit 123 as pressure-center-movement calculating means for calculating a movement value of a pressure center position using a temporal change of the pressure center position accumulates pressure center positions from the pressure-center calculating unit 122 in time series. The pressure-center-movement calculating unit 123 calculates, for example, a difference in a moving average of the accumulated pressure center positions or a difference among the pressure center positions and outputs the calculated difference to the slip detecting unit 124 as a pressure center movement calculated value.

The slip detecting unit 124 as slip-detection-value calculating means for calculating a slip detection value on the basis of the movement value of the pressure center position performs a pressure center movement detection calculation using a calculation result from the pressure-center-movement calculating unit 123. The slip detecting unit 124 compares a calculation result of the pressure center movement detection calculation with a predetermined threshold (hereinafter referred to as judgment threshold) and detects a slip. Alternatively, the slip detecting unit 124 directly compares the pressure center movement calculated value from the pressure-center-movement calculating unit 123 and the judgment threshold and detects a slip.

Slip detection processing is explained with reference to a flowchart shown in FIG. 8. For example, it is assumed that the pressure detecting section 42 includes a capacitance-type pressure sensor including m×n (in the case of the example shown in FIG. 4, considering that a vertical direction in the figure is the horizontal direction, m=21 and n=8) sensor elements 52; m (x=0, 1, 2, ..., m−1) in the horizontal direction (x) and n (y=0, 1, 2, ..., n−1) in the vertical direction (y).

In step S31, the contact detecting unit 121 performs contact detection using distributed pressure values from the respective sensor elements 52 and outputs information on the sensor elements 52, for which detection of contact of an object with the sensor 21 (the deforming section 41) is performed, to the pressure-center calculating unit 122.

For example, it is assumed that the pressure detecting section 42 includes m×n (in the case of the example shown in FIG. 5, considering that length in the figure is the horizontal direction, m=21 and n=8) sensor elements 52; m (x=0, 1, 2, ..., m−1) in the horizontal direction (x) and n (y=0, 1, 2, ..., n−1) in the vertical direction (y). When an output (i.e., an pressure value) P(x, y) of each of the sensor elements 52 exceeds a certain threshold th(x, y), i.e., satisfies the following formula (1), the contact detecting unit 121 judges that the sensor element 52 has detected contact of an object with the input section 31 (the deforming unit 41). The threshold th(x, y) may be the same value for all the sensor elements 52.

$$P(x,y) > th(x,y) \quad (1)$$

When a sum of pressure values P(x, y) of the respective sensor elements 52 exceeds a certain threshold th, i.e., satisfies the following formula (2), the contact detecting unit 121 may judge that the sensor elements 52 have detected contact of an object with the input section 31.

$$\sum_{y=0}^{n-1}\sum_{x=0}^{m-1} P(x, y) > th \quad (2)$$

As represented by the following formula, when the contact is detected (when the pressure value P(x, y) of the sensor element 52 is larger than the threshold th(x, y)), the contact detecting unit 121 directly outputs the pressure value P(x, y) of the sensor element 52 as a detected pressure value Pc(x, y). However, when the contact is not detected (when the pressure value P(x, y) of the sensor element 52 is equal to or smaller than the threshold th(x, y)), the contact detecting unit 121 sets the detected pressure value Pc(x, y) to 0.

$$P_c(x, y) = \begin{cases} P(x, y): & P(x, y) > th(x, y) \\ 0: & P(x, y) \le th(x, y) \end{cases} \quad (3)$$

In step S32, the pressure-center calculating unit 122 calculates a pressure center position using a distributed pressure value from the contact detecting unit 121. Alternatively, the pressure-center calculating unit 122 calculates a pressure center position using the distributed pressure values from the sensor elements 52. When pressure values detected by the respective sensor elements 52 is represented as Pc(x, y) and unit areas of the respective sensor elements 52 are represented as S(x, y), a pressure center position COPx, COPy is calculated by the following formula (4). COPx and COPy represent an x coordinate and a y coordinate of the pressure center position, respectively.

$$COPx = \frac{\sum_{y=0}^{n-1}\sum_{x=0}^{m-1} P_c(x, y) \times S(x, y) \times x}{\sum_{y=0}^{n-1}\sum_{x=0}^{m-1} P_c(x, y) \times S(x, y)} \quad (4)$$

$$COPy = \frac{\sum_{y=0}^{n-1}\sum_{x=0}^{m-1} P_c(x, y) \times S(x, y) \times y}{\sum_{x=0}^{n-1}\sum_{x=0}^{m-1} P_c(x, y) \times S(x, y)}$$

A denominator on the right side of formula (4) represents a sum of forces applied in a normal direction. A numerator on the right side is a sum of torques. Therefore, according to formula (4), a pressure center position is calculated as a representative point of a position where torque is applied.

When all the unit areas S(x, y) of the respective sensor elements 52 are the same as in the example shown in FIG. 5, the pressure center position COPx, COPy is briefly calculated by the following formula (5):

$$COPx = \frac{\sum_{y=0}^{n-1}\sum_{x=0}^{m-1} P_c(x, y) \times x}{\sum_{y=0}^{n-1}\sum_{x=0}^{m-1} P_c(x, y)} \quad (5)$$

$$COPy = \frac{\sum_{y=0}^{n-1}\sum_{x=0}^{m-1} P_c(x, y) \times y}{\sum_{y=0}^{n-1}\sum_{x=0}^{m-1} P_c(x, y)}.$$

Formula (4) and formula (5) are formulas for calculating a pressure center position when the contact detecting unit 121 is used. When the contact detecting unit 121 is not provided and the pressure-center calculating unit 122 calculates the pressure center position COPx, COPy directly using the pressure values P(x, y) outputted by the sensor elements 52, the pressure values P(x, y) of the sensor elements 52 are directly used as the pressure values Pc(x, y) in formula (4) and formula (5).

In the example shown in FIG. 5, the sensor elements 52 are arranged in both the horizontal direction and the vertical direction. However, the same processing can be performed when the sensor elements 52 are arranged only in the horizontal direction or only in the vertical direction. When the sensor elements 52 are arranged only in the horizontal direction, n is 0 and only a result in the x coordinate COPx of the pressure center position is used. When the sensor elements 52 are arranged only in the vertical direction, m is 0 and only a result in the y coordinate COPy of the pressure center position is used.

The pressure center position COPx, COPy calculated as described above takes only values in ranges of 0≤COPx≤m−1 and 0≤COPy≤n−1 according to a pressure value. Therefore, when the pressure center position COPx, COPy is passed to the pressure-center-movement calculating unit 123, a detection result of the contact position detection can be used in the pressure-center-movement calculating unit 123.

In step S33, the pressure-center-movement calculating unit 123 accumulates pressure center positions from the pressure-center calculating unit 122 in time series and performs a pressure center movement calculation. In other words, the pressure-center-movement calculating unit 123 calculates, for example, a difference in a moving average of the accumulated pressure center positions or a difference among the pressure center positions and outputs the calculated difference to the slip detecting unit 124 as a pressure center movement calculated value.

For example, time-series information on pressure center positions is represented as COPx(t) and COPy(t). The pressure-center-movement calculating unit 123 applies low-pass filter processing or moving average processing to COPx(t) and COPy(t) in order to absorb very small fluctuation amounts. In the following explanation, the moving average processing with a simpler calculation is used. When fluctuation (noise) is small, the low-pass filter processing and the moving average processing do not have to be performed.

When the number of samplings to be moving-averaged is represented as M, moving averages $COPx_{MA}(t)$ and $COPy_{MA}(t)$ are represented by the following formula (6) using COPx(t) and COPy(t) accumulated in time series.

$$COPx_{MA}(t) = \frac{1}{M}\sum_{i=0}^{m-1} COPx(t-i)$$

$$COPy_{MA}(t) = \frac{1}{M}\sum_{i=0}^{m-1} COPy(t-i) \quad (6)$$

The pressure-center-movement calculating unit 123 accumulates the calculated moving averages $COPx_{MA}(t)$ and $COPy_{MA}(t)$ in time series as well. The pressure-center-movement calculating unit 123 calculates pressure center movement calculated values Dx(t, i) and Dy(t, i) as indicated by the following formula (7) using the accumulated moving averages.

$$Dx(t,i)=COPx_{MA}(t)-COPx_{MA}(t-i)$$

$$Dy(t,i)=COPy_{MA}(t)-COPy_{MA}(t-i) \quad (7)$$

In formula (7), "i" represents sampling time (timing). For example, differences between a moving average at time t and moving averages at time t−1, time t−2, time t−3, and the like are calculated. In other words, changes in time in plural number of times are calculated. The pressure center movement calculated values Dx(t, i) and Dy(t, i) as differences of the moving averages are outputted to the slip detecting unit 124.

In step S34, the slip detecting unit 124 detects a slip. The slip detecting unit 124 performs a pressure center movement detection calculation using, for example, a calculation result (i.e., the pressure center movement calculated values Dx(t, i) and Dy(t, i)) from the pressure-center-movement calculating unit 123, compares a calculation result of the pressure center movement detection calculation with a judgment threshold, and detects a slip. Alternatively, the slip detecting unit 124 directly compares the pressure center movement calculated values Dx(t, i) and Dy(t, i) from the pressure-center-movement calculating unit 123 with the judgment threshold and detects a slip.

In performing the pressure center movement detection calculation, the slip detecting unit 124 multiplies the pressure center movement calculated values Dx(t, i) and Dy(t, i) with coefficients corresponding thereto to perform the pressure center movement detection calculation.

In other words, the slip detecting unit 124 performs a calculation of formula (8) using the pressure center movement calculated values Dx(t, i) and Dy(t, i) from the pressure-center-movement calculating unit 123 and calculates movement detection coefficients Kx(i) and Ky(i).

$$Kx(i) = \begin{cases} Cs: & |Dx(t,i)| < \text{threshold} \cdot i \\ Cl: & |Dx(t,i)| \geq \text{threshold} \cdot i \end{cases}$$

$$Ky(i) = \begin{cases} Cs: & |Dy(t,i)| < \text{threshold} \cdot i \\ Cl: & |Dy(t,i)| \geq \text{threshold} \cdot i \end{cases} \quad (8)$$

In the formula (8), threshold is a fixed value and Cs and Cl are constants having a relation 0<Cs<Cl. For example, Cs is set to 1 and Cl is set to 2. Therefore, threshold·i is a value that increases as "i" increases. In other words, the movement detection coefficients Kx(i) and Ky(i) are coefficients calculated according to the magnitudes of the pressure center movement calculated values Dx(t, i) and Dy(t, i), more specifically, coefficients calculated according to the magnitudes of the pressure center movement calculated values Dx(t, i) and Dy(t, i) and the value (threshold·i) that increases as time elapses. Threshold may be a variable value.

The slip detecting unit 124 performs the pressure center movement detection calculation according to formula (9) using values calculated by formula (7) and formula (8).

$$Mdx(t,i)=Kx(i) \cdot Dx(t,i)$$

$$Mdy(t,i)=Ky(i) \cdot Dy(t,i) \quad (9)$$

The slip detecting unit 124 performs a slip detection calculation using a value calculated by formula (9). An arithmetic expression of the slip detection calculation is represented by formula (10).

$$Sdx(t) = \sum_{i=1}^{N} Mdx(t,i)$$

$$Sdy(t) = \sum_{i=1}^{N} Mdy(t,i) \quad (10)$$

Slip detection values Sdx and Sdy calculated by formula (10) are amounts having a characteristic that the amounts increase as a slip amount increases and a direction component (a ratio of an x coordinate component and a y coordinate component) thereof is substantially saved. When the slip detecting unit 124 judges that the slip detection values Sdx and Sdy exceed the judgment threshold, the slip detecting unit 124 detects a slip.

By setting a value of a total number of samplings N in formula (10) large and setting threshold in formula (8) small, it is also possible to detect a slip at the time when an object slips very slowly. By setting a value of the total number of samplings N small and setting threshold large, it is possible to detect only a slip at the time when the object slips fast. Therefore, the slip detecting unit 124 can acquire plural kinds of slip detection values Sdx and Sdy by applying the calculation to plural total numbers of samplings N (e.g., a total number of samplings $N_1$ and a total number of samplings $N_2$) and plural thresholds (e.g., threshold 1 and threshold 2) and can use the slip detection values Sdx and Sdy properly according to a purpose of detection.

The slip detected by the slip detecting unit 124 as described above and a direction of the slip (a direction of the slip having detection values Sdx(t) and Sdy(t) as vector components in an x direction and a y direction, respectively) are outputted to the main control unit 101 as information on the slip on a real time basis.

Figure 8:
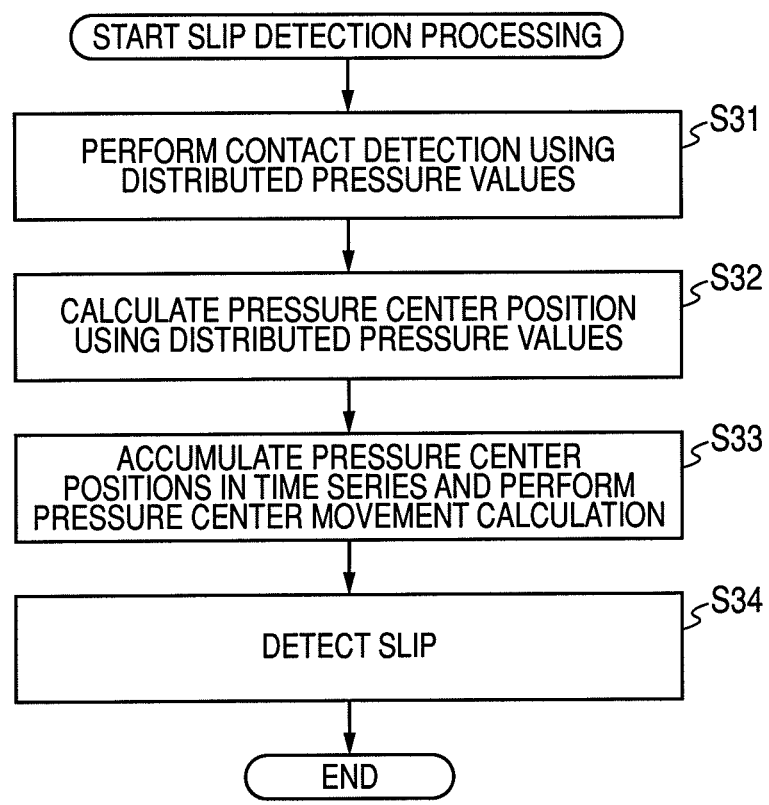
FIG. 8 is a flowchart for explaining slip detection processing.

The pressure center movement calculated values Dx(t, i) and Dy(t, i) calculated in step S33 in FIG. 8 described above are not only calculated by formula (7). For example, when fluctuation is small, the pressure center movement calculated value Dx(t, i) and Dy(t, i) can also be calculated by the following formula (11) by using COPx(t) and COPy(t) accumulated in time series.

$$Dx(t,i)=COPx(t)-COPx(t-i)$$

$$Dy(t,i)=COPy(t)-COPy(t-i) \quad (11)$$

The slip detection values Sdx and Sdy calculated in step S34 in FIG. 8 described above are not only calculated by formula (10). The slip detection values Sdx and Sdy can also be calculated as described below.

For example, when fluctuation is extremely small, the slip detection values Sdx and Sdy are calculated by setting "i" of the center movement calculated values Dx(t, i) and Dy(t, i) to 1, respectively. In other words, the slip detection values Sdx and Sdy are represented by the following formula (12):

$$Sdx(t)=Mdx(t,1)=COPx(t)-COPx(t-1)$$

$$Sdy(t)=Mdy(t,1)=COPy(t)-COPy(t-1) \quad (12).$$

In this case, a slow slip and a fast slip can be detected by comparing the slip detection values Sdx and Sdy with plural judgment thresholds. For example, a slow slip can be detected by comparing the slip detection values Sdx and Sdy with a small judgment threshold and a high slip can be detected by comparing the slip detection values Sdx and Sdy with a large judgment threshold.

Moreover, when fluctuation is small but is not so small as described above, the slip detection values Sdx and Sdy can also be calculated by setting "i" of the pressure center movement calculated values Dx(t, i) and Dy(t, i) to N, respectively. In this case, the slip detection values Sdx and Sdy are represented by the following formula (13).

$$Sdx(t)=Mdx(t,N)=COPx(t)-COPx(t-N)$$

$$Sdy(t)=Mdy(t,N)=COPy(t)-COPy(t-N) \quad (13)$$

In this case, as in the above case, an extremely slow slip and an extremely fast slip can also be detected by comparing the slip detection values Sdx and Sdy with plural N's and plural judgment thresholds. In other words, as low slip can be detected by setting N's large and setting the judging thresholds small and a fast slip can be detected by setting N's small and setting the judgment thresholds large.

The same holds true when a moving average of pressure center positions is calculated. The slip detection values Sdx and Sdy at the time when the moving average is calculated can be calculated by setting "i" of the pressure center movement calculated values Dx(t, i) and Dy(t, i) to 1, respectively, and can also be calculated by setting "i" of the pressure center movement calculated values Dx(t, i) and Dy(t, i) to N, respectively. In other words, the slip detection values Sdx and Sdy calculated by setting "i" of the pressure center movement calculated values Dx(t, i) and Dy(t, i) at the time when the moving average is calculated to 1 are represented by the following formula (14) and the slip detection values Sdx and Sdy calculated by setting "i" of the pressure center movement calculated values Dx(t, i) and Dy(t, i) at the time when the moving average is calculated to N are represented by the following formula (15):

$$Sdx(t)=Mdx(t,1)=COPx_{MA}(t)-COPx_{MA}(t-1)$$

$$Sdy(t)=Mdy(t,1)=COPy_{MA}(t)-COPy_{MA}(t-1) \quad (14),$$

$$Sdx(t)=Mdx(t,N)=COPx_{MA}(t)-COPx_{MA}(t-N)$$

$$Sdy(t)=Mdy(t,N)=COPy_{MA}(t)-COPy_{MA}(t-N) \quad (15).$$

In the former case (i.e., when the slip detection values Sdx and Sdy are calculated by setting "i" of the pressure center movement calculated values Dx(t, i) and Dy(t, i) at the time when the moving average is calculated to 1), as in the above case, a slow slip and a fast slip can be detected by comparing the slip detection values Sdx and Sdy with plural judgment thresholds. For example, a slow slip can be detected by comparing the slip detection values Sdx and Sdy with a small judgment threshold and a fast slip can be detected by comparing the slip detection values Sdx and Sdy with a large judgment threshold.

In the latter case (i.e., when the slip detection values Sdx and Sdy are calculated by setting "i" of the pressure center movement calculated values Dx(t, i) and Dy(t, i) at the time when the moving average is calculated to N), as in the above case, an extremely slow slip and an extremely fast slip can be detected by comparing the slip detection values Sdx and Sdy with plural N's and plural judgment thresholds. In other words, a slow slip can be detected by setting N's large and setting the judgment thresholds small and a fast slip can be detected by setting N's small and setting the judgment thresholds large.

Figure 9:
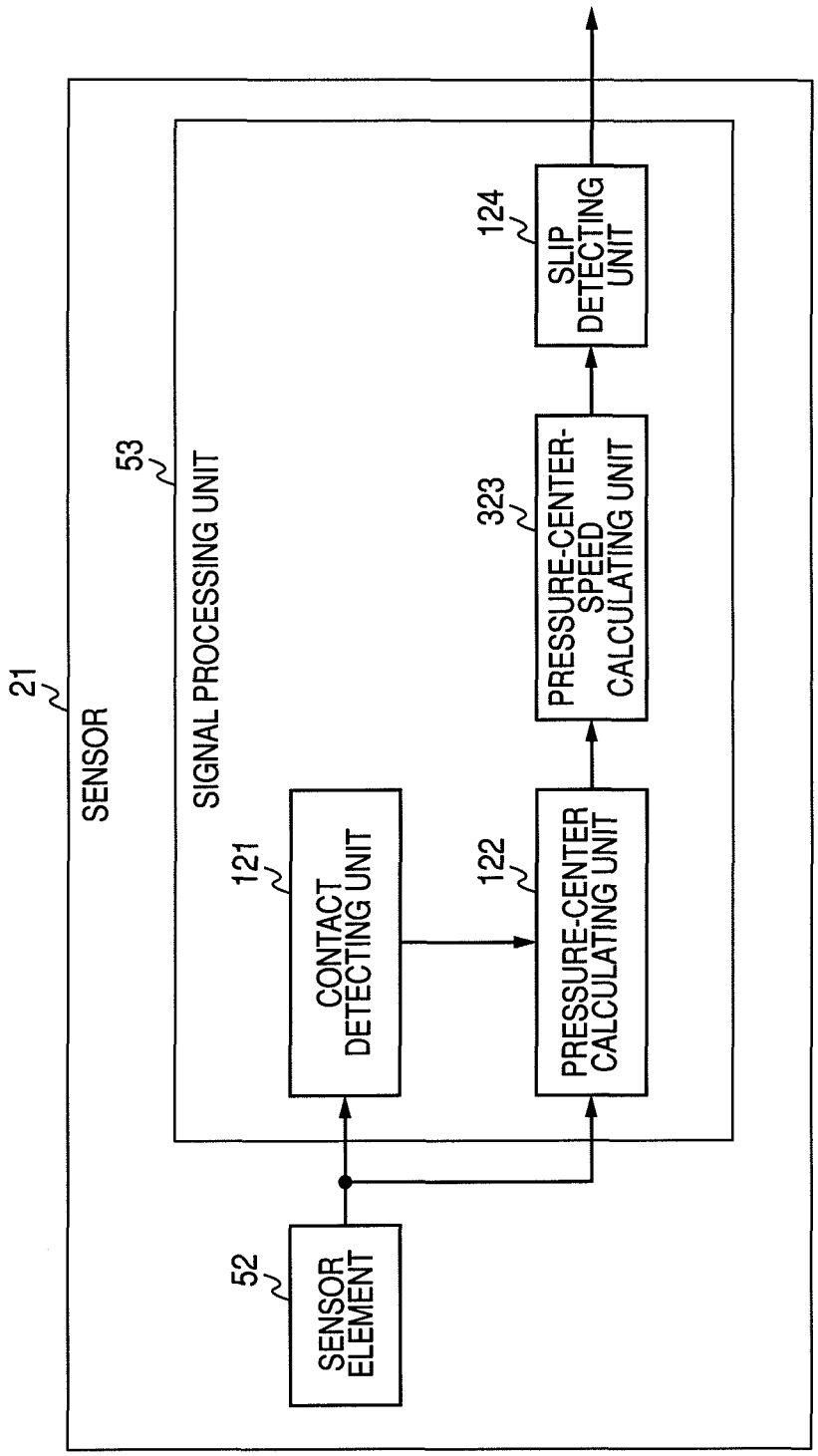
FIG. 9 is a block diagram showing the functional structure of another example of the signal processing unit.

Moreover, the slip detection values Sdx and Sdy can also be calculated as indicated by formula (7) to formula (15). The slip detection values Sdx and Sdy can be calculated by using pressure center speed. In this case, in the signal processing unit 53, instead of the pressure-center-movement calculating section 123 in FIG. 7, a pressure-center-speed calculating unit 323 is provided as shown in FIG. 9. When gripping force control is performed by detecting slipping speed, a drop of an object can be prevented regardless of slipping speed by, for example, slowing applying small force when the object slowly slips and quickly applying large force when the object quickly slips.

The pressure-center-speed calculating unit 323 accumulates calculated moving averages $COPx_{MA}(t)$ and $COPy_{MA}(t)$ in time series. The pressure-center-speed calculating unit 323 calculates pressure center speed calculated values Vx(t, i) and Vy(t, i) in an x coordinate and a y coordinate as indicated by the following formula (16) using the accumulated moving averages.

$$Vx(t,i) = \frac{COPx_{MA}(t) - COPx_{MA}(t-i)}{i \cdot Ts}$$

$$Vy(t,i) = \frac{COPy_{MA}(t) - COPy_{MA}(t-i)}{i \cdot Ts} \quad (16)$$

In other words, in formula (16), for example, differences between a moving average at time t and moving averages at time t−1, time t−2, time t−3, and the like are calculated and speed is calculated by dividing the differences by time for movement. In other words, average speed of plural times of movement is calculated. The pressure center speed calculated values Vx(t, i) and Vy(t, i), which are the average speed of the moving averages, are outputted to the slip detecting unit 124. Ts represents sampling time.

The slip detecting unit 124 detects a slip using the pressure center speed calculated values Vx(t, i) and Vy(t, i) from the pressure-center-speed calculating unit 323. This processing is specifically explained. First, the slip detecting unit 124 calculates speed detection coefficients Kx(i) and Ky(i) using formula (17).

$$Kx(i) = \begin{cases} Cs: & |Vx(t, i)| < \text{threshold} \cdot i \\ Cl: & |Vx(t, i)| \geq \text{threshold} \cdot i \end{cases} \quad (17)$$

$$Ky(i) = \begin{cases} Cs: & |Vy(t, i)| < \text{threshold} \cdot i \\ Cl: & |Vy(t, i)| \geq \text{threshold} \cdot i \end{cases}$$

In the formula (17), threshold is a fixed value and Cs and Cl are constants having a relation 0<Cs≤Cl. For example, Cs=1 and Cl=2 can be used. In other words, the speed detection coefficients Kx(i) and Ky(i) are coefficients calculated according to the magnitudes of the pressure center speed calculated values Vx(t, i) and Vy(t, i). Threshold may be a variable value.

The slip detecting unit 124 performs the pressure center speed detection calculation using values calculated by formula (16) and formula (17). An arithmetic expression of the pressure center speed detection calculation is represented by formula (18).

$$Mdx(t,i) = Kx(i) \cdot Vx(t,i)$$

$$Mdy(t,i) = Ky(i) \cdot Vy(t,i) \quad (18)$$

In this way, the calculations of formula (17) and (18) in this way are performed. Therefore, the pressure center movement speed can be weighted in a calculation of formula (19) described later. It is possible to improve the influence of the value of the pressure center movement speed in time, which is useful and should be used in the calculation, on a calculation result.

Moreover, the slip detecting unit 124 performs a slip detection calculation using the value obtained by formula (18). An arithmetic expression of this slip detection calculation is represented by formula (19).

$$Sdx(t) = \frac{\sum_{i=1}^{N} i \cdot Mdx(t, i)}{\sum_{i=1}^{N} i \cdot Cl} \quad (19)$$

$$Sdy(t) = \frac{\sum_{i=1}^{N} i \cdot Mdy(t, i)}{\sum_{i=1}^{N} i \cdot Cl}$$

In this way, a sum of pressure center speed detection calculation results obtained by weighting only useful values at timing (i=t−1, t−2, . . . , t−N) of plural samplings is used. Therefore, it is possible to calculate a useful value compared with the calculation by formula (16).

Slip detection values Sdx(t) and Sdy(t) calculated by formula (19) are amounts that represent sensor element amounts of a slip per unit time and has a characteristic that the amount increases when a slip amount increases and a direction component thereof is substantially saved. When it is desired to calculate speed as normal speed (length/time) rather than sensor element amount speed (pieces/time), if x and y in formula (4) and formula (5) are set as inter-element distances X (mm) and Y (mm) from the origin (element number x=0, y=0) rather than element numbers, normal speed (mm/s) is obtained. When it is judged that the slip detection values Sdx(t) and Sdy(t) exceed a judgment threshold, the slip detecting unit 124 detects a slip.

As described later with reference to FIGS. 27A to 27C, an extremely slow slip can also be detected by setting the number of samplings N in formula (19) large and setting threshold in formula (17) small and only an extremely fast slip can be detected by setting a value of N small and setting threshold large. Therefore, the slip detecting unit 124 can acquire plural kinds of slip detection values Sdx(t) and Sdy(t) by applying the calculation to plural N's and plural thresholds and properly use the slip detection values Sdx(t) and Sdy(t) according to a purpose of detection.

A slip detected by the slip detecting unit 124 and a direction of the slip are outputted to the main control unit 101 as information on the slip on a real time basis as described above. Consequently, the main control unit 101 can more surely detect a slip necessary in control of object gripping, manipulation, and the like of the robot hand 1 and can accurately control operations of the object gripping, manipulation, and the like.

Furthermore, the pressure center speed calculated values Vx(t, i) and Vy(t, i) are not only calculated by formula (16). For example, when fluctuation is small, as indicated by the following formula (20), it is also possible to calculate the pressure center speed calculated values Vx(t, i) and Vy(t, i) by dividing differences in the pressure center positions COPx(t) and COPy(t) accumulated in time series by differences at respective times.

$$Vx(t, i) = \frac{COPx_{MA}(t) - COPx(t - i)}{i \cdot Ts} \quad (20)$$

$$Vy(t, i) = \frac{COPy_{MA}(t) - COPy(t - i)}{i \cdot Ts}$$

The slip detection values Sdx(t) and Sdy(t) are not only calculated by formula (19). It is also possible to calculate the slip detection values Sdx(t) and Sdy(t) as described below.

For example, when fluctuation is extremely small, the slip detection values Sdx(t) and Sdy(t) are respectively calculated by setting "i" of Vx(t, i) and Vy(t, i) to 1. In other words, the slip detection values Sdx(t) and Sdy(t) are represented by the following formula (21).

$$Sdx(t) = \frac{Mdx(t, 1)}{Cl} = \frac{Kx(1)\{COPx(t) - COPx(t-1)\}}{Cl \cdot Ts} \quad (21)$$

$$Sdy(t) = \frac{Mdy(t, 1)}{Cl} = \frac{Ky(1)\{COPy(t) - COPy(t-1)\}}{Cl \cdot Ts}$$

In this case, a slow slip and a fast slip can be detected by comparing the slip detection values Sdx(t) and Sdy(t) with plural judgment thresholds. For example, a slow slip can be detected by comparing the slip detection values Sdx(t) and Sdy(t) with a small judgment threshold and a fast slip can be detected by comparing the slip detection values Sdx(t) and Sdy(t) with a large judgment threshold.

Moreover, when fluctuation is small but is not so small as described above, the slip detection values Sdx(t) and Sdy(t) can also be calculated by setting "i" of the pressure center speed calculated values vx(t, i) and vy(t, i) to N, respectively. In this case, the slip detection values Sdx(t) and Sdy(t) are represented by the following formula (22).

$$Sdx(t) = \frac{Mdx(t, N)}{Cl} = \frac{Kx(N)\{COPx(t) - COPx(t - N)\}}{Cl \cdot N \cdot Ts} \quad (22)$$
$$Sdy(t) = \frac{Mdy(t, N)}{Cl} = \frac{Ky(N)\{COPy(t) - COPy(t - N)\}}{Cl \cdot N \cdot Ts}$$

In this case, as in the above case, an extremely slow slip and an extremely fast slip can also be detected by comparing the slip detection values Sdx(t) and Sdy(t) with plural N's and plural judgment thresholds. In other words, a slow slip can be detected by setting N's large and setting the judging thresholds small and a fast slip can be detected by setting N's small and setting the judgment thresholds large.

The same holds true when a moving average of pressure center speeds is calculated. The slip detection values Sdx(t) and Sdy(t) at the time when the moving average is calculated can be calculated by setting "i" of the pressure center speed calculated values Vx(t, i) and Vy(t, i) to 1, respectively, and can also be calculated by setting "i" of the pressure center speed calculated values vx(t, i) and vy(t, i) to N, respectively. In other words, the slip detection values Sdx(t) and Sdy(t) calculated by setting "i" of the pressure center speed calculated values Vx(t, i) and Vy(t, i) at the time when the moving average is calculated to 1 are represented by the following formula (23) and the slip detection values Sdx(t) and Sdy(t) calculated by setting "i" of the pressure center speed calculated values Vx(t, i) and Vy(t, i) at the time when the moving average is calculated to N are represented by the following formula (24):

$$Sdx(t) = \frac{Mdx(t, 1)}{Cl} = \frac{Kx(1)\{COPx_{MA}(t) - COPx_{MA}(t - 1)\}}{Cl \cdot Ts} \quad (23)$$
$$Sdy(t) = \frac{Mdy(t, 1)}{Cl} = \frac{Ky(1)\{COPy_{MA}(t) - COPy_{MA}(t - 1)\}}{Cl \cdot Ts}$$

$$Sdx(t) = \frac{Mdx(t, N)}{Cl} = \frac{Kx(N)\{COPx_{MA}(t) - COPx_{MA}(t - N)\}}{Cl \cdot N \cdot Ts} \quad (24)$$
$$Sdy(t) = \frac{Mdy(t, N)}{Cl} = \frac{Ky(N)\{COPy_{MA}(t) - COPy_{MA}(t - N)\}}{Cl \cdot N \cdot Ts}$$

In the former case (i.e., when the slip detection values Sdx(t) and Sdy(t) are calculated by setting "i" of the pressure center speed calculated values Vx(t, i) and Vy(t, i) at the time when the moving average is calculated to 1), as in the above case, as low slip and a fast slip can be detected by comparing the slip detection values Sdx(t) and Sdy(t) with plural judgment thresholds. For example, a slow slip can be detected by comparing the slip detection values Sdx(t) and Sdy(t) with a small judgment threshold and a fast slip can be detected by comparing the slip detection values Sdx(t) and Sdy(t) with a large judgment threshold.

In the latter case (i.e., when the slip detection values Sdx(t) and Sdy(t) are calculated by setting "i" of the pressure center speed calculated values Vx(t, i) and Vy(t, i) at the time when the moving average is calculated to N), as in the above case, an extremely slow slip and an extremely fast slip can be detected by comparing the slip detection values Sdx(t) and Sdy(t) with plural N's and plural judgment thresholds. In other words, a slow slip can be detected by setting N's large and setting the judgment thresholds small and a fast slip can be detected by setting N's small and setting the judgment thresholds large.

Figure 10:
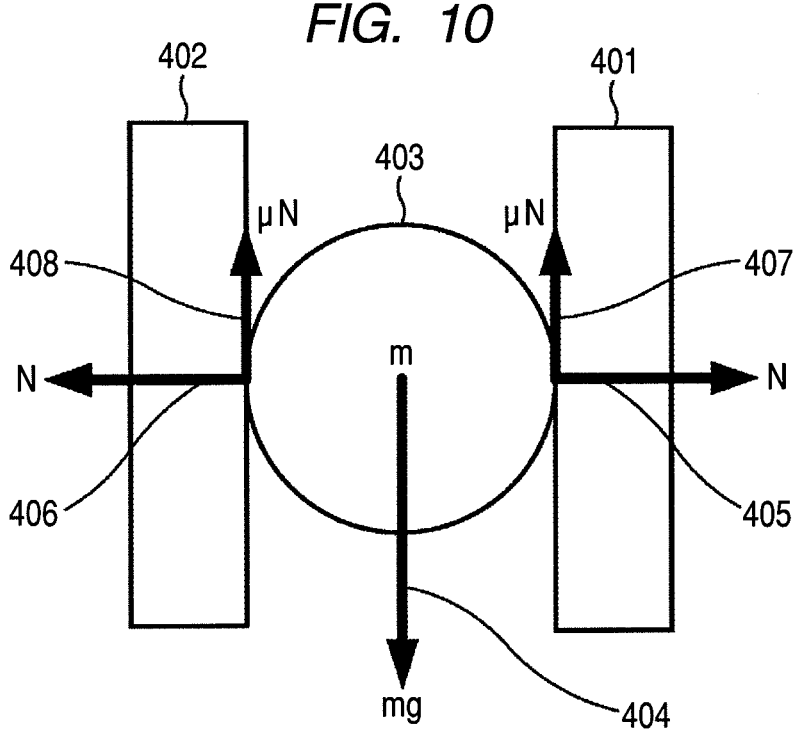
FIG. 10 is a diagram for explaining grip of an object that comes to rest.

FIG. 10 is a diagram showing a state in which fingers 401 and 402 of the robot hand 1 grip an object 403 as a gripping target from an upper side without causing the object 403 to slip. Reference numeral 404 denotes the gravity applied to the gripping target object 403. Reference numerals 405 and 406 denote reactions (vertical resistances) of gripping force applied to the fingers 401 and 402 when the fingers 401 and 402 grip the gripping target object 403. Reference numerals and 408 denote static frictional forces generated between the fingers 401 and 402 and the gripping target object 403. μ is a coefficient of static friction between the fingers 401 and 402 and the gripping target object 403.

A formula of the balance realizing the rest of the object 403 is represented as the following formula:

$$0 = mg - 2\mu N \quad (25)$$

Gripping force Fy at this point is determined such that reaction N satisfies the following formula.

$$Fy = N \geq mg/2\mu \quad (26)$$

Figure 11:
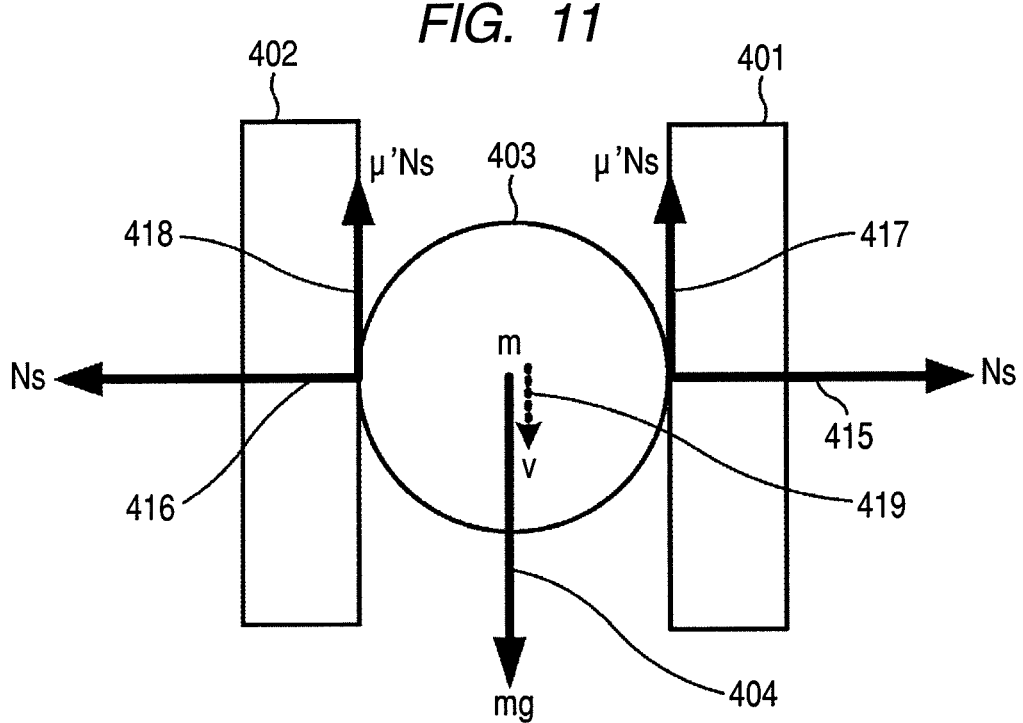
FIG. 11 is a diagram for explaining grip of a slipping object.

FIG. 11 is a diagram showing a state in which the fingers and 402 grip the gripping target object 403 from an upper side while causing the object 403 to slip. Reference numeral denotes the gravity applied to the gripping target object 403. Reference numerals 415 and 416 denote reactions (vertical resistances) applied to the fingers 401 and 402 when the fingers 401 and 402 grip the gripping target object 403. Reference numeral 417 and 418 denote dynamic frictional forces generated between the fingers 401 and 402 and the gripping target object 403. Reference numeral 419 denotes speed of a slip of the gripping target object 403. μ' is a coefficient of dynamic friction between the fingers 401 and 402 and the gripping target object 403.

An equation of motion is represented as follows:

$$m\dot{v} = mg - 2\mu' N_S \quad (27)$$

When it is desired to reduce slipping speed v to 0 as quickly as possible in order to stop a slip, as it is evident from formula (27), a value of reaction Ns is set as large as possible and a value on the right side of formula (27) is set to a negative value. The slipping speed v is reduced to 0 more quickly as the value on the right side is smaller. In other words, for the purpose of stopping a slip, the slip can be stopped if gripping force of fingers is controlled to immediately apply maximum gripping force when the slip is detected.

However, when the maximum gripping force is applied, if the maximum gripping force is applied from the beginning, it is possible to grip an object without causing the object to slip as much as possible. When the maximum gripping force is applied only when the fingers grip the object, it is unnecessary to detect a slip. Therefore, it is hardly necessary to use a slip sensor.

To stop a slip, the gripping force Fy is determined such that the reaction Ns (equal to the gripping force Fy) satisfies the following formula:

$$Fy = Ns \geq mg/2\mu' \quad (28)$$

In general, since μ is equal to or larger than μ', the following formula holds:

$$mg/2\mu' \geq mg/2\mu \quad (29)$$

When the gripping force Ns and the gripping force N are set to necessary minimum forces, the following formula holds:

$$Ns \geq N \quad (30)$$

As it is evident from formula (30), the minimum gripping force N obtained by reducing gripping force as much as possible not to cause the object to slip is smaller than the minimum gripping force Ns generated to stop a slip. In other words, in order to grip the object with minimum force, it is necessary to reduce gripping force while keeping a state in which the object does not slip. In order to grip the object with minimum force after the object slips, it is necessary to first increase gripping force not to cause the object to slip and, after stopping a slip, reduce the gripping force while keeping a state in which the object does not slip.

Figure 12A:
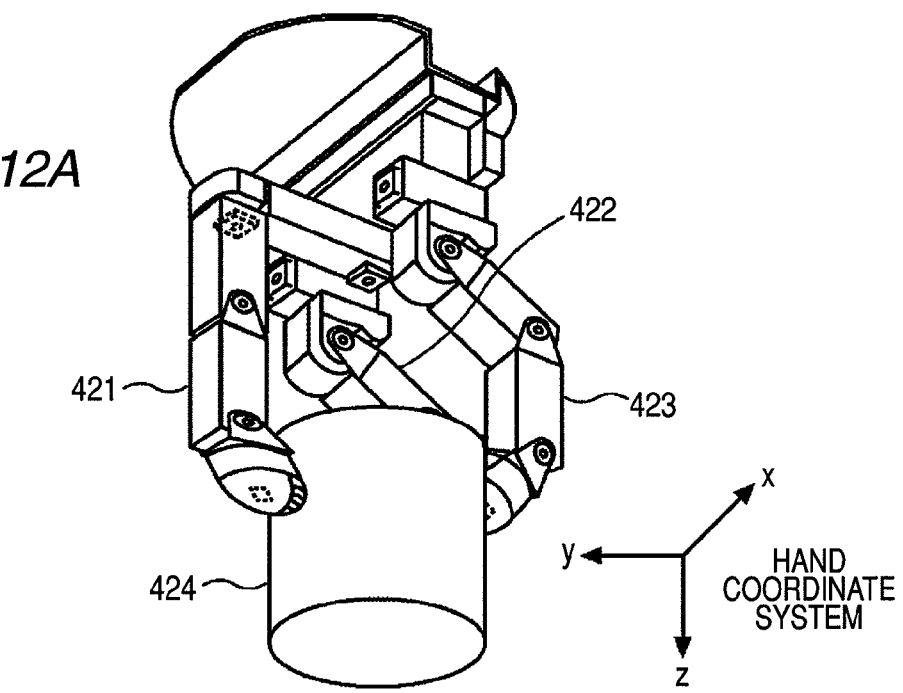
FIGS. 12A and 12B are diagrams for explaining grip of an object.
Figure 12B:
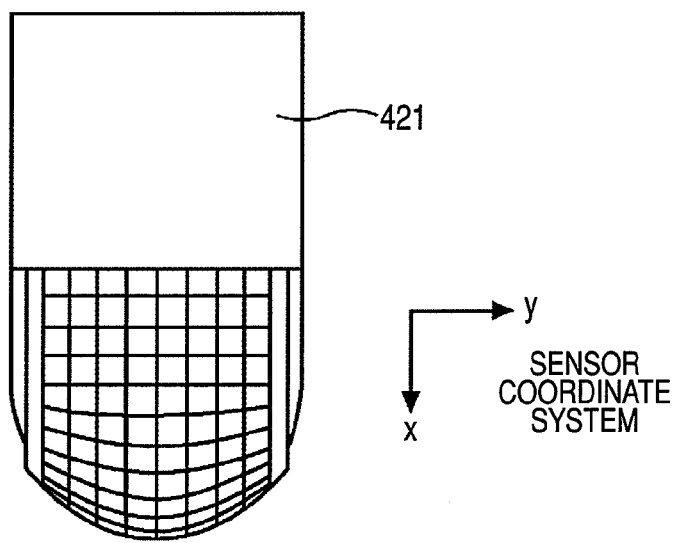

As shown in FIGS. 12A and 12B, when control for bringing fingers 421, 422, and 423 into contact with an object 424 and causing the object 424 to slip is performed by using force control, the control is performed by using a value represented by the following formulas as a force command value.

$$ref_{Fy}(t) = ref_{Fy}(t-1) + chg_{Fy}(t) \tag{31}$$

$$chg_{Fy}(t) = \sum_{i=0}^{N_f} G_{xi} \cdot f_i(t) \cdot \{|Sdx_i(t)| - |ref_{sdx_i}|\} + \sum_{i=0}^{N_f} G_{yi} \cdot f_i(t) \cdot \{|Sdy_i(t)| - |ref_{sdy_i}|\} \tag{32}$$

In the formulas, $ref_{Fy}(t)$ represents a command value (finger tip resisting force) of gripping force Fy in a y direction of a hand coordinate system in FIG. 12A and $chg_{Fy}(t)$ represents a change value of the command value Fy. The change value $chg_{Fy}(t)$ has a function of setting the command value $ref_{Fy}(t)$ to the magnitude for resting an object (at this point, a target slip detection value is set to 0). The change value $chg_{Fy}(t)$ also has a function of causing an object to slip in a direction of external force (usually, the gravity) usable when the object is caused to slip (at this point, the target slip detection value is set to speed at which the object is desired to be caused to slip or a movement value with which the object is desired to be caused to slip. The selection of the speed or the movement value depends on whether slip detection is performed by using speed (formula (19)) or a movement value (formula (10)).

In formula (32), "i" represent a number of a finger, $N_f$ represents a finger number that is smaller than the number of fingers by one, $G_{xi}$ and $G_{yi}$ represent coefficients, $Sdx_i(t)$ and $Sdy_i(t)$ represent slip detection values of an x coordinate and a y coordinate in a sensor coordinate system for each of the fingers, and $ref_{Sdxi}$ and $ref_{Sdyi}$ represent target slip detection values for each of the fingers. The target slip values $ref_{Sdxi}$ and $ref_{Sdyi}$ are not independently determined but are components that depend on a direction of the external force used in causing the object to slip. For example, when a sensor coordinate system is defined as shown in FIG. 12B, a posture of fingers is as shown in the figure, and a direction of the center of gravity as the external force applied to the gripping object 424 is set in a plus direction of x in the sensor coordinate system (a downward direction in FIG. 12B), $ref_{Sdyi}$ is 0. $f_i(t)$ represents normal force on a contact surface of a sensor obtained from a distributed pressure sensor and is represented by the following formula:

$$f_i(t) = \sum_{y=0}^{n-1} \sum_{x=0}^{m-1} P_{ci}(x, y) \times S_i(x, y) \tag{33}$$

In the formula, $Pc_i(x, y)$ represents a pressure value of each of the sensor elements 52 of each of the fingers with the number "i". $Si(x, y)$ represents an area of each of the sensor elements of each of the fingers.

In formula (32), the coefficients $G_{xi}$ and $G_{yi}$ and the normal force $f_i(t)$ are positive. Therefore, when absolute values of the slip detection values $Sdx_i(t)$ and $Sdy_i(t)$ are smaller than absolute values of the target slip detection values $ref_{Sdxi}$ and $ref_{Sdyi}$, respectively, the change value $chg_{Fy}(t)$ is negative. In this case, as it is evident from formula (31), the command value $ref_{Fy}(t)$ of the gripping force Fy decreases to be smaller than the previous command value $ref_{Fy}(t-1)$. Conversely, when the absolute values of the slip detection values $Sdx_i(t)$ and $Sdy_i(t)$ are larger than the absolute values of the target slip detection values $ref_{Sdxi}$ and $ref_{Sdyi}$, respectively, the change value $chg_{Fy}(t)$ is positive. The command value $ref_{Fy}(t)$ of the force Fy increases to be larger than the previous command value $ref_{Fy}(t-1)$.

In the slip control, the slip detection values $Sdx_i(t)$ and $Sdy_i(t)$ and the target slip detection values $ref_{Sdxi}$ and $ref_{Sdyi}$ only have to be used as deviations. The control system may be any control system.

Moreover, it is necessary adjust the command value $ref_{Fy}(t)$ of the gripping force Fy taking into account the balance of forces for each of the fingers. When the object 424 is gripped by two fingers opposed to each other, command values of the two fingers may be the same. However, for example, when one finger (the thumb) and two fingers (the index finger and the middle finger) of three fingers are opposed to each other, the command value $ref_{Fy}(t)$ of the gripping force Fy of the index finger and the middle finger may be a half of a command value of the thumb.

When the object 424 is controlled not to be caused to slip (controlled to rest), the target slip detection values $ref_{Sdxi}$ and $ref_{Sdyi}$ are set to 0 in formula (32). In this case, when the slip detection values $Sdx_i(t)$ and $Sdy_i(t)$ are other than 0, the change value $chg_{Fy}(t)$ is positive and the command value $ref_{Fy}(t)$ of the gripping force Fy increases to be larger than the previous command value $ref_{Fy}(t-1)$. The change value $chg_{Fy}$ of the gripping force is larger as values of the slip detection values $Sdx_i(t)$ and $Sdy_i(t)$ are larger. Even when the same slip detection values $Sdx_i(t)$ and $Sdy_i(t)$ are obtained, the change value $chg_{Fy}$ of the gripping force is larger as the present gripping force (the normal force $f_i(t)$) is larger. Therefore, an increase in the gripping force is large when the slip detection values $Sdx_i(t)$ and $Sdy_i(t)$ are large (when the object slips fast). An increase in the gripping force is small when the slip detection values $Sdx_i(t)$ and $Sdy_i(t)$ are small (when the object slips slowly). It is possible to determine appropriate gripping force according to speed.

Gripping force suppression control is described. The gripping force suppression control is control performed for reducing gripping force to a minimum value on the basis of the fact that an object does not slip while being gripped. In other words, the control is performed after the object 424 is controlled to not to slip (controlled to rest). The control is performed when the change value $chg_{Fy}$ of the gripping force Fy is equal to or smaller than a fixed level, i.e., when the change value $chg_{Fy}(t)$ is smaller than a threshold $Th_{chg}$. In this case, the command value $ref_{Fy}(t)$ is represented by the following formulas:

$$ref_{Fy}(t) = ref_{Fy}(t-1) + chg_{Fy}(t) + sp_{Fy}(t) \quad (34)$$

$$Sdx_{iMA}(t) = \frac{1}{M}\sum_{k=0}^{M-1}|Sdx_i(t-k)| \quad (35)$$

$$Sdy_{iMA}(t) = \frac{1}{M}\sum_{k=0}^{M-1}|Sdy_i(t-k)|$$

$$sp_{Fy}(t) = \begin{cases} \sum_{i=0}^{N} Gsp_{xi} \cdot f_i(t) \cdot \\ \{Sdx_{iMA}(t) - |Th_{sdx_i}|\} + & Sdx_{iMA}(t) \le \alpha|Th_{sdx_i}| \\ \sum_{i=0}^{N} Gsp_{yi} \cdot f_i(t) \cdot & : \quad Sdy_{iMA}(t) \le \alpha|Th_{sdy_i}| \\ \{Sdy_{iMA}(t) - |Th_{sdy_i}|\} \\ 0: & \text{besides the above.} \end{cases} \quad (36)$$

In the formulas, $sp_{Fy}(t)$ represents gripping force suppression value and has a function of setting the command value $ref_{Fy}(t)$ to minimum magnitude necessary for resting an object. $Sdx_{iMA}(t)$ and $Sdy_{iMA}(t)$ represent moving averages of the slip detection values $Sdx_i(t)$ and $Sdy_i(t)$. $Gsp_{xi}$ and $Gsp_{yi}$ represent coefficients. M represents the number of times of moving averaging. $Th_{Sdxi}$ and $Th_{Sdyi}$ represent thresholds of a gripping force suppressed slip moving average. The change value $chg_{Fy}(t)$ is a value calculated by formula (32). However, when the minimum magnitude is calculated, it is necessary to rest the object. Therefore, the target slip detection values $ref_{Sdxi}$ and $ref_{Sdyi}$ are set to 0.

In formula (36), the coefficients $Gsp_{xi}$ and $Gsp_{yi}$ and the normal force $f_i(t)$ are positive values. As it is evident from formula (35), the moving averages $Sdx_{iMA}(t)$ and $Sdy_{iMA}(t)$ are also positive values. In formula (36), when a coefficient $\alpha$ multiplied with absolute values of the thresholds $Th_{Sdxi}$ and $Th_{Sdyi}$ is set to 1, the moving averages $Sdx_{iMA}(t)$ and $Sdy_{iMA}(t)$ are equal to or smaller than the absolute values of the thresholds $Th_{Sdxi}$ and $Th_{Sdyi}$. Therefore, differences between the moving averages $Sdx_{iMA}(t)$ and $Sdy_{iMA}(t)$ and the absolute values of the thresholds $Th_{Sdxi}$ and $Th_{Sdyi}$ are 0 or negative. Therefore, the gripping force suppression value $sp_{Fy}(t)$ is basically a negative value (a value equal to or smaller than 0).

As a result, as it is evident from formula (34), the suppression value $SP_{Fy}(t)$ functions to set a value of the command value $ref_{Fy}(t)$ to a value equal to or smaller than the previous command value $ref_{Fy}(t-1)$. In other words, controlling the gripping force Fy on the basis of the command value $ref_{Fy}(t)$ of formula (34) means controlling the gripping force Fy to be a small value. However, when the moving averages $Sdx_{iMA}(t)$ and $Sdy_{iMA}(t)$ are equal to the absolute values of the thresholds $Th_{Sdxi}$ and $Th_{Sdyi}$, i.e., a slip in a broad sense (more strictly, the initial local slip and shift for preventing a predicted slip in a narrow sense) is sufficiently small, the gripping force suppression value $sp_{Fy}(t)$ is set to 0. Therefore, the gripping force Fy is not set to a value smaller than the gripping force suppression value $sp_{Fy}(t)$. As a result, the gripping force Fy is set to a minimum value necessary for resting the object.

The coefficient $\alpha$ is set to a small number (e.g., 1.5) equal to or larger than 1 and equal to or smaller than 2. Consequently, the suppression value $sp_{Fy}(t)$, which is basically negative, is allowed to take a slightly positive value. This is because, in control, when an output follows a target value in general, the output does not completely coincide with the target value and fluctuates near the target value. In this case, when the gripping force is reduced to minimum force with which the object does not slip, the suppression value $sp_{Fy}(t)$ takes a value near 0. Therefore, the suppression value $sp_{Fy}(t)$ is allowed to take a slightly positive value.

The gripping force suppression control needs to be performed more slowly than control for increasing the gripping force. Therefore, as indicated by formula (35), the moving averages $Sdx_{iMA}(t)$ and $Sdy_{iMA}(t)$ of the absolute values of the slip detection values $Sdx_i(t)$ and $Sdy_i(t)$ are calculated and changed to signals with small fluctuation. Then, the signals are used in formula (36). However, it is also possible to obtain signals with small fluctuation using a low-pass filter or the like.

As it is evident from formula (34), the gripping force increases when a sum of the change value $chg_{Fy}(t)$ and the suppression value $SP_{Fy}(t)$ is positive, the gripping force suppression works when the sum of the change value $chg_{Fy}(t)$ and the suppression value $sp_{Fy}(t)$ is negative, and an increase or decrease in the gripping force is 0 and the gripping force is stabilized when the sum of the change value $chg_{Fy}(t)$ and the suppression value $sp_{Fy}(t)$ is 0.

Figure 13:
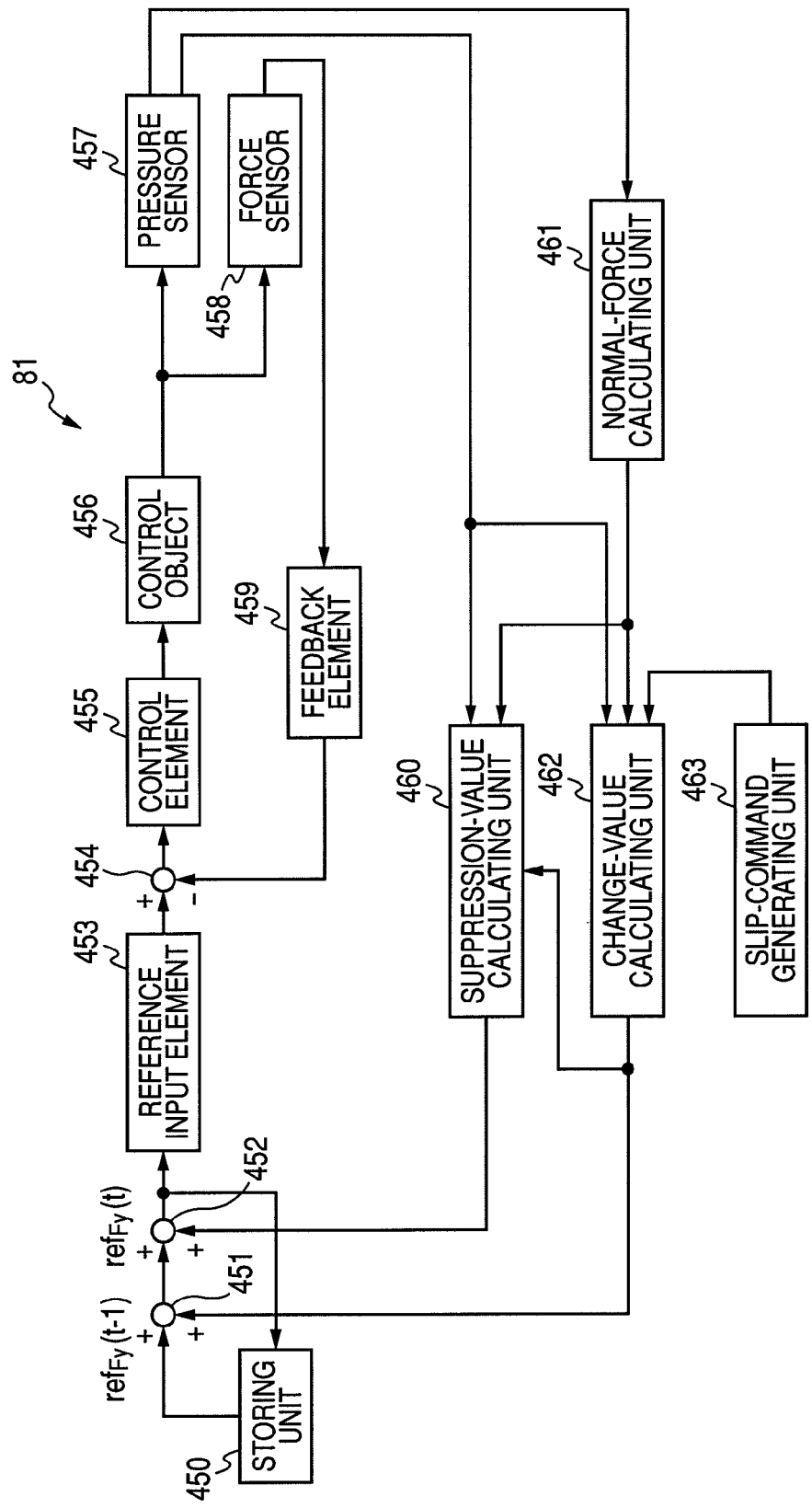
FIG. 13 is a block diagram showing the structure of an example of a control system for the control device.

The structure of an example of a control system of the control device 81 that controls, by determining gripping force according to formula (31) and formula (34), the gripping force to grip an object with minimum gripping force of a degree of not causing the object to slip is shown in FIG. 13.

The control device 81 includes a storing unit 450, adding units 451 and 452, a reference input element 453, a subtracting unit 454, a control object 456, a pressure sensor 457, a force sensor 458, a feedback element 459, a suppression-value calculating unit 460, a normal-force calculating unit 461, a change-value calculating unit 462, and a slip-command generating unit 463. The reference input element 453, the subtracting unit 454, the control object 456, the force sensor 458, and the feedback element 459 configure a force control system.

The storing unit 450 stores the command value $ref_{Fy}(t)$ outputted from the adding unit 452 and outputs, at the next timing, the command value $ref_{Fy}(t)$ to the adding unit 451 as the command value $ref_{Fy}(t-1)$ at the previous timing. The adding unit 451 adds up the previous command value $ref_{Fy}(t-1)$ and the change value $chg_{Fy}$ outputted by the change-value calculating unit 462 and outputs a result of the addition to the adding unit 452. The adding unit 452 adds up the output of the adding unit 451 and the suppression value $sp_{Fy}$ outputted by the suppression-value calculating unit 460, generates the command value $ref_{Fy}(t)$, and outputs the command value $ref_{Fy}(t)$ to the referenced input element 453.

The reference input element 453 converts the command value $ref_{Fy}(t)$ from the adding unit 452 into a command value corresponding to the control element 455 and outputs the command value to the subtracting unit 454. The subtracting unit 454 subtracts an output of the feedback element 459 from the output of the reference input element 453 and outputs a result of the subtraction to the control element 455. The control element 455 converts the output of the subtracting unit 454 into a control signal and drives the control object 456. The control object 456 is driven and acts on the object.

The pressure sensor 457 and the force sensor 458 as detecting means for detecting a slip of the object and outputting a slip detection value detect pressure and force acting on the object, respectively. The force detected by the force sensor 458 is fed back to the subtracting unit 454 via the feedback element 459.

The pressure sensor 457 corresponds to the sensor 21 and has the same structure. The signal processing unit 53 shown in FIG. 7 of the pressure sensor 457 outputs the detected slip detection values $Sdx_i(t)$ and $Sdy_i(t)$ to the suppression-value calculating unit 460 and the change-value calculating unit 462. The normal-force calculating unit 461 calculates a sum of products of pressure values $Pc_i(x, y)$ and areas $S_i(x, y)$ of the respective sensor elements 52 of the pressure sensor 457 according to formula (33) to calculate the normal force $f_i(t)$ (equal to gripping force) and outputs the normal force $f_i(t)$ to the suppression-value calculating unit 460 and the change-value calculating unit 462.

The suppression-value calculating unit 460 as suppression-value calculating means for calculating, on the basis of a slip detection value, a suppression value for suppressing a command value, which sets gripping force for an object, to necessary minimum magnitude for resting the object calculates the suppression value $sp_{Fy}(t)$ on the basis of the slip detection values $Sdx_i(t)$ and $Sdy_i(t)$ from the pressure sensor 457, the normal force $f_i(t)$ from the normal-force calculating unit 461, and the change value $chg_{Fy}(t)$ of the change-value calculating unit 462 and outputs the suppression value $sp_{Fy}(t)$ to the adding unit 452. The change-value calculating unit 462 calculates the change value $chg_{Fy}(t)$ on the basis of the slip detection values $Sdx_i(t)$ and $Sdy_i(t)$ from the pressure sensor 457, the normal force $f_i(t)$ from the normal-force calculating unit 461, and a command from the slip-command generating unit 463 and outputs the change value $chg_{Fy}(t)$ to the adding unit 451 and the suppression-value calculating unit 460.

The behavior of the suppression-value calculating unit 460 changes according to the change value $chg_{Fy}(t)$ from the change-value calculating unit 462 as change-value calculating means for calculating, on the basis of a slip detection value, a change value for changing a command value, which sets gripping force for an object, to magnitude for resting the object. When the change value $chg_{Fy}(t)$ is smaller than the threshold $Th_{chg}$, a calculation of the suppression value $SP_{Fy}(t)$ for reducing the gripping force is executed. When the change value $chg_{Fy}(t)$ is larger than the threshold $Th_{chg}$, since it is necessary to stop a slip, the calculation for reducing the gripping force is not performed.

Figure 14:
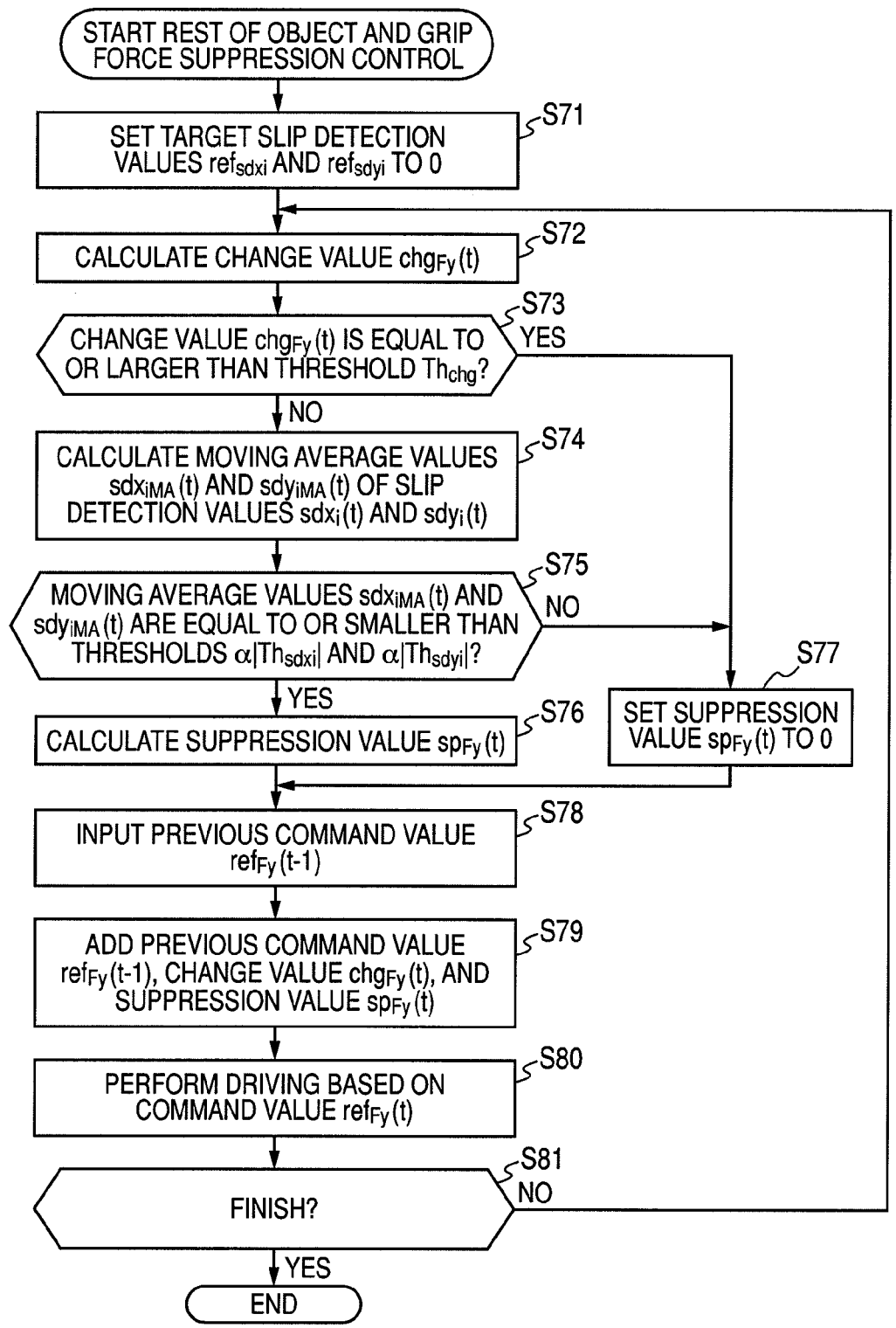
FIG. 14 is a flowchart for explaining control processing.

Control processing performed by the control device 81 that controls gripping of an object is explained with reference to a flowchart shown in FIG. 14.

In step S71, the change-value calculating unit 462 sets, on the basis of an input from the slip-command generating unit 463, the target slip detection values $ref_{Sdxi}$ and $ref_{Sdyi}$ for calculating the change value $chg_{Fy}(t)$ in formula (32) to 0.

In step S72, the change-value calculating unit 462 calculates the change value $chg_{Fy}(t)$ according to formula (32). Therefore, the target slip detection values $ref_{Sdxi}$ and $ref_{Sdyi}$ (in the present case, 0), the normal force $f_i(t)$, and the slip detection values $Sdx_i(t)$ and $Sdy_i(t)$ from the slip-command generating unit 463, the normal-force calculating unit 461, and the pressure sensor 457, respectively. The coefficients $G_{xi}$ and $G_{yi}$ are stored in the change-value calculating unit 462 in advance.

In step S73, the suppression-value calculating unit 460 judges whether the change value $chg_{Fy}(t)$ calculated by the change-value calculating unit 462 in step S72 is equal to or larger than the threshold $Th_{chg}$. When the change value $chg_{Fy}(t)$ is equal to or larger than the threshold $Th_{chg}$, since the object has not rested yet, in step S77, the suppression-value calculating unit 460 sets the suppression value $sp_{Fy}(t)$ to 0. In other words, control for resting the object is performed.

When it is judges in step S73 that the change value $chg_{Fy}(t)$ is not equal to or larger than the threshold $Th_{chg}$, in step S74, the suppression-value calculating unit 460 calculates, according to formula (35), the moving averages $Sdx_{iMA}(t)$ and $Sdy_{iMA}(t)$ of the slip detection values $Sdx_i(t)$ and $Sdy_i(t)$ supplied from the pressure sensor 457. In step S75, the suppression-value calculating unit 460 judges whether the moving averages $Sdx_{iMA}(t)$ and $Sdy_{iMA}(t)$ are equal to or smaller than thresholds $\alpha^*|Th_{Sdxi}|$ and $\alpha^*|Th_{Sdyi}|$. In other words, the suppression-value calculating unit 460 judges whether a conditional expression of formula (36) is satisfied.

When the moving averages $Sdx_{iMA}(t)$ and $Sdy_{iMA}(t)$ are not equal to or smaller than thresholds $\alpha^*|Th_{Sdxi}|$ and $\alpha^*|Th_{Sdyi}|$, since the condition is not satisfied, in step S77, the suppression-value calculating unit 460 sets the suppression value $sp_{Fy}(t)$ to 0. Consequently, control for resting the object is performed.

In other words, after the processing in step S77, in step S78, the adding unit 451 is inputted with the command value $ref_{Fy}(t-1)$ at the previous timing from the storing unit 450. In step S79, processing for adding up the previous command value $ref_{Fy}(t-1)$, the change value $chg_{Fy}(t)$, and the suppression value $SP_{Fy}(t)$ to calculate the command value $ref_{Fy}(t)$ is performed. Specifically, the adding unit 451 adds up the previous command value $ref_{Fy}(t-1)$ inputted in the processing in step S78 and the change value $chg_{Fy}(t)$ calculated in the processing in step S72. Moreover, the adding unit 452 adds the suppression value $sp_{Fy}(t)$ set in step S77 to the added-up value. Consequently, the command value $ref_{Fy}(t)$ is calculated. In other words, the adding unit 451 and the adding unit 452 configure setting means for setting the magnitude of the command value $ref_{Fy}(t)$ on the basis of the change value $chg_{Fy}(t)$ and the suppression value $sp_{Fy}(t)$.

In step S80, the reference input element 453 performs driving based on the command value $ref_{Fy}(t)$. In other words, the reference input element 453 supplies the command value $ref_{Fy}(t)$ to the subtracting unit 454. The subtracting unit 454 subtracts the force detected by the force sensor 458, which is fed back from the feedback element 459, from the command value $ref_{Fy}(t)$ and outputs a difference thereof to the control element 455. The control element 455 converts the difference into a control signal and drives the control object 456. Consequently, in this case, the gripping for the object is decreased by the change value $chg_{Fy}(t)$.

A state of the gripping of the object by the control object 456 is detected by the pressure sensor 457 and the force sensor 458. The pressure sensor 457 outputs the slip detection values $Sdx_i(t)$ and $Sdy_i(t)$ to the suppression-value calculating unit 460 and the change-value calculating unit 462 as a detection result. The normal-force calculating unit 461 calculates, according to formula (33), the normal force $f_i(t)$ using a sum of products of the pressure values $Pc_i(x, y)$ and the areas $S_i(x, y)$ of the respective sensor elements 52 of the pressure sensor 457 and outputs the normal force $f_i(t)$ to the suppression-value calculating unit 460 and the change-value calculating unit 462.

In step S81, the suppression-value calculating unit 460 and the change-value calculating unit 462 judge whether the processing should be finished and repeat the processing in steps S72 to S75 and steps S77 to S80 or the processing in step S72, step S73, and steps S77 to S80 until it is judged that the processing should be finished.

As a result, the object is controlled to rest.

On the other hand, when it is judged in step S75 that the moving averages $Sdx_{iMA}(t)$ and $Sdy_{iMA}(t)$ are equal to or smaller than thresholds $\alpha^*|Th_{Sdxi}|$ and $\alpha^*|Th_{Sdyi}|$, since the condition of formula (36) is satisfied (the object has rested), processing for controlling the gripping force to a minimum value is performed. In other words, in step S76, the suppression-value calculating unit 460 calculates the suppression value $sp_{Fy}(t)$ according to formula (36). Therefore, the coefficients $Gsp_{xi}$ and $Gspyi$ and the thresholds $\alpha^*|Th_{Sdxi}|$ and $\alpha^*|Th_{Sdyi}|$ are stored in the suppression-value calculating unit 460 in advance. Besides, the normal force $f_i(t)$ is supplied to the suppression-value calculating unit 460 from the normal-force calculating unit 461. The moving averages $Sdx_{iMA}(t)$ and $Sdy_{iMA}(t)$ are calculated by the suppression-value calculating unit 460 according to formula (35) from the slip detection values $Sdx_i(t)$ and $Sdy_i(t)$ supplied from the pressure sensor 457.

Thereafter, in step S79, processing for adding up the previous command value $ref_{Fy}(t-1)$, the change value $chg_{Fy}(t)$, and the suppression value $sp_{Fy}(t)$ to calculate the command value $ref_{Fy}(t)$ is performed. Specifically, the adding unit 451 adds up the previous command value $ref_{Fy}(t-1)$ inputted in the processing in step S78 and the change value $chg_{Fy}(t)$ calculated in the processing in step S72. Moreover, the adding unit 452 adds the suppression value $SP_{Fy}(t)$ calculated in step S76 to the added-up value. Consequently, the command value $ref_{Fy}(t)$ is calculated.

In step S80, the reference input element 453 performs driving based on the command value $ref_{Fy}(t)$. In other words, the reference input element 453 supplies the command value $ref_{Fy}(t)$ to the subtracting unit 454. The subtracting unit 454 subtracts the force detected by the force sensor 458, which is fed back from the feedback element 459, from the command value $ref_{Fy}(t)$ and outputs a difference thereof to the control element 455. The control element 455 converts the difference into a control signal and drives the control object 456. Consequently, in this case, the gripping for the object is increased by the suppression value $sp_{Fy}(t)$.

A state of the gripping of the object by the control object 456 is detected by the pressure sensor 457 and the force sensor 458. The pressure sensor 457 outputs the slip detection values $Sdx_i(t)$ and $Sdy_i(t)$ to the suppression-value calculating unit 460 and the change-value calculating unit 462 as a detection result. The normal-force calculating unit 461 calculates, according to formula (33), the normal force $f_i(t)$ using a sum of products of the pressure values $Pc_i(x, y)$ and the areas $S_i(x, y)$ of the respective sensor elements 52 of the pressure sensor 457 and outputs the normal force $f_i(t)$ to the suppression-value calculating unit 460 and the change-value calculating unit 462.

In step S81, the suppression-value calculating unit 460 and the change-value calculating unit 462 judge whether the processing should be finished and repeat the processing in steps S72 to S76 and steps S78 to S80 until it is judged that the processing should be finished.

As described above, the gripping force in the state in which the object is gripped to rest is controlled to be a minimum value.

As a result, the object is gripped with gripping force of minimum magnitude for not causing the object to slip. Consequently, a situation in which the gripping force increases to magnitude larger than necessary and energy is wastefully consumed is suppressed. The object can be gripped without being broken. Even an easily-deformable object can be gripped without being deformed. Moreover, a satisfactory interface with humans can be realized.

Figure 15:
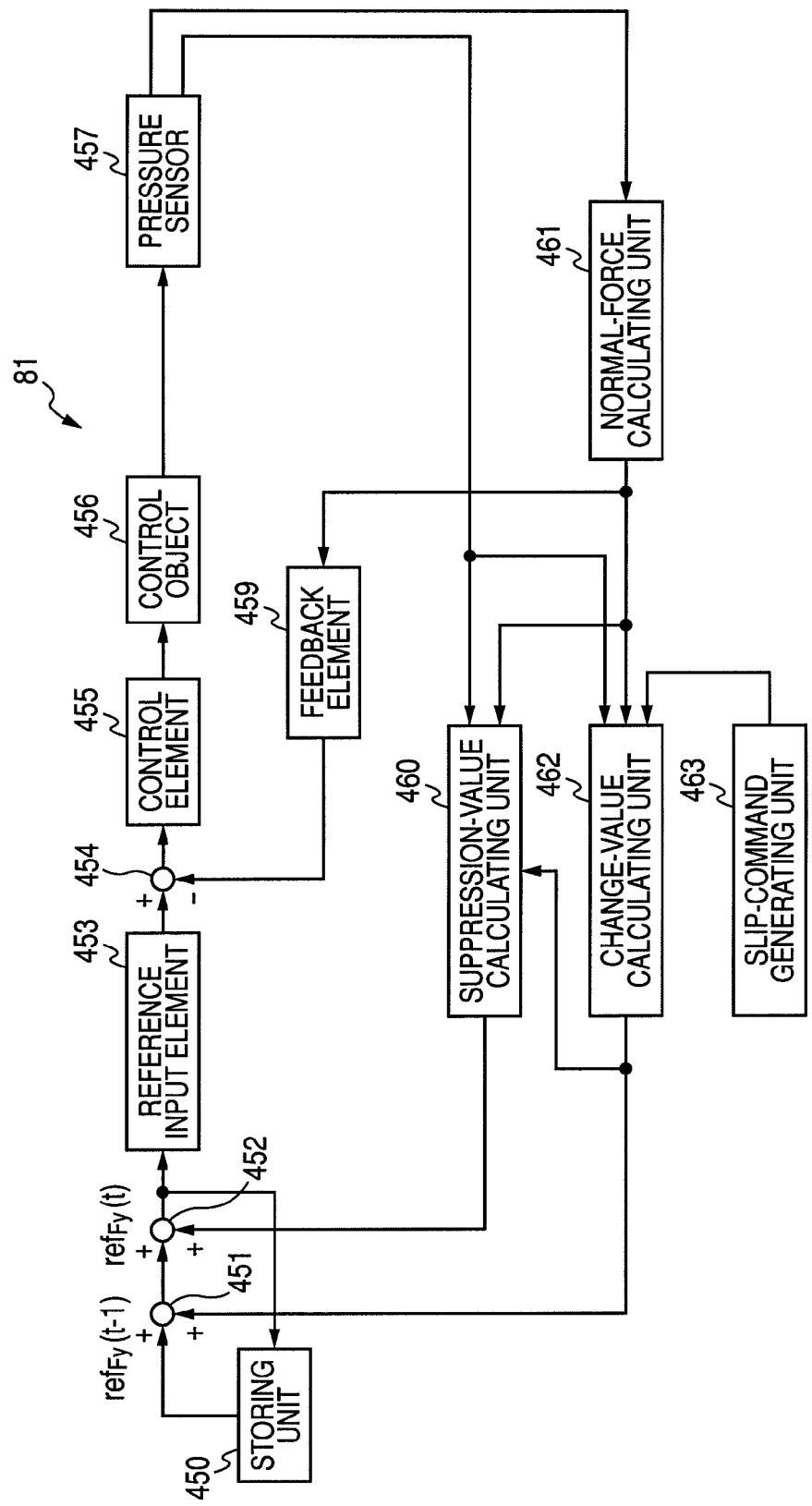
FIG. 15 is a block diagram showing the structure of another example of the control system for the control device.

FIG. 15 shows another example of the structure of the control device 81 different from that shown in FIG. 13. In this example, force is acquired by the pressure sensor 457 and force control is performed on the basis of the force. The force sensor 458 shown in FIG. 13 is not provided. The normal force outputted by the normal-force calculating unit 461 is fed back to the subtracting unit 454 via the feedback element 459. The other components are the same as those shown in FIG. 13.

In this example, operations same as those in FIG. 13 can be executed.

The sensor 21 (which is also the pressure sensor 457) is further explained.

Figure 16A:
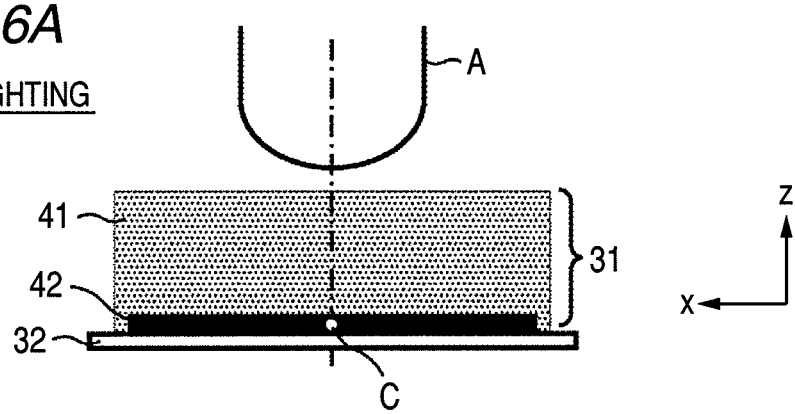
FIGS. 16A and 16B are sectional views for explaining deformation of a deforming section at the time when the deforming section is pressed by a finger.
Figure 16B:
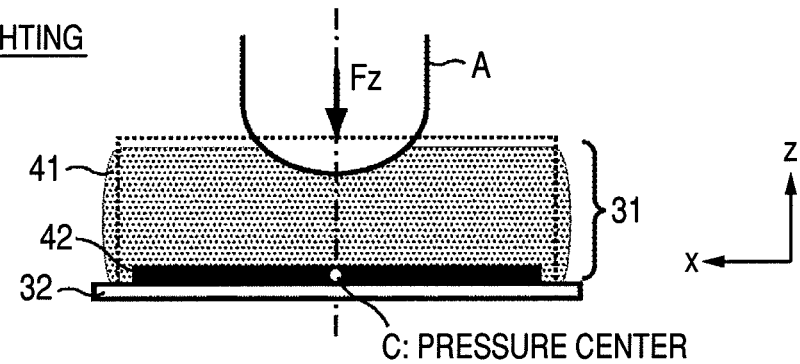

FIGS. 16A and 16B show a change in a shape of the input section 31 before weighting (FIG. 16A) and after weighting (FIG. 16B). In FIGS. 16A and 16B, a left direction in the figure represents a plus direction in an x axis of an xyz coordinate system and an upward direction in the figure represents a plus direction on a z axis.

As described above, the input section 31 includes the deforming section 41 of the viscoelastic body and the pressure detecting section 42. Therefore, the input section 31 can be easily deformed into various shapes by a load from the outside.

A boundary between the deforming section 41 and the pressure detecting section 42 and a boundary between the pressure detecting section 42 and the fixed section 32 are formed as binding surfaces and fastened by bonding or integral molding. Therefore, as shown in FIG. 16B, when a load Fz in a minus direction on the z axis (a downward direction in the figure) is applied to the input section 31 according to the depression of the input section 31 by a finger A or the like, a phenomenon due to incompressibility equivalent to that of a rubber material occurs. In other words, a state before application of pressure changes to a state in which a part of the sides and the upper surface expands but a volume does not change (a state shown in FIG. 16A (a state indicated by a broken line in FIG. 16B) changes to a state indicated by a solid line in FIG. 16B). This is a so-called bulging phenomenon. A pressure distribution is caused by stress relaxation (i.e., stress dispersion).

Figure 17A:
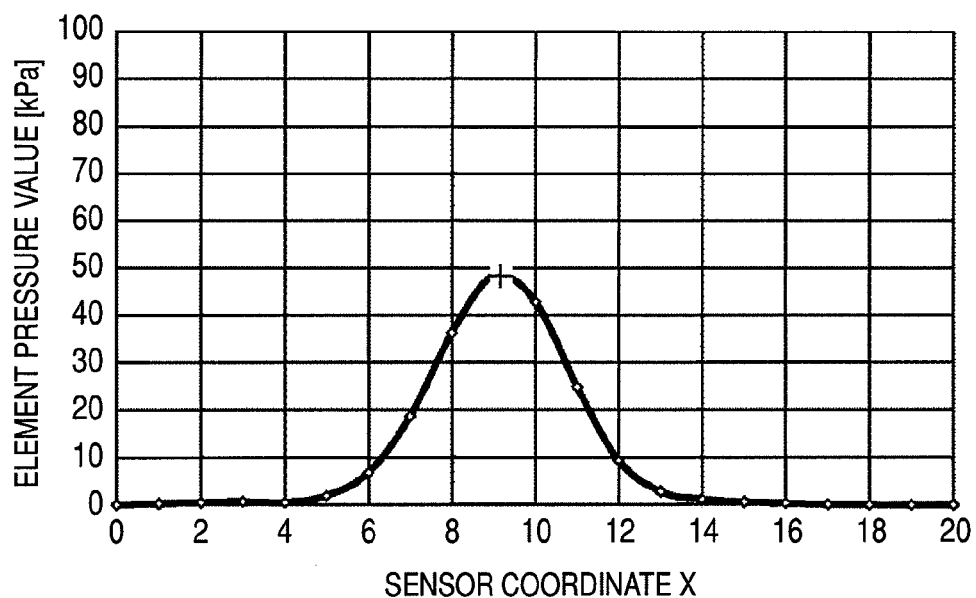
FIGS. 17A and 17B are graphs for explaining distributions and changes of pressure values.
Figure 17B:
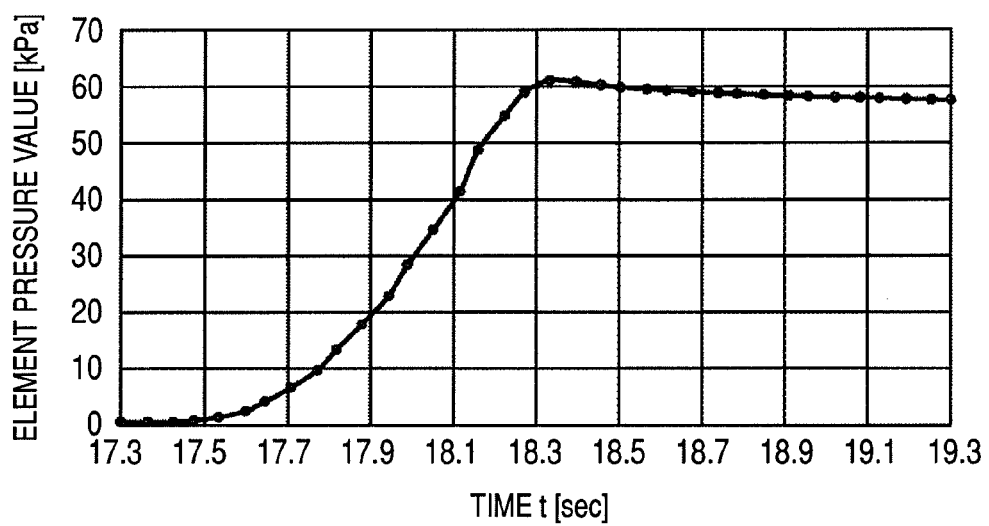

For example, in a state before weighting (FIG. 16A), when the load Fz is continuously applied in the minus direction on the z axis to the input section 31 by the finger A or the like as indicated by a state after weighting (FIG. 16B), a pressure value measured by the sensor element 52 located in a pressure center position C by the load Fz among the sensor elements 52 forming the pressure detecting section 42 gradually increases as indicated by a graph of a pressure value and time shown in FIG. 17B. After the pressure value reaches a predetermined value, the pressure value gradually falls as stress is relaxed.

A spatial distribution of pressure values in the pressure detecting section 42 at predetermined timing in a static state at or after about 18.3 seconds shown in FIG. 17B in this case has, as indicated by a graph of a pressure value and a position in the x axis direction shown in FIG. 17A, a substantially symmetrical curved shape having a maximum pressure value in a pressure center position in a coordinate 9 and having a minimum pressure value at both ends in a distribution range of pressure values.

When the viscoelastic body is not present on the sensor element 52, only the pressure value of the sensor element 52 located in the pressure center position C is detected. Therefore, the curved (substantially triangular) pressure distribution as indicated by the graph shown in FIG. 17A is not formed and a pulse-like distribution is formed.

When the deforming section 41 including the viscoelastic body is arranged on the pressure detecting section 42, a pressure distribution equal to or larger than a contact area of a contact object (the finger A) is formed. In other words, the pressure distribution extends in a wide range and, in that sense, the contact area enlarges. Therefore, it is possible to accurately detect a pressure center position of a position pressed by the finger A. As a result, it is possible to more accurately calculate the speed of the pressure center position.

Even if the deforming section 41 arranged on the sensor elements 52 is formed by an elastic body, the same effect can be realized.

Figure 18A:
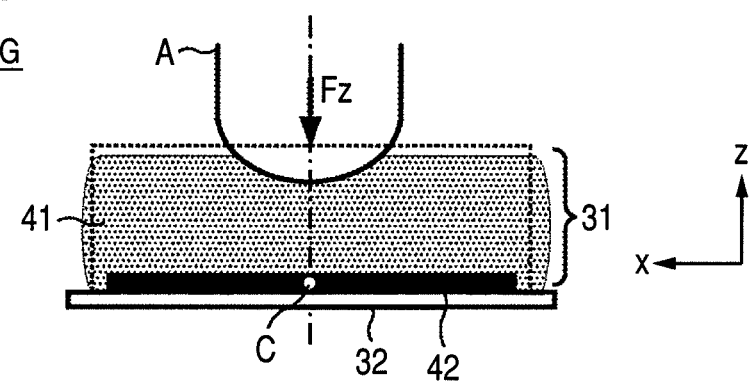
FIGS. 18A and 18B are sectional views for explaining deformation of the deforming section at the time when the finger is shifted.
Figure 18B:
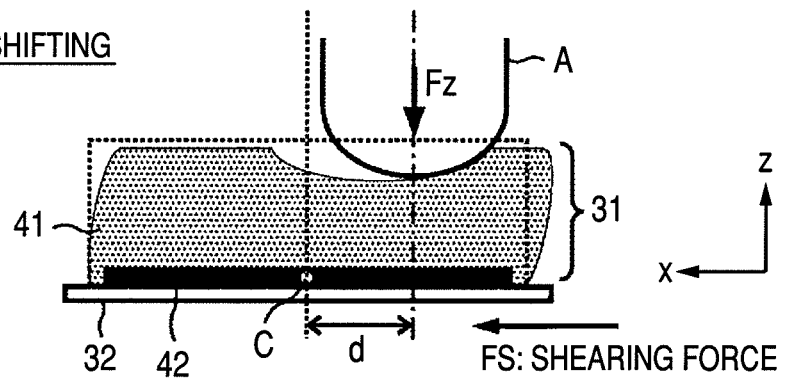

FIGS. 18A and 18B are diagrams showing a change in a shape of the input section 31 before shifting (FIG. 18A) and after shifting (FIG. 18B) at the time when the input section 31 is pressed by the finger A and then fixed and the fixing section 32 is shifted in a shearing direction (a plus direction on the x axis, which is a left direction in the figure). A state of the input section 31 before shifting shown in FIG. 18A is the same as the state of the input section 31 after weighting shown in FIG. 16B.

It is assumed that, after the load Fz is applied in the minus direction on the z axis (the downward direction in the figure) according to the depression of the input section 31 by the finger A or the like as shown in FIG. 18A, as shown in FIG. 18B, while the finger A keeps on pressing the input section 31, a shifting operation for shifting the fixing section 32 in the plus direction on the x axis (the left direction in the figure) with shearing force Fs while maintaining positions on the y axis and the z axis is performed.

In this case, the input section 31 is shearing-deformed by the shifting operation in the minus direction on the x axis while the binding surface with the pressure detecting section 42 is fastened. A pressure distribution position relation with respect to the sensor element 52 located in the pressure center position C by the load Fz before shifting is changed. In the case of FIGS. 18A and 18B, the pressure center position C before shifting shifts by three graduations (a distance d) from a graduation 9 to a graduation 6 after shifting. Even when shearing force does not exceed frictional force, deformation is caused by the flexible structure of the viscoelastic body and the pressure distribution is changed.

Figure 19A:
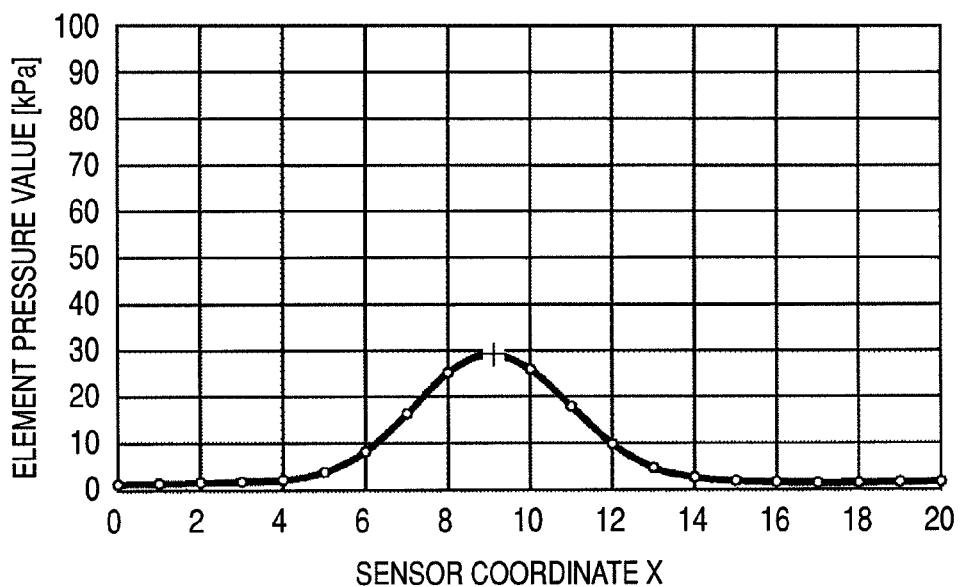
FIGS. 19A and 19B are graphs for explaining distributions of pressure values at the time when the finger is shifted.
Figure 19B:
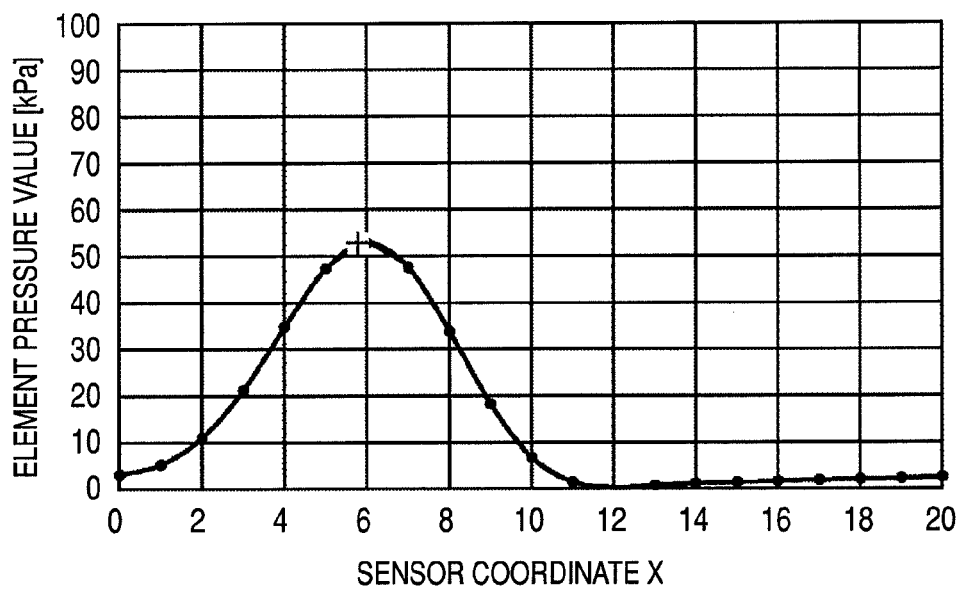

In other words, as indicated by the pressure distributions before shifting (FIG. 19A) and after shifting (FIG. 19B) shown in FIGS. 19A and 19B, the pressure distribution before shifting corresponding to FIG. 18A has a substantially symmetrical curved shape having a maximum pressure value in the pressure center position C and having a minimum pressure value at both ends of a distribution range of pressure values. On the other hand, in the pressure distribution after shifting (FIG. 19B) corresponding to FIG. 18B, a pressure value near the foot in a traveling direction side of the fixing section (near a sensor coordinate 0) is large compared with that on the opposite side (near a sensor coordinate 12).

A deformation amount of this pressure distribution increases depending on the magnitude of the shearing force Fs. Therefore, for example, even if a contact area between the viscoelastic body of the input section 31 (the deforming section 41) and the contact object (the finger A) is generally unchanged, it is possible to detect a change in a pressure center and detect a slip in a broad sense. Therefore, when gripping is performed by the robot hand 1, rather than performing gripping force control on the basis of a complete relative motion (a slip in a narrow sense dominated by a coefficient of dynamic friction) between the viscoelastic body of the input section 31 and the contact object, it is more effective to detect a slip according to a state of shift before the slip and perform the gripping force control.

Figure 20A:
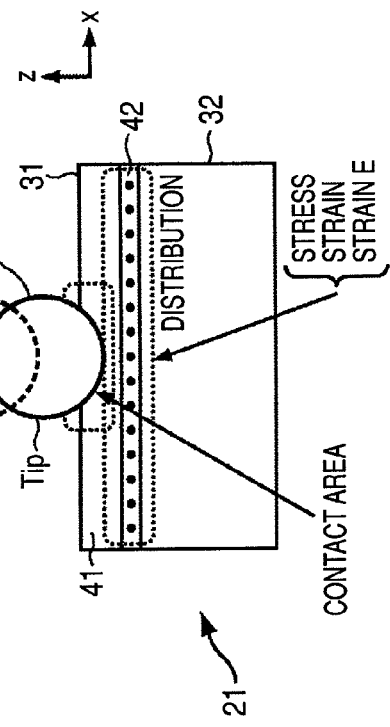
FIGS. 20A and 20B are diagrams for explaining an operation of the pressure detecting section at the time when the deforming section is pressed by the finger.
Figure 20B:
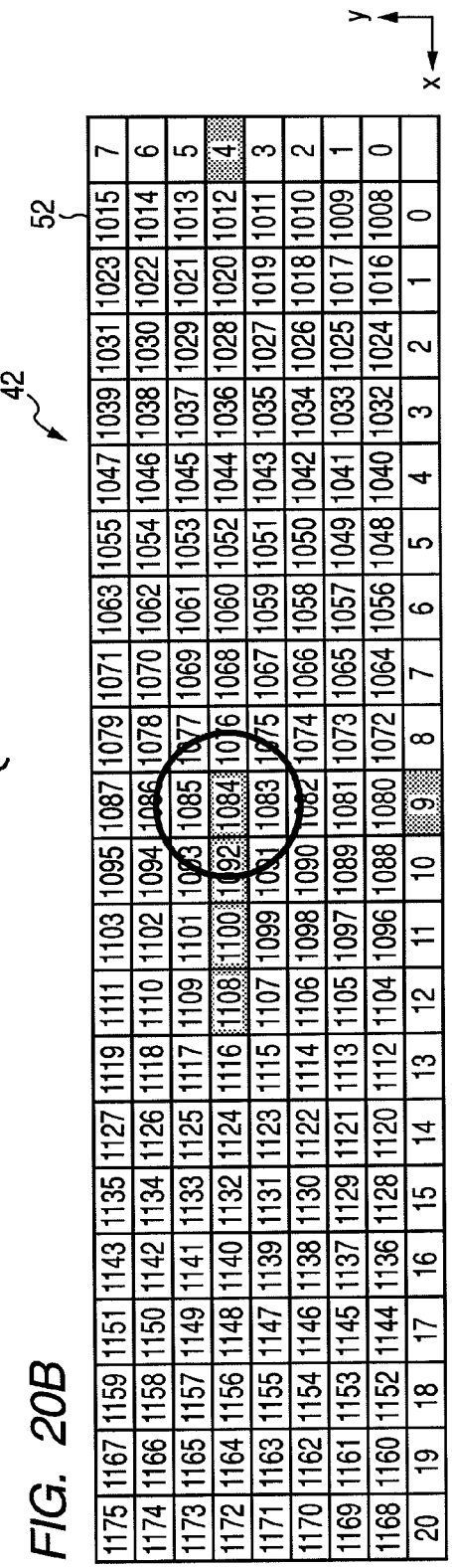

A result obtained by performing an experiment of weighting and unweighting on the sensor 21 is explained with reference to FIGS. 20A and 20B and FIGS. 21A to 21C. In FIGS. 20A and 20B, an overview of the experiment of weighting and unweighting on the sensor 21 (FIG. 20A) and details of the sensor elements 52 that detect a pressure (FIG. 20B) are shown. In FIG. 20A, a right direction in the figure represents a plus direction on an x axis of an xyz coordinate system and an upward direction in the figure represents a plus direction on a z axis. On the other hand, in FIG. 20B, a left direction in the figure represents the plus direction on the x axis of the xyz coordinate and an upward direction in the figure represents a plus direction on a y axis.

In this experiment, first, at time from about 1500 ms to 4000 ms, as indicated by a solid line arrow in FIG. 20A, a Tip having a ball R at a distal end thereof was pushed into the deforming section 41 formed by the viscoelastic body of the sensor 21 with force Fz at predetermined speed or acceleration. Since a load was applied in a minus direction on the z axis (a downward direction in the figure), stress, strain, and strain E (energy) occurred in the viscoelastic body of the deforming section 41. Consequently, a pressure distribution was spread to be larger than a contact area. After fixed time (about 4000 ms to 14500 ms) elapsed while the load was continued to be applied, unweighting was performed as indicated by a dotted line arrow at time of about 14500 ms to 17000 ms.

Between weighting and unweighting on the deforming section 41 described above, output data from the sensor elements 52 forming the pressure detecting section 42 (in the case of an example shown in FIGS. 20A and 20B, 21×8 sensor elements 52 with an ID (identification) 1008 to an ID 1175) was measured.

Figure 21A:
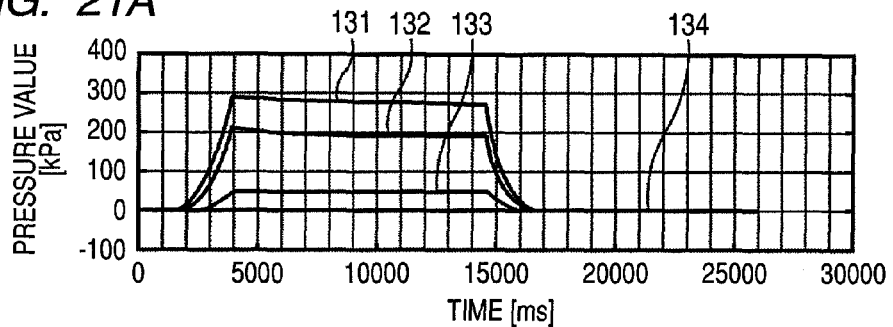
FIGS. 21A to 21C are graphs showing changes in data of the pressure detecting section at the time when the deforming section is pressed by the finger.
Figure 21B:
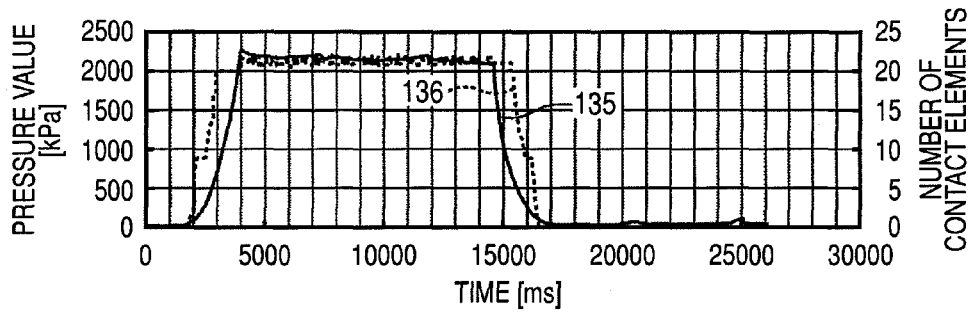
Figure 21C:
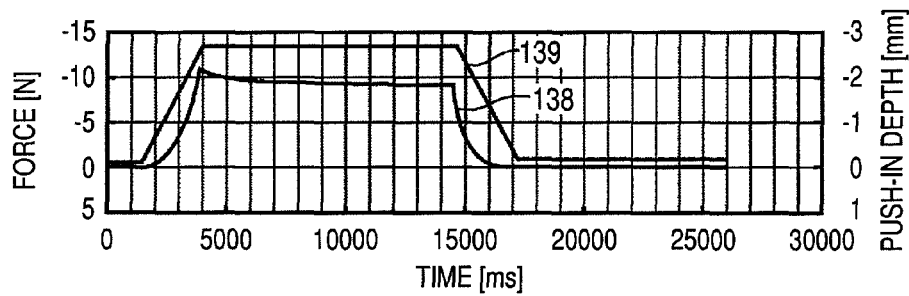

In FIGS. 21A to 21C, the output data measured in the experiment shown in FIGS. 20A and 20B is shown according to the elapse of time. FIG. 21A is a graph of a pressure value and time of predetermined sensor elements 52. FIG. 21B is a graph of the number of contact elements (the number of sensor elements 52 that detect contact), a sum of pressure values of the contact elements (the sensor elements 52), and time. FIG. 21C is a graph of force, push-in depth, and time. In FIGS. 21A to 21C, for convenience of explanation, only pressure values of the sensor elements 52 with IDs 1084, 1092, 1100, and 1108 hatched in FIG. 20B are shown.

In FIG. 21A, a graph 131 indicates, according to the elapse of time, a pressure value outputted from the sensor element 52 with the ID 1084, which is arranged right below the Tip shown in FIG. 20A. Similarly, a graph 132 indicates a pressure value outputted from the sensor element 52 with the ID 1092 arranged next to the sensor element 52 with the ID 1084 on the plus direction on the x axis. A graph 133 indicates a pressure value outputted from the sensor element 52 with the ID 1100 arranged next to the sensor element 52 with the ID 1092 on the plus direction side on the x axis. A graph 134 indicates a pressure value outputted from the sensor element 52 with the ID 1108 arranged next to the sensor element 52 with the ID 1100 on the plus direction side on the x axis.

In FIG. 21B, a graph 135 indicates a sum of pressure values from the sensor elements 52, pressure values of which exceed a contact threshold, according to the elapse of time. A broken line of the graph 136 indicates the number of sensor elements 52 (i.e., the number of contact elements), the pressure values of which exceed the contact threshold, according to the elapse of time.

In FIG. 21C, a graph 138 indicates force Fz1 in the z axis direction (a normal direction) measured by a six-axis force sensor on the input section 31. A graph 139 indicates the depth (a position in the z axis direction) of the Tip pushed in the deforming section 41. The force Fz1 is measured by the six-axis force sensor for comparison with force Fz calculated by a calculation described later.

According to the graphs 131 to 134, it is seen that the pressure value from the sensor element 52 with the ID 1084 arranged right below the Tip is the largest value. It is also seen that the pressure value from the sensor element 52 with the ID 1108 three sensor elements away from the sensor element 52 with the ID 1084 remains at zero and no pressure value is detected. Even if the load is continued to be applied, as indicated at about 4000 ms to 14500 ms in the graphs 131 to 134, the pressure values outputted from the respective sensor elements 52 decrease little by little. This is caused by stress relaxation of the viscoelastic body.

A contact region, a contact area, weighted force Fz, and the pressure center position COPx, COPy can also be calculated on the basis of the pressure values indicated by the graphs 131 to 134. Specifically, the contact region represents the number of contact elements indicated by the graph 136. The contact region is calculated by using formula (1) for each of the sensor elements 52 assuming that the sensor elements 52, pressure values of which exceed the contact threshold (e.g., th(x, y)), are contact elements (i.e., the sensor elements 52 that detect contact). The contact area can be calculated by multiplying the number of contact elements indicated by the graph 136 with an element area. The force Fz can be calculated by using formula (37). In other words, the force Fz calculated by formula (37) is substantially the same value as the force Fz1 indicated by the graph 138, although there is an error or the like.

$$Fz = \sum_{y=0}^{n-1} \sum_{x=0}^{m-1} P_{ci}(x, y) \times S(x, y) \qquad (37)$$

The pressure center position COPx, COPy can be calculated by formula (4) (or formula (5)) described above. In the case of the example shown in FIGS. 20A and 20B, the pressure center position COPx, COPy is a position of the sensor element 52 with the ID 1084 arranged right below the Tip.

Figure 22A:
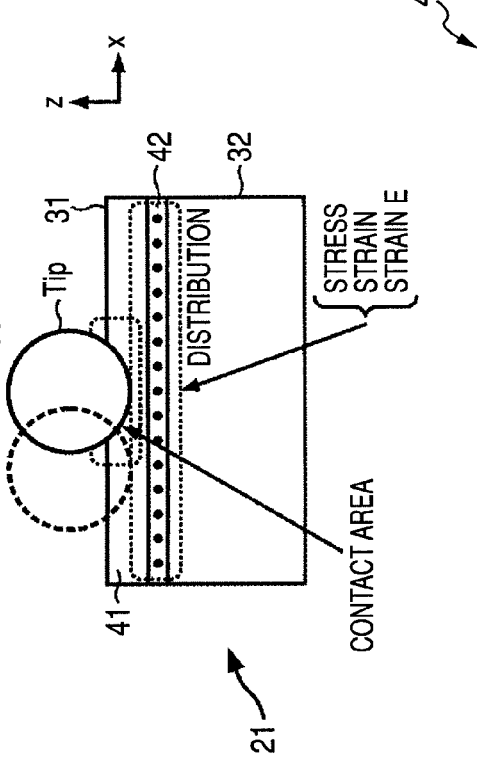
FIGS. 22A and 22B are diagrams for explaining an operation of the pressure detecting section at the time when the finger is shifted.
Figure 22B:
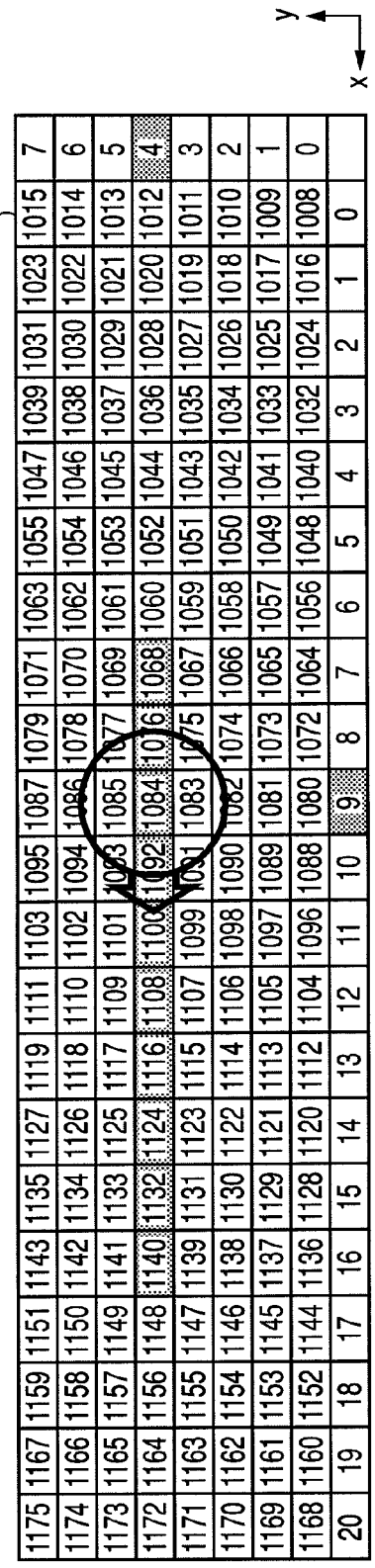

A result obtained by performing an experiment for applying the sharing force Fs to the sensor 21 after weighting on the sensor 21 is explained with reference to FIGS. 22A and 22B and FIGS. 23A to 23E. In FIGS. 22A and 22B, an overview of the experiment of the movement by the shearing force Fs applied to the sensor 21 (FIG. 22A) and details of the sensor elements 52 on which pressure is detected (FIG. 22B) are shown. In FIG. 22A, a right direction in the figure represents a plus direction on an x axis of an xyz coordinate system and an upward direction in the figure represents a plus direction on a z axis. In FIG. 22B, a left direction in the figure represents the plus direction on the x axis of the xyz coordinate system and an upward direction in the figure represents a plus direction on a y axis.

In this experiment, first, as in the example shown in FIGS. 20A and 20B, the Tip was pushed into the deforming section 41 formed by the viscoelastic body of the sensor 21 with force Fz at predetermined speed or acceleration. Since a load was applied in the minus direction on the z axis (a downward direction in the figure), stress, strain, and strain E (energy) occurred in the viscoelastic body of the deforming section 41. Consequently, a pressure distribution was spread to be larger than a contact area. Thereafter, while the load was continued to be applied, at time of about 1000 ms to 11000 ms, as indicated by a solid line arrow in FIG. 22A, shearing force for moving (shifting) the Tip in the plus direction (to a right side in the figure) by push-in depth of −1.0 mm at predetermined speed or acceleration was applied to the Tip. In that state, the Tip was stopped for predetermined time. During the period of the experiment, output data from the sensor elements 52 forming the pressure detecting section 42 (in the case of the example shown in FIGS. 22A and 22B, as in the example shown in FIGS. 20A and 20B, the 21×8 sensor elements 52 with the ID 1008 to the ID 1175) was measured.

Figure 23A:
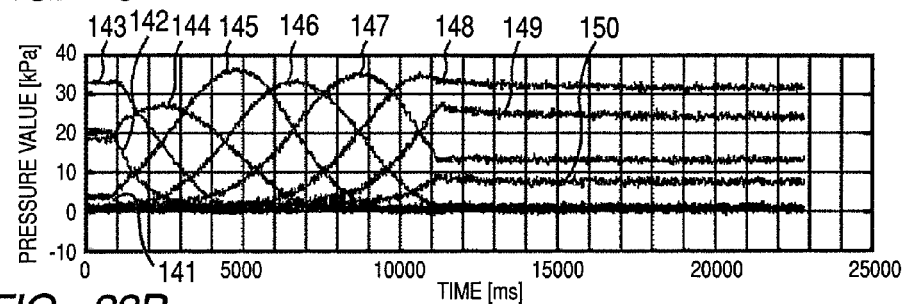
FIGS. 23A to 23E are graphs showing changes in data of the pressure detecting section at the time when the finger is shifted.
Figure 23B:
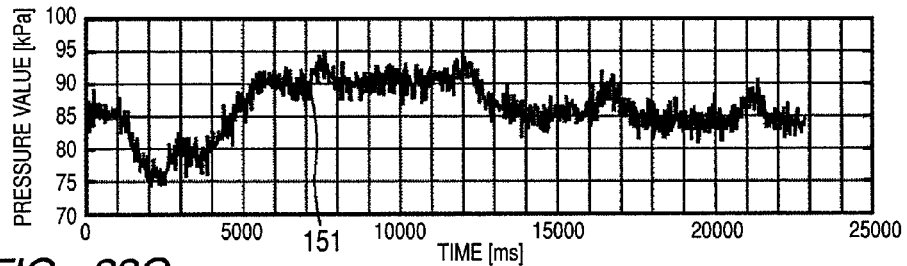
Figure 23C:
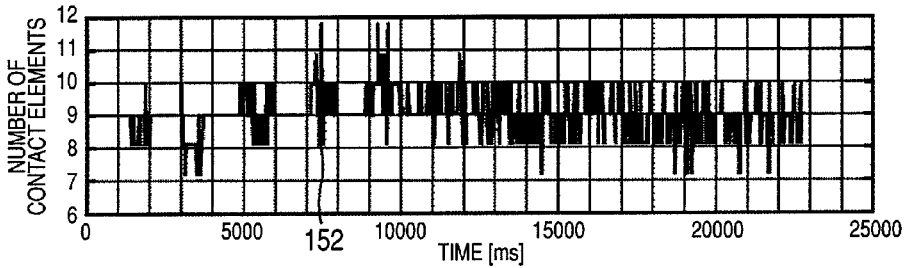
Figure 23D:
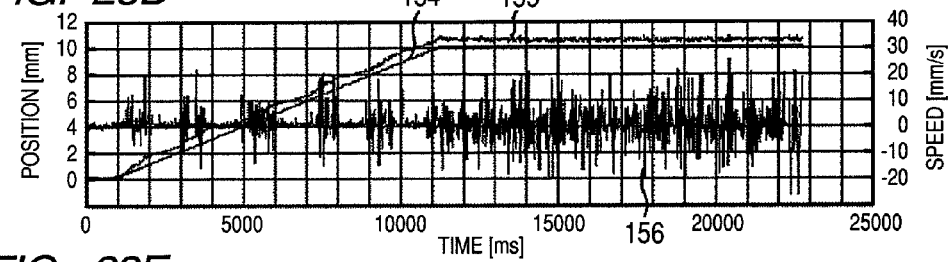
Figure 23E:
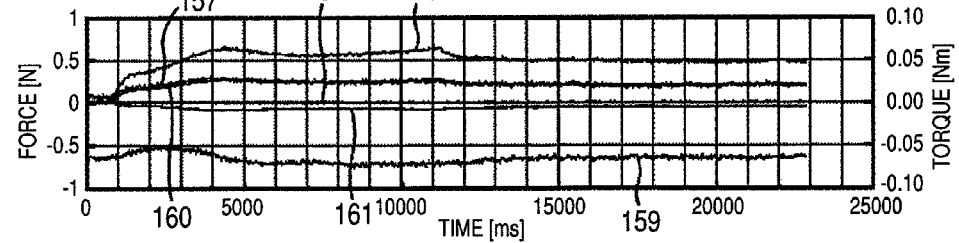

In FIGS. 23A to 23E, the output data measured in the experiment shown in FIGS. 22A and 22B is shown according to the elapse of time. FIG. 23A is a graph of a pressure value and time of predetermined sensor elements 52. FIG. 23B is a graph of a sum of pressure values of the contact elements and time. FIG. 23C is a graph of the number of contact elements and time. FIG. 23D is a graph of a position in the x axis direction of the Tip, a pressure center position, and pressure center movement speed and time. FIG. 23E is a graph of force, torque, and time. In FIGS. 23A to 23E, as in FIGS. 21A to 21C, for convenience of explanation, only pressure values of the sensor elements 52 with IDS 1068, 1076, 1084, 1092, 1100, 1108, 1116, 1124, 1132, and 1140 hatched in FIG. 22B are shown.

In FIG. 23A, a graph 141 indicates a pressure value outputted from the sensor element 52 with the ID 1068, which is arranged right next to the sensor element 52 with the ID 1076 shown in FIG. 22B in the minus direction on the x axis, according to the elapse of time. Similarly, a graph 142 indicates a pressure value outputted from the sensor element 52 with the ID 1076 arranged next to the sensor element 52 with the ID 1084 on the minus direction on the x axis. A graph 143 indicates a pressure value outputted from the sensor element 52 with the ID 1084 arranged right below the Tip. A graph 144 indicates a pressure value outputted from the sensor element 52 with the ID 1092 arranged next to the sensor element 52 with the ID 1084 on the plus direction side on the x axis. A graph 145 indicates a pressure value outputted from the sensor element 52 with the ID 1100 arranged next to the sensor element 52 with the ID 1092 in the plus direction side on the x axis.

A graph 146 indicates a pressure value outputted from the sensor element 52 with the ID 1108 arranged next to the sensor element 52 with the ID 1100 in the plus direction side on the x axis. A graph 147 indicates a pressure value outputted from the sensor element 52 with the ID 1116 arranged next to the sensor element 52 with the ID 1108 in the plus direction on the x axis. A graph 148 indicates a pressure value outputted from the sensor element 52 with the ID 1124 arranged next to the sensor element 52 with the ID 1116 in the plus direction side on the x axis. A graph 149 indicates a pressure value outputted from the sensor element 52 with the ID 1132 arranged next to the sensor element 52 with the ID 1124 in the plus direction side on the x axis. A graph 150 indicates a pressure value outputted from the sensor element 52 with the ID 1140 arranged next to the sensor element 52 with the ID 1132 in the plus direction side on the x axis.

In FIG. 23B, a graph 151 indicates a sum of pressure values from the sensor elements 52, pressure values of which exceed a contact threshold, according to the elapse of time. In FIG. 23C, a graph 152 indicates the number of sensor elements 52 (i.e., the number of contact elements), the pressure values of which exceed the contact threshold, according to the elapse of time.

In FIG. 23D, a graph 154 indicates a position of the Tip in the x axis direction according to the elapse of time. A graph 155 indicates COPx of the pressure center position COPx, COPy calculated by formula (4) (or formula (5)) according to the elapse of time. A graph 156 indicates moving speed of the pressure center position, which is obtained by dividing a difference in the coordinate COPx of the pressure center position by time, according to the elapse of time.

In FIG. 23E, a graph 157 indicates force Fx1 in the x axis direction measured by a six-axis force sensor on the input section 31. A graph 158 indicates force Fy1 in the y axis direction according to the elapse of time. A graph 159 indicates force Fz1 in the z axis direction (a normal direction)

according to the elapse of time. A graph 160 indicates force Mx1 in a rotating direction around the x axis measured by the six-axis force sensor on the input section 31 according to the elapse of time. A graph 161 indicates force My1 in the rotating direction around the y axis according to the elapse of time. A graph 162 indicates force Mz1 in the rotating direction around the z axis according to the elapse of time. The force and the torque measured by the six-axis force sensor are measured for comparison with force Fz calculated by a calculation described later.

According to the graphs 141 to 150, a maximum pressure value is a pressure value from the respective sensor elements 52 with the ID 1084 arranged right below the Tip (the graph 143), the ID 1092 (the graph 144), the ID 1100 (the graph 145), the ID 1108 (the graph 146), the ID 1116 (the graph 147), and the ID 1124 (the graph 148) arranged right below the Tip.

As in the case of the example shown in FIGS. 20A and 20B, a contact region, a contact area, force Fz, and the pressure center position COPx, COPy can also be calculated on the basis of the pressure values indicated by the graphs 141 to 150. Specifically, the contact region represents the number of contact elements indicated by the graph 152 shown in FIG. 23C. The contact region is calculated by using formula (1) for each of the sensor elements 52 assuming that the sensor elements 52, pressure values of which exceed the contact threshold, are contact elements (i.e., the sensor elements 52 that detect contact). The contact area can be calculated by multiplying the number of contact elements indicated by the graph 152 with an element area. The force Fz can be calculated by using formula (37). In other words, the force Fz calculated by formula (37) is substantially the same value as the force Fz1 indicated by the graph 159 shown in FIG. 23E, although there is an error or the like.

The pressure center position COPx, COPy can be calculated by formula (4) (or formula (5)) described above. The coordinate COPx of the pressure center position indicated by the graph 155 shown in FIG. 23D moves substantially the same as the position of the Tip indicated by the graph 154, although the coordinate COPx slightly precedes the position of the Tip.

Figure 24A:
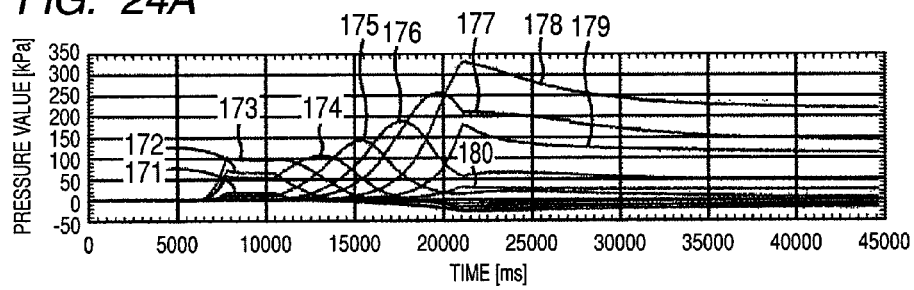
FIGS. 24A to 24D are graphs showing changes in data of the pressure detecting section at the time when the finger is shifted.
Figure 24B:
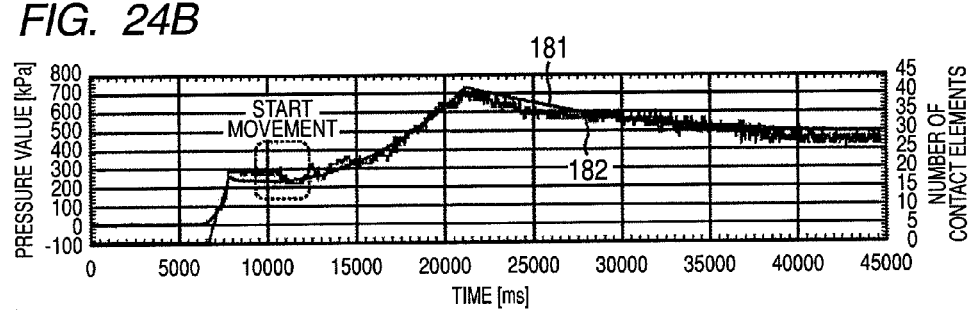
Figure 24C:
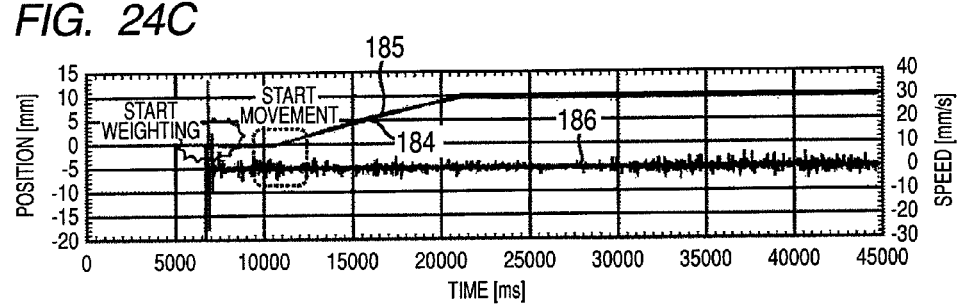
Figure 24D:
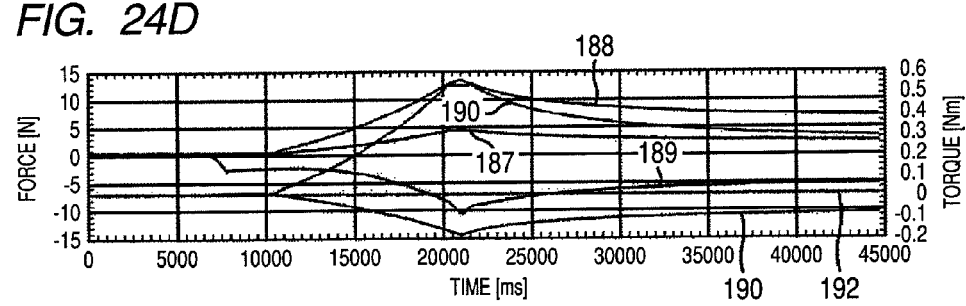

In FIGS. 24A to 24D, another example of output data measured in an experiment same as that shown in FIGS. 22A and 22B is shown according to the elapse of time. In FIGS. 24A to 24D, FIG. 24A is a graph of a pressure value of a predetermined sensor element 52 and time at the time when weighting is started on the sensor 21 by the Tip around 6000 ms and movement (shift) is started around 9000 ms to 12000 ms. FIG. 24B is a graph of the number of contact elements, a sum of pressure values of the contact elements, and time. FIG. 24C is a graph of a position in the x axis direction of the Tip, a pressure center position, pressure center movement speed, and time. FIG. 24D is a graph of force, torque, and time.

The graphs shown in FIGS. 24A to 24D are another example of the graphs shown in FIGS. 23A to 23E. Detailed explanation of the graphs is basically the same and redundant. Therefore, the explanation is omitted as appropriate.

In FIG. 24A, a graph 171 indicates, according to the elapse of time, a pressure value outputted from the sensor element 52 with the ID 1068 arranged two sensor elements away in the minus direction side on the x axis from the sensor element 52 with the ID 1084 that outputs a pressure value indicated by a graph 173. Similarly, a graph 172 indicates a pressure value outputted from the sensor element 52 with the ID 1076 arranged next to, on the minus direction side on the x axis, the sensor element 52 with the ID 1084 that outputs the pressure value indicated by the graph 173. The graph 173 indicates a pressure value outputted from the sensor element 52 with the ID 1084 arranged right below the Tip.

A graph 174 indicates a pressure value outputted from the sensor element 52 with the ID 1092 arranged next to, on the plus direction side on the x axis, the sensor element 52 with the ID 1084 that outputs the pressure value indicated by the graph 173. A graph 175 indicates a pressure value outputted from the sensor element 52 with the ID 1100 arranged next to, on the plus direction side on the x axis, the sensor element 52 with the ID 1092 that outputs the pressure value indicated by the graph 174.

A graph 176 indicates a pressure value outputted from the sensor element 52 with the ID 1108 arranged next to, on the plus direction side on the x axis, the sensor element 52 with the ID 1100 that outputs the pressure value indicated by the graph 175. A graph 177 indicates a pressure value outputted from the sensor element 52 with the ID 1116 arranged next to, on the plus direction side on the x axis, the sensor element 52 with the ID 1108 that outputs the pressure value indicated by the graph 176. A graph 178 indicates a pressure value outputted from the sensor element 52 with the ID 1124 arranged next to, on the plus direction side on the x axis, the sensor element 52 with the ID 1116 that outputs the pressure value indicated by the graph 177.

A graph 179 indicates a pressure value outputted from the sensor element 52 with the ID 1132 arranged next to, on the plus direction side on the x axis, the sensor element 52 with the ID 1124 that outputs the pressure value indicated by the graph 178. A graph 180 indicates a pressure value outputted from the sensor element 52 with the ID 1140 arranged next to, on the plus direction side on the x axis, the sensor element 52 with the ID 1132 that outputs the pressure value indicated by the graph 179.

In FIG. 24B, a graph 181 indicates a sum of pressure values from the sensor elements 52, pressure values of which exceeds the contact threshold, according to the elapse of time. A graph 182 indicates the number of sensor elements (the number of contact elements), the pressure values of which exceed the contact threshold, according to the elapse of time.

In FIG. 24C, a graph 184 indicates a position of the Tip in the x axis direction according to the elapse of time. A graph 185 indicates COPx of the pressure center position COPx, COPy calculated by the formula (4) (or formula (5)) described above according to the elapse of time. A graph 186 indicates moving speed of the pressure center position, which is obtained by dividing a difference in the pressure center position COPx by time, according to the elapse of time.

In FIG. 24D, a graph 187 indicates force Fx1 in the x axis direction measured by a six-axis force sensor on the input section 31. A graph 188 indicates force Fy1 in the y axis direction according to the elapse of time. A graph 189 indicates force Fz1 in the z axis direction (a normal direction) according to the elapse of time. A graph 190 indicates force Mx1 in a rotating direction around the x axis measured by the six-axis force sensor on the input section 31 according to the elapse of time. A graph 191 indicates force My1 in the rotating direction around the y axis according to the elapse of time. A graph 192 indicates force Mz1 in the rotating direction around the z axis according to the elapse of time.

Figure 25:
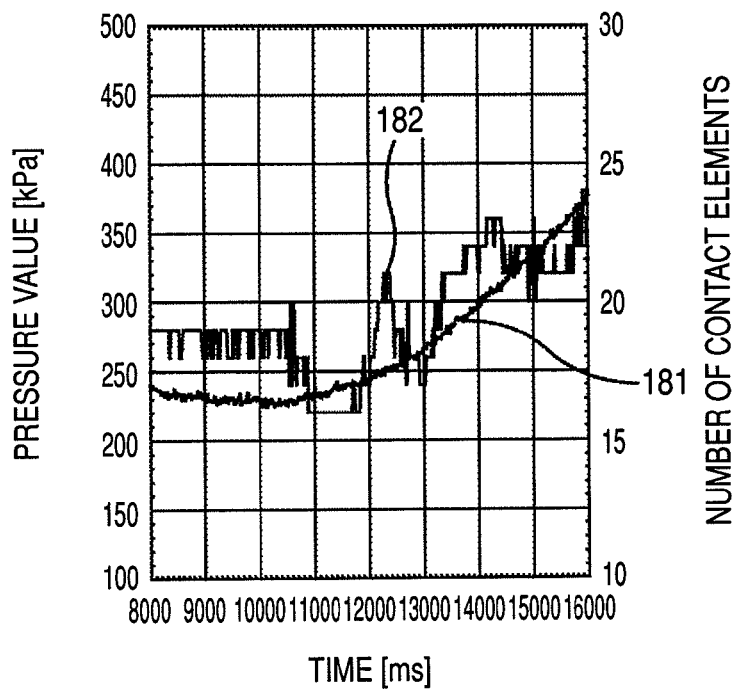
FIG. 25 is a graph showing a change in data of the pressure detecting section in a range of start of movement in FIG. 24B.

The graph 181 and the graph 182 near timing of the start of movement of the Tip (i.e., about 8000 ms to 16000 ms) shown in FIG. 24B by being surrounded by a broken line are shown in FIG. 25 in enlargement. As indicated by the graph 182, the number of contact elements that has been stable so far (i.e., until immediately before about 11000 ms) suddenly decreases and increases. In other words, there are large changes of a sudden increase and a sudden decrease in the number of contact elements immediately before the start of movement of the Tip.

Figure 26:
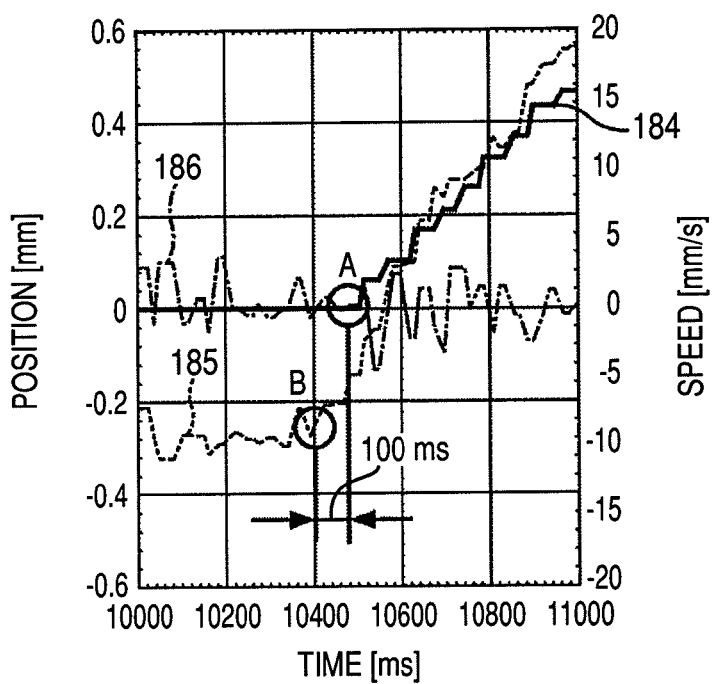
FIG. 26 is a graph showing a change in data of the pressure detecting section in a range of start of movement in FIG. 24C.

The graph 184 to the graph 186 near the start of movement of the Tip (i.e., about 10000 ms to 11000 ms) shown in FIG. 24C by being surrounded by a broken line are shown in FIG. 26 in enlargement. In FIG. 26, the graph 184 is indicated by a bold line, the graph 185 is indicated by a broken line, and the graph 186 is indicated by an alternate long and short dash line. The position of the Tip indicated by the graph 184 starts movement from a position indicated by a circle A. However, the coordinate COPx of the pressure center position indicated by the graph 185 starts to change from a position indicated by a circle B about 100 ms earlier than the start of movement of the Tip indicated by the circle A. In other words, there is also a large change in the coordinate COPx of the pressure center position immediately before the start of movement of the Tip.

The large changes in the number of contact elements and the coordinate COPx of the pressure center position immediately before the start of movement of the Tip are considered to be caused by deformation of the viscoelastic body. It is difficult to obtain information on the large changes using a sensor alone. Therefore, as shown in FIGS. 3A and 3B, the sensor 21 is configured by the combination of the deforming section 41 made of the viscoelastic body and the sensor elements 52 including the capacitance-type pressure sensors. Consequently, it is possible to obtain the information on the large changes in the number of contact elements and the pressure center position immediately before the start of movement of the Tip.

Figure 27A:
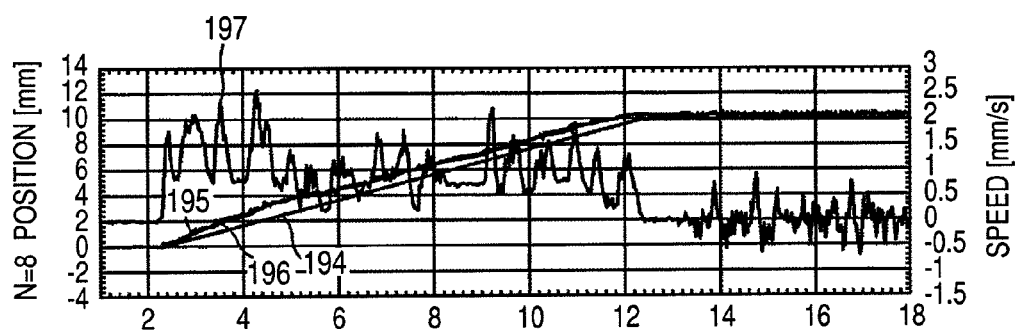
FIGS. 27A to 27C are graphs showing changes in other data of the pressure detecting section at the time when the finger is shifted.
Figure 27B:
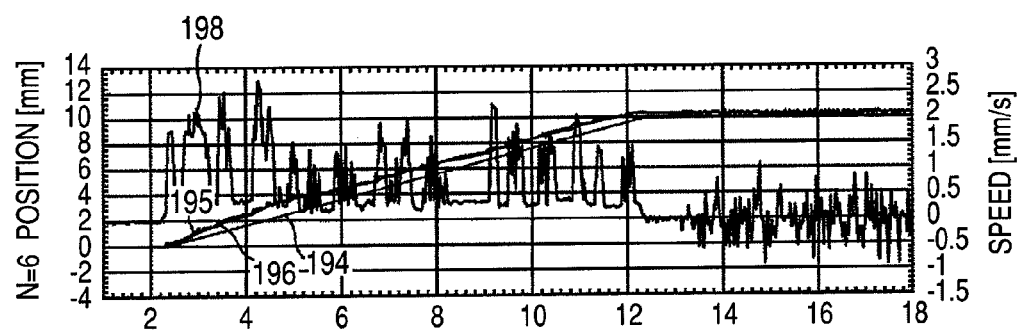
Figure 27C:
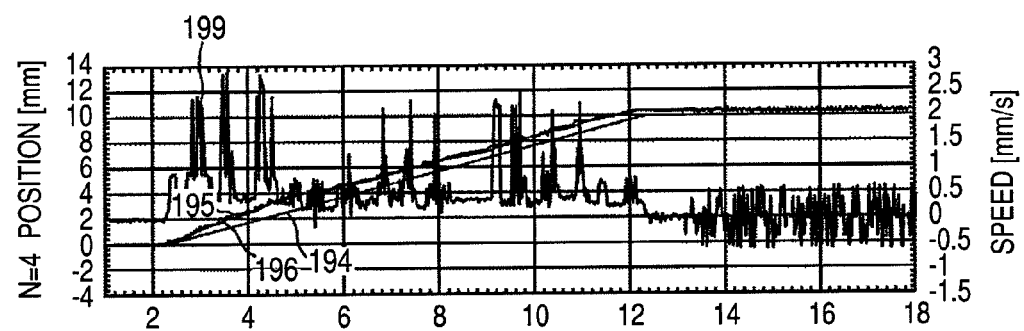

FIGS. 27A to 27C show slip detection data obtained by an experiment same as that shown in FIGS. 22A and 22B. An example shown in FIGS. 27A to 27C includes a position of the Tip, the coordinate COPx of the pressure center position, a moving average $COPx_{MA}$, and three kinds of slip detection values obtained from the position of the Tip, the coordinate COPx, and the moving average $COPx_{MA}$ at the time when the Tip is moved in the plus direction on the x axis at the speed of 1.0 mm while a load is continued to be applied in the minus direction on the x axis to be pushed in to depth −1.0 mm.

In FIGS. 27A to 27C, a graph 194 indicates a position in the x axis direction of the Tip. A graph 195 indicates the coordinate COPx of the pressure center position in the x axis direction. A graph 196 indicates the moving average $COPx_{MA}$. In FIG. 27A, a graph 197 indicates a low-speed slip detection value with N (N=8) set large in formula (19) (or formula (22) or formula (24)) and threshold set small in formula (8). In FIG. 27B, a graph 198 indicates a medium-speed slip detection value with N (N=4) and threshold set to intermediate values of values shown in FIGS. 27A and 27C. In FIG. 27C, a graph 199 indicates a high-speed slip detection value with N (N=2) set small and threshold set large.

As indicated by the graph 197, the low-speed slip detection value indicates about 0 during rest, indicates a value of about 0.25 to 2.5 from the start to the end of a slip, and indicates a value of ±0.50 after the stop. As indicated by the graph 198, the medium-speed slip detection value indicates about 0 during rest, indicates a value of about 0.25 to 2.7 from the start to the end of a slip, and indicates a value of ±0.70 after the stop. As indicated by the graph 199, the high-speed slip detection value indicates about 0 during rest, indicates a value of about 0.0 to 3.0 from the start to the end of a slip, and indicates a value of ±0.5 after the stop.

In other words, in the high-speed slip detection value, compared with the low-speed slip detection value, an amount of overlap of values during a slip and values during a non-slip is large. An amount of overlap of values is smaller in the low-speed slip. Therefore, it is possible to easily detect a period of a slip and a period of a non-slip. It is seen that, in a period of 8.3 s to 9 s in which a slip is stable and fixed, the low-speed slip detection value 0.7 is large compared with the high-speed and medium-speed detection values 0.3. It is also seen that a rising edge and a falling edge of the high-speed slip detection value are steeper than those of the low-speed slip detection value and it is easy to detect a value only in a high-speed slip.

In other words, the high-speed slip detection value shown in FIG. 27C is a very small value compared with the low-speed slip detection value shown in FIG. 27A. In the low-speed slip, it is possible to more easily detect a period of a slip and a period of a non-slip.

By using the characteristics described above, i.e., the characteristic of the viscoelastic body, the pressure center position obtained from pressure values, and the like, it is possible to detect a slip that occurs on a contact surface with an object.

In the above explanation, the detection of a slip on the x axis is explained. However, a slip can be detected in the same manner on the y axis.

Figure 28:
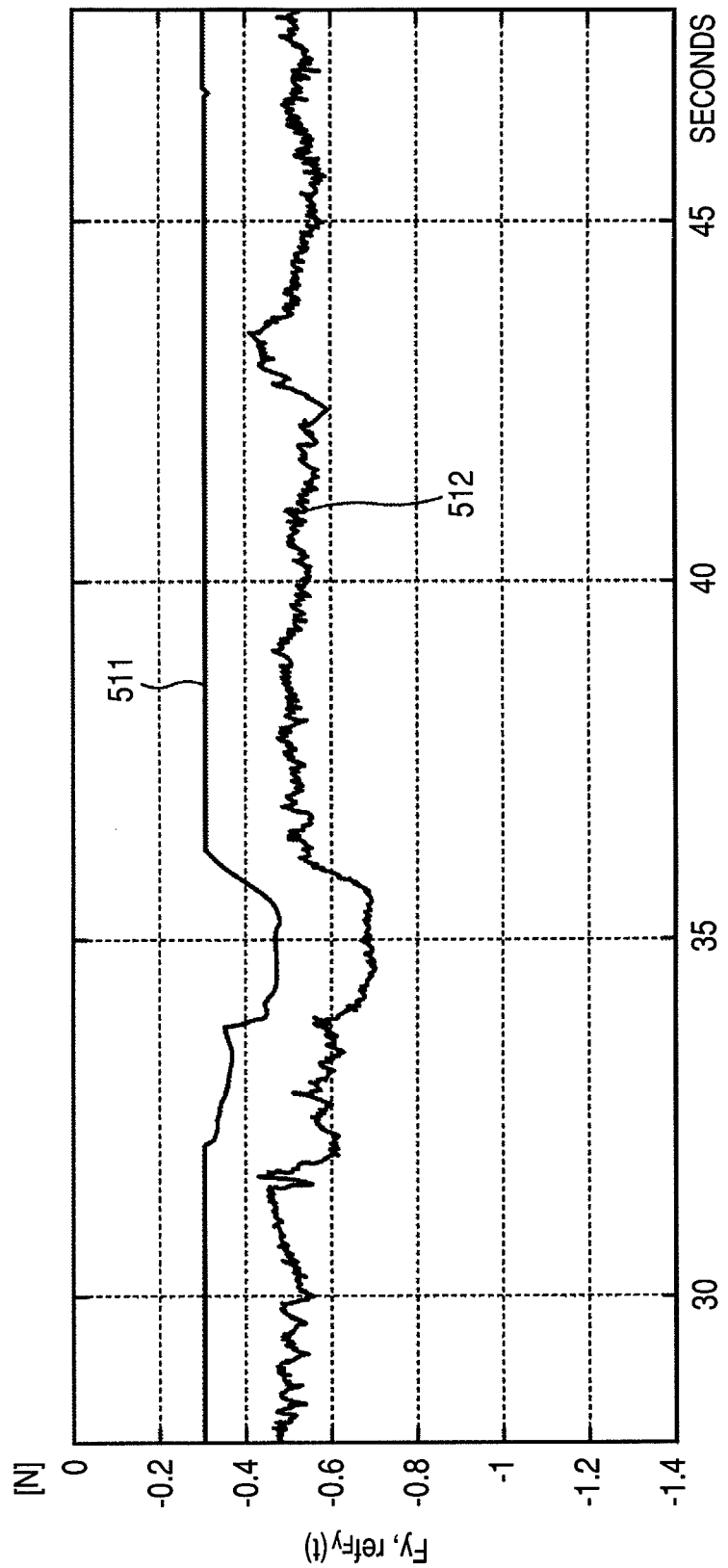
FIG. 28 is a graph showing a change in data of the pressure detecting section.
Figure 29:
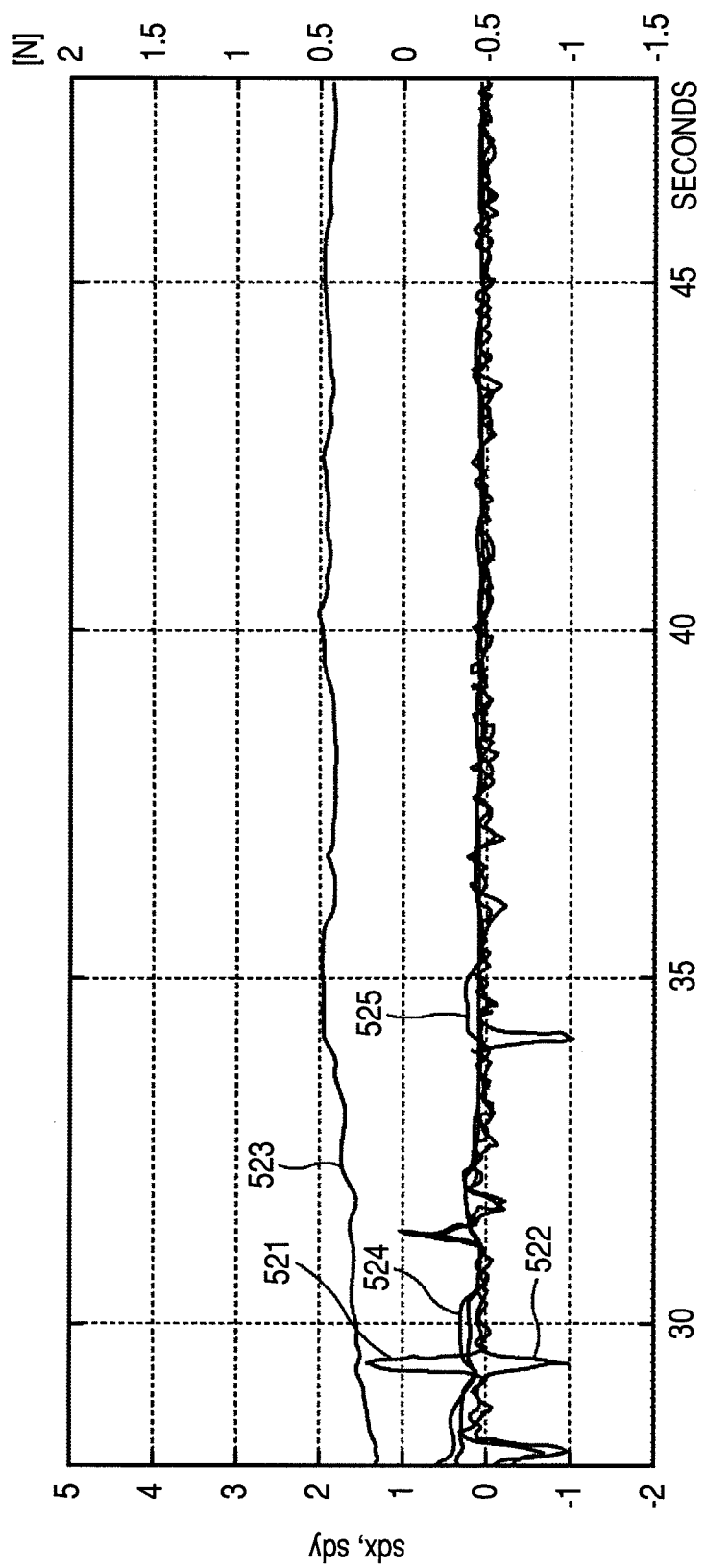
FIG. 29 is a graph showing a change in data of the pressure detecting section.

FIGS. 28 and 29 are graphs representing experiment results. As a method of an experiment, as shown in FIG. 12A, after the index finger 422 and the middle finger 423 are opposed to the thumb 421 to grip the cylindrical object 424, the arm attached with the hand is driven upward to lift the object 424. A hand coordinate system is set as shown in FIG. 12A and gripping force is the force Fy in the y direction. A command value of gripping force of the index finger 422 and the middle finger 423 is set to a half of that of the thumb 421 in a direction opposed to the thumb 421. The command value $ref_{Fy}(t)$ of initial gripping force is set to −0.3 [N] for the thumb 421 and is set to 0.15 [N] for the index finger 422 and the middle finger 423. This value is a value determined by minimum settable force of the index finger 422 and the middle finger 423.

In FIG. 28, a graph 511 indicates the command value $ref_{Fy}(t)$ of gripping force and a graph 512 indicates the gripping force Fy of the thumb 421. The weight of the object 424 is 50 g. From 28 seconds to 32 seconds, while the object 424 is placed on the floor, the thumb 421, the index finger 422, and the middle finger 423 grip the object 424 with the initial gripping force. Near 32 seconds, a lifting operation is started. Near 37 seconds, the lifting operation is finished. From near 37 seconds to near 48 seconds, the object 424 is caused to rest while being kept lifted.

According to the lifting operation near 32 seconds, changes in the command value $ref_{Fy}(t)$ of gripping force and the gripping force Fy are observed. The command value $ref_{Fy}(t)$ of gripping force indicated by the graph 511 indicates a substantially fixed value −0.3 [N] from 28 seconds to 32 seconds, changes from −0.3 [N] to −0.45 [N] from 32 seconds to 34 seconds, stabilizes at substantially fixed −0.45 [N] from 34 seconds to 35.3 seconds, changes from −0.45 [N] to −0.3 [N] from 35.3 seconds to 36.3 seconds, and keeps a substantially fixed value −0.3 [N] from 36.3 seconds to 48 seconds. The gripping force Fy indicated by the graph 512 indicates −0.4 [N] to −0.55 [N] from 28 seconds to 32 seconds, changes from −0.4 [N] to −0.65 [N] from 32 seconds to 34 seconds, stabilizes at substantially fixed −0.65 [N] from 34 seconds to 35.3 seconds, changes from −0.65 [N] to −0.5 [N] from 35.3 seconds to 36.3 seconds, and keeps −0.4 [N] to −0.6 [N] from 36.3 seconds to 48 seconds.

There was a change in the gripping force immediately after lifting (32 seconds to 36.3 seconds). However, thereafter (after 36.3 seconds), the gripping force was reduced to a lower limit and a result of substantially fixed gripping force (a minimum value) was obtained.

FIG. 29 shows a signal from the pressure sensor 457 obtained at time same as the time shown in FIG. 28. A graph 521 indicates the slip detection value Sdx(t) of the thumb 421. A graph 522 indicates the slip detection value Sdy(t) of the thumb 421. A graph 523 indicates the normal force f(t) of the contact surface of the thumb 421 calculated by formula (33). A graph 524 indicates the moving average $Sdx_{iMA}(t)$ of the slip detection value Sdx(t) of the thumb 421. A graph 525 indicates the moving average $Sdy_{iMA}(t)$ of the slip detection value Sdy(t) of the thumb 421.

The graphs 521 and 522 fluctuate from 0 to 1 and from 1 to −0.3 near 32 seconds. The graph 522 fluctuates from 0 to 1 and from 1 to 0 near 34 seconds. According to the fluctuation, the graphs 524 and 525 change from 0 to 0.25 near 32 seconds, the graph 525 changes from 0 to 0.2 near 34 seconds. After 35.5 seconds, the graphs 521 and 522 fluctuate between −0.2 and 0.2 and the graphs 524 and 525 indicate a value of substantially 0.

The graph 523 indicates an increase tendency from near 32 seconds to 34 seconds and indicates a value of 0.25 [N] to 0.45 [N]. Thereafter, the graph 523 indicates a value of 0.35 [N] to 0.45 [N]. The graph 523 indicates a value increasing according to an increase in a gripping force command value and, after that, indicates a substantially fixed value.

Figure 30:
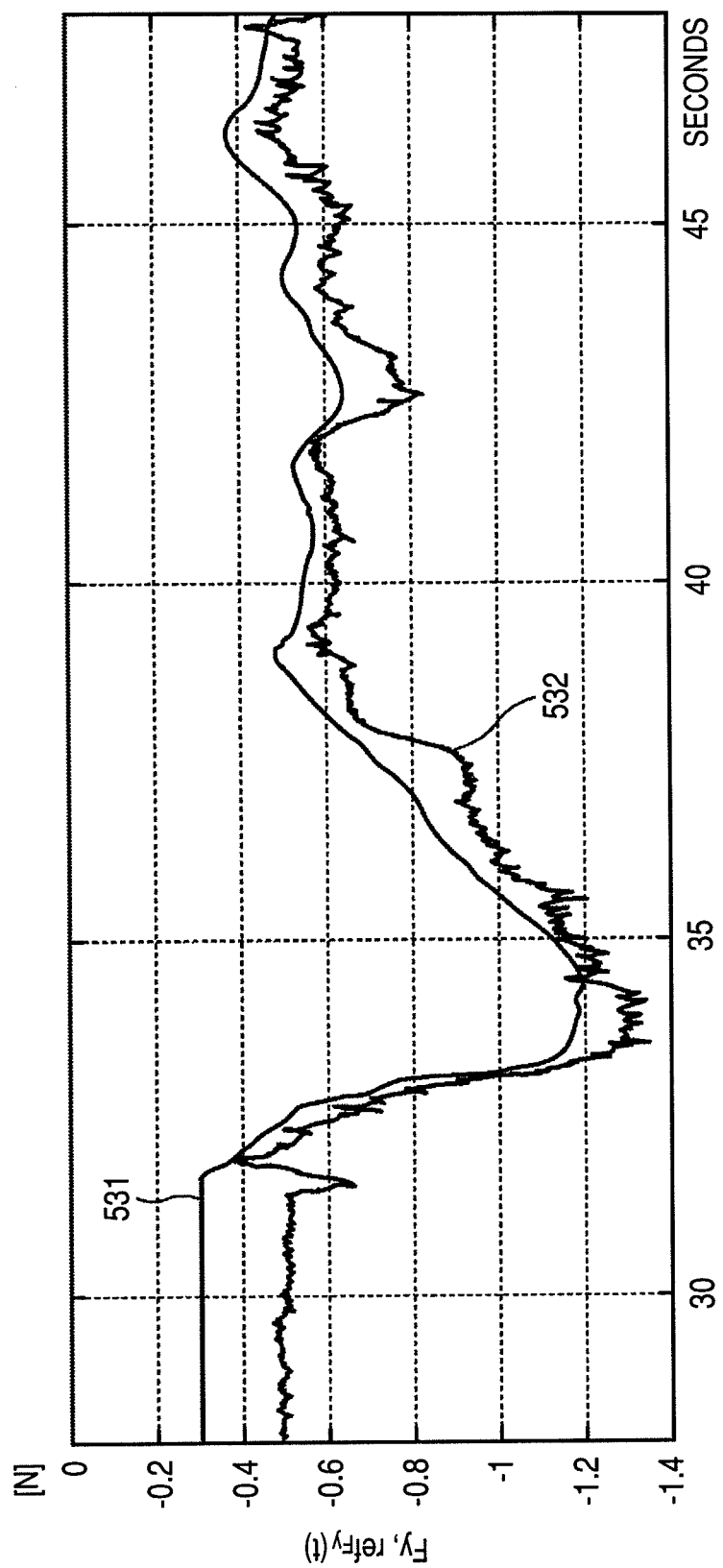
FIG. 30 is a graph showing a change in data of the pressure detecting section.

In FIG. 30, a graph 531 indicates the command value $ref_{Fy}(t)$ of gripping force and a graph 532 indicates the gripping force Fy of the thumb 421. The weight of the object 424 is 250 g. From 28 seconds to 32 seconds, while the object 424 is placed on the floor, the thumb 421, the index finger 422, and the middle finger 423 grip the object 424 with the initial gripping force. Near 32 seconds, a lifting operation is started. Near 37 seconds, the lifting operation is finished. From near 37 seconds to near 48 seconds, the object 424 is caused to rest while being kept lifted.

According to the lifting operation near 32 seconds, changes in the command value $ref_{Fy}(t)$ of gripping force in the graph 531 and the gripping force Fy in the graph 532 are observed. The command value $ref_{Fy}(t)$ of gripping force indicated by the graph 531 indicates a substantially fixed value −0.3 [N] from 28 seconds to 32 seconds, changes from −0.3 [N] to −1.15 [N] from 32 seconds to 33.5 seconds, stabilizes at substantially fixed −1.15 [N] from 33.5 seconds to 34.5 seconds, changes from −1.15 [N] to −0.5 [N] from 34.5 seconds to 39 seconds, and indicates −0.35 [N] to −0.64 [N] from 39 seconds to 48 seconds. The gripping force Fy indicated by the graph 532 stabilizes at about −0.5 [N] from 28 seconds to 32 seconds, fluctuates from −0.65 [N] to −0.4 [N] when the object 424 is lifted, changes from −0.4 [N] to −1.3 [N] from 32 seconds to 33.5 seconds, stabilizes at substantially fixed −1.3 [N] from 33.5 seconds to 34.5 seconds, changes from −1.3 [N] to −0.6 [N] from 34.5 seconds to 39 seconds, and indicates −0.4 [N] to −0.8 [N] from 39 seconds to 48 seconds.

Figure 31:
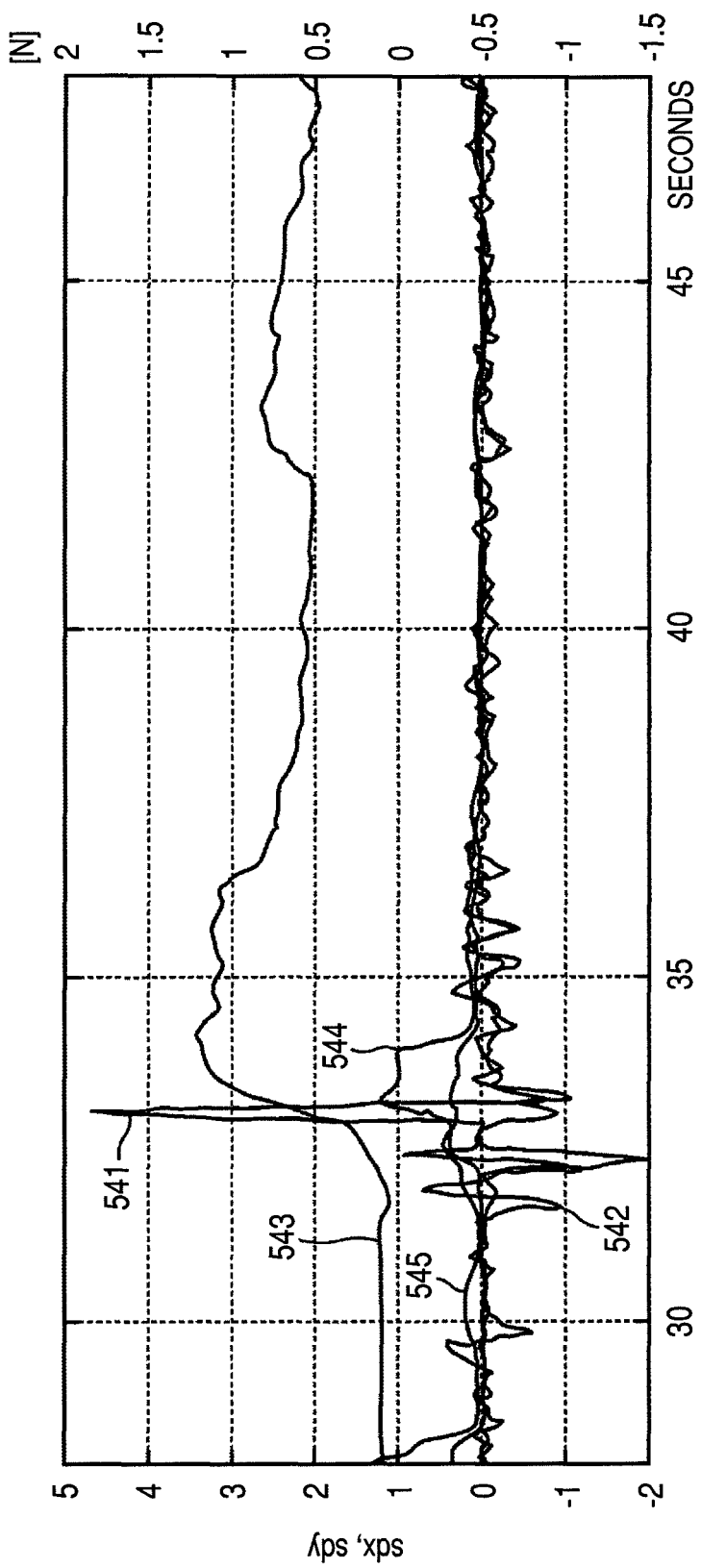
FIG. 31 is a graph showing a change in data of the pressure detecting section.

FIG. 31 shows a signal from the pressure sensor 457 obtained at time same as that shown in FIG. 30. A graph 541 indicates the slip detection value Sdx(t) of the thumb 421. A graph 542 indicates a slip detection value Sdy(t) of the thumb 421. A graph 543 indicates the normal force f(t) of the contact surface of the thumb 421 calculated by formula (33). A graph 544 indicates the moving average $Sdx_{iMA}(t)$ of the slip detection value Sdx(t) of the thumb 421. A graph 545 indicates the moving average $Sdy_{iMA}(t)$ of the slip detection value Sdy(t) of the thumb 421.

From 32 seconds to 34 seconds, the graph 541 largely fluctuates between −2 and 4.5 and the graph 542 fluctuates between −1 and 1. According to the fluctuation, the graph 544 fluctuates from 0 to 1.25 near 32.5 seconds to 34 seconds. The graph 545 fluctuates between 0 and 0.4 from 32 seconds to 34 seconds. Thereafter, the graphs 541 and 542 indicate a value of −0.4 to 0.4 from 34 seconds to 37 seconds and, thereafter, indicate a value of −0.3 to 0.2 from 37 seconds to 48 seconds. The graph 544 indicates a value of 0.1 to 0.2 from 34 seconds to 37 seconds and, thereafter, indicates a value of 0.03 to 0.1 from 37 seconds to 48 seconds. The graph 545 indicates a substantially fixed value of 0.1 from 34 seconds to 37 seconds and, thereafter, indicates a value of 0.03 to 0.1 from 37 seconds to 48 seconds.

The graph 543 indicates an increase tendency from near 32 seconds to 33.5 seconds, indicates a value of 0.10 [N] to 1.10 [N], and, thereafter, indicates a value of 1.10 [N] to 1.0 [N] from 33.5 seconds to 36 seconds. The graph 543 indicates a value of 1.0 [N] to 0.5 [N] between 36 seconds and 39 seconds and indicates a value of 0.5 [N] to 0.75 [N] between 39 seconds and 48 seconds.

According to the fluctuation from 32 seconds to 33.5 seconds of the graphs 541, 542, 543, 544, and 545 shown in FIG. 31, as a result, the graph 531 of the command value of the gripping force shown in FIG. 30 changes from −0.3 [N] to −1.15 [N]. The graphs 541, 542, 543, 544, and 545 shown in FIG. 31 decrease between 34 seconds and 39 seconds. As a result, the graph 531 of the command value of the gripping force shown in FIG. 30 decreases from −1.15 [N] to −0.5 [N].

A slip is detected and controlled as described above. This makes it easy to perform operations such as operations for intentionally causing an object to slip on fingers, manipulating the object, and inserting a bar in a hole. It is also possible to allow the fingers to be slipped on a stationary object. Further, it is possible to estimate a shape and the touch of the object.

FIG. 32 is a block diagram showing an example of the structure of a personal computer 601 that executes the series of processing described above according to a computer program. A CPU (Central Processing Unit) 621 executes various kinds of processing according to programs stored in a ROM (Read Only Memory) 622 or a storing unit 628. Programs executed by the CPU 621, data, and the like are stored in a RAM (Random Access Memory) 623 as appropriate. The CPU 621, the ROM 622, and the RAM 623 are connected to one another via a bus 624.

An input/output interface 625 is also connected to the CPU 621 via the bus 624. An input unit 626 including a keyboard, a mouse, and a microphone and an output unit 627 including a display and a speaker are connected to the input/output interface 625. The CPU 621 executes various kinds of processing in response to commands inputted from the input unit 626. The CPU 621 outputs a result of the processing to the output unit 627.

The storing unit 628 connected to the input/output interface 625 includes, for example, a hard disk and stores programs executed by the CPU 621 and various data. A communication unit 629 communicates with external apparatuses via networks such as the Internet and a local area network. A computer program may be acquired via the communication unit 629 and stored in the storing unit 628.

A drive 630 connected to the input/output interface 625 drives, when a removable medium 631 such as a magnetic disk, an optical disk, a magneto-optical disk, or a semiconductor memory is inserted, the removable medium 631 and acquires programs, data, and the like recorded on the removable medium 631. The acquired programs and data are transferred to the storing unit 628 and stored when necessary.

The series of processing explained above can be also executed by hardware or can also be executed by software.

When the series of processing is executed by the software, a computer program configuring the software is installed in a computer incorporated in a dedicated hardware or, for example, a general-purpose computer, which can execute various kinds of processing with various programs installed therein, from a program recording medium.

A program recording medium that stores programs installed in a computer and executable by the computer includes, as shown in FIG. 32, the removable medium 621 as a package medium including a magnetic disk (including a flexible disk), an optical disk (including a CD-ROM (Compact Disc-Read Only Memory) and a DVD (Digital Versatile Disc), a magneto-optical disk,) or a semiconductor memory, the ROM 622 in which programs are temporarily or permanently stored, and the hard disk configuring the storing unit 628. The storage of the computer programs in the program recording medium is performed by using a wired or wireless communication medium such as a local area network, the Internet, or a digital satellite broadcast via the communication unit 629 as an interface such as a router or a modem when necessary.

In this specification, steps that describe the computer programs stored in the program recording medium include not only processing performed in time series according to a described order but also processing executed in parallel or individually, although not always executed in time series.

Embodiments of the present invention are not limited to the embodiment described above. Various modifications of the embodiment are possible without departing from the spirit of the present invention.

It should be understood by those skilled in the art that various modifications, combinations, sub-combinations, and alterations may occur depending on design requirements and other factors insofar as they are within the scope of the appended claims or the equivalents thereof.

What is claimed is:

1. A control device that controls grip of an object, the control device comprising:
    a detecting detecting unit configured to detect a slip of the object and outputting a slip detection value;
    a change-value calculating unit configured to calculate, on the basis of the slip detection value, a change value for changing a command value, which sets a gripping force for the object, to a magnitude for resting the object;
    a suppression-value calculating unit configured to calculate, on the basis of the slip detection value, a suppression value for suppressing the command value to a necessary minimum magnitude for resting the object; and
    a setting unit configured to set the magnitude of the command value on the basis of the change value and the suppression value.

2. A control device according to claim 1, wherein the setting unit sets the magnitude of the command value on the basis of the change value until the object comes to rest and sets the magnitude of the command value on the basis of the change value and the suppression value after the object comes to rest.

3. A control device according to claim 1, wherein the setting unit sets the command value by adding the change value and the suppression value to the command value at previous timing.

4. A control device according to claim 1, wherein the change value includes a component of a product of a difference between an absolute value of the slip detection value and an absolute value of a target slip detection value and normal force that is a component in a normal direction of reaction of the gripping force.

5. A control device according to claim 4, wherein the normal force is calculated by a sum of products of a pressure value received from the object and an area of a sensor that detects the pressure value.

6. A control device according to claim 1, wherein the suppression value includes a component of a product of a difference between a moving average of an absolute value of the slip detection value and an absolute value of a threshold and normal force that is a component in a normal direction of reaction of the gripping force.

7. A control device according to claim 1, wherein the detecting unit includes:
    plural sensor elements that detect a pressure value from the object;
    a pressure-center calculating unit configured to calculate a pressure center position using the pressure value;
    a pressure-center-movement calculating unit configured to calculate a movement value of the pressure center position using a temporal change of the pressure center position; and
    a slip-detection-value calculating unit configured to calculate the slip detection value on the basis of the movement value of the pressure center position.

8. A control device according to claim 1, wherein the detecting unit includes:
    plural sensor elements that detect a pressure value from the object;
    a pressure-center calculating unit configured to calculate a pressure center position using the pressure value;
    a pressure-center-speed calculating unit configured to calculate speed of the pressure center position using a temporal change of the pressure center position; and
    a slip-detection-value calculating unit configured to calculate the slip detection value on the basis of the speed of the pressure center position.

9. A control method for a control device for controlling grip of an object, the control method comprising the steps of:
    detecting a slip of the object and outputting a slip detection value;
    by a processor, on the basis of the slip detection value, a change value for changing a command value, which sets gripping force for the object, to magnitude for resting the object;
    calculating, on the basis of the slip detection value, a suppression value for suppressing the command value to necessary minimum magnitude for resting the object; and
    setting the magnitude of the command value on the basis of the change value and the suppression value.

10. A non-transitory computer readable medium storing a computer program for controlling grip of an object, the computer program causing a computer to execute processing of:
    detecting a slip of the object and outputting a slip detection value;
    calculating, on the basis of the slip detection value, a change value for changing a command value, which sets gripping force for the object, to magnitude for resting the object;
    calculating, on the basis of the slip detection value, a suppression value for suppressing the command value to necessary minimum magnitude for resting the object; and
    setting the magnitude of the command value on the basis of the change value and the suppression value.

* * * * *